US012695997B2

(12) United States Patent
Miyazaki

(10) Patent No.: US 12,695,997 B2
(45) Date of Patent: Jul. 28, 2026

(54) IMAGE SENSOR, DATA PROCESSING DEVICE, AND IMAGE SENSOR SYSTEM

(71) Applicant: Sony Semiconductor Solutions Corporation, Kanagawa (JP)

(72) Inventor: Takahiro Miyazaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 94 days.

(21) Appl. No.: 18/688,998

(22) PCT Filed: Oct. 5, 2022

(86) PCT No.: PCT/JP2022/037205
§ 371 (c)(1),
(2) Date: Mar. 4, 2024

(87) PCT Pub. No.: WO2023/058670
PCT Pub. Date: Apr. 13, 2023

(65) Prior Publication Data
US 2024/0406575 A1      Dec. 5, 2024

(30) Foreign Application Priority Data

Oct. 8, 2021   (JP) ................................. 2021-166418
Dec. 24, 2021   (JP) ................................. 2021-210986

(51) Int. Cl.
*H04N 23/745*      (2023.01)
*H04N 25/47*      (2023.01)

(52) U.S. Cl.
CPC ........... *H04N 23/745* (2023.01); *H04N 25/47* (2023.01)

(58) Field of Classification Search
CPC .... H04N 25/47; H04N 23/745; H04N 23/683; H04N 23/80; H04N 23/56; H04N 23/71;
(Continued)

(56) References Cited

U.S. PATENT DOCUMENTS

2012/0120289 A1*  5/2012  Sugioka ................ G06T 1/0007
                                                                348/294
2020/0333993 A1* 10/2020  Yoshimochi ........... H04N 23/60
(Continued)

FOREIGN PATENT DOCUMENTS

CN        113475054 A  * 10/2021  ............. H04N 23/80
JP      2012120159 A      6/2012
(Continued)

OTHER PUBLICATIONS

International Search Report (PCT/ISA/210), International Application No. PCT/JP2022/037205, dated Dec. 27, 2022.

*Primary Examiner* — Lin Ye
*Assistant Examiner* — Steven Daniel Barry
(74) *Attorney, Agent, or Firm* — Michael Best & Friedrich LLP

(57)            ABSTRACT

The present disclosure relates to an image sensor, a data processing device, and an image sensor system capable of further improving versatility.
An image sensor includes: an event detecting unit configured to detect an occurrence of an event that is a luminance change of light received by a photodiode; and a data transmitting unit configured to set event data representing details of the event as a part of payload data and transmit line information that is added to a line and relates to the event data in a frame structure in which the line information is stored in a beginning part of the payload data. In addition, a luminance detecting unit configured to detect luminance of light received by the photodiode and output a luminance signal representing a luminance value and an additional information generating unit configured to generate the line information added to a line as additional information that is additionally disposed in the event data on the basis of the
(Continued)

event data are further included. The present technology for example, can be applies to an event-based vision sensor (EVS).

29 Claims, 44 Drawing Sheets

(58) Field of Classification Search
CPC .. H04N 25/772; H04N 25/7795; H04N 25/78; H04N 23/665; H04N 23/6811; H04N 25/443; H04N 23/81; H04N 23/60; H04N 25/79; G06F 13/4282
See application file for complete search history.

(56) References Cited

U.S. PATENT DOCUMENTS

| | | | | |
|---|---|---|---|---|
| 2020/0410272 | A1 * | 12/2020 | Seo | G06V 10/147 |
| 2021/0152757 | A1 * | 5/2021 | Wakabayashi | G06V 10/22 |
| 2024/0114255 | A1 | 4/2024 | Kaizu | |

FOREIGN PATENT DOCUMENTS

| | | | | |
|---|---|---|---|---|
| JP | 2017535999 | A | 11/2017 | |
| JP | 2019091967 | A | 6/2019 | |
| JP | 2020161992 | A | 10/2020 | |
| WO | WO-2017203901 | A1 * | 11/2017 | H04N 25/41 |
| WO | WO-2019145516 | A1 * | 8/2019 | H04N 23/665 |
| WO | 2020067410 | A1 | 4/2020 | |
| WO | 2020182591 | A1 | 9/2020 | |
| WO | 2020261491 | A1 | 12/2020 | |
| WO | WO-2021111873 | A1 * | 6/2021 | H04N 25/00 |

* cited by examiner

Fig. 2
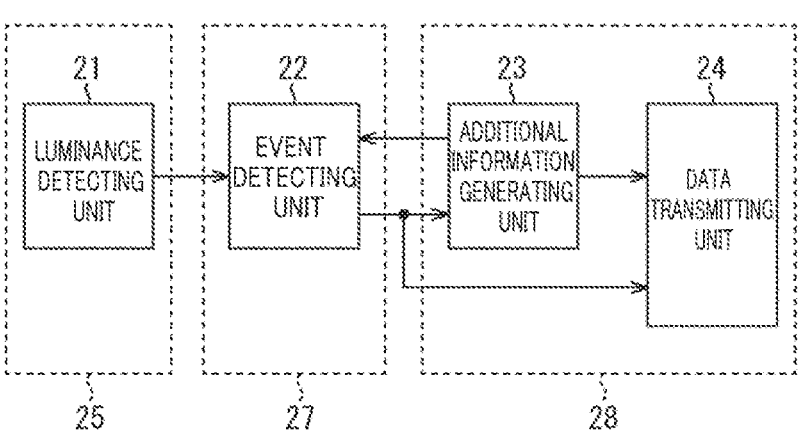

Figure 20:
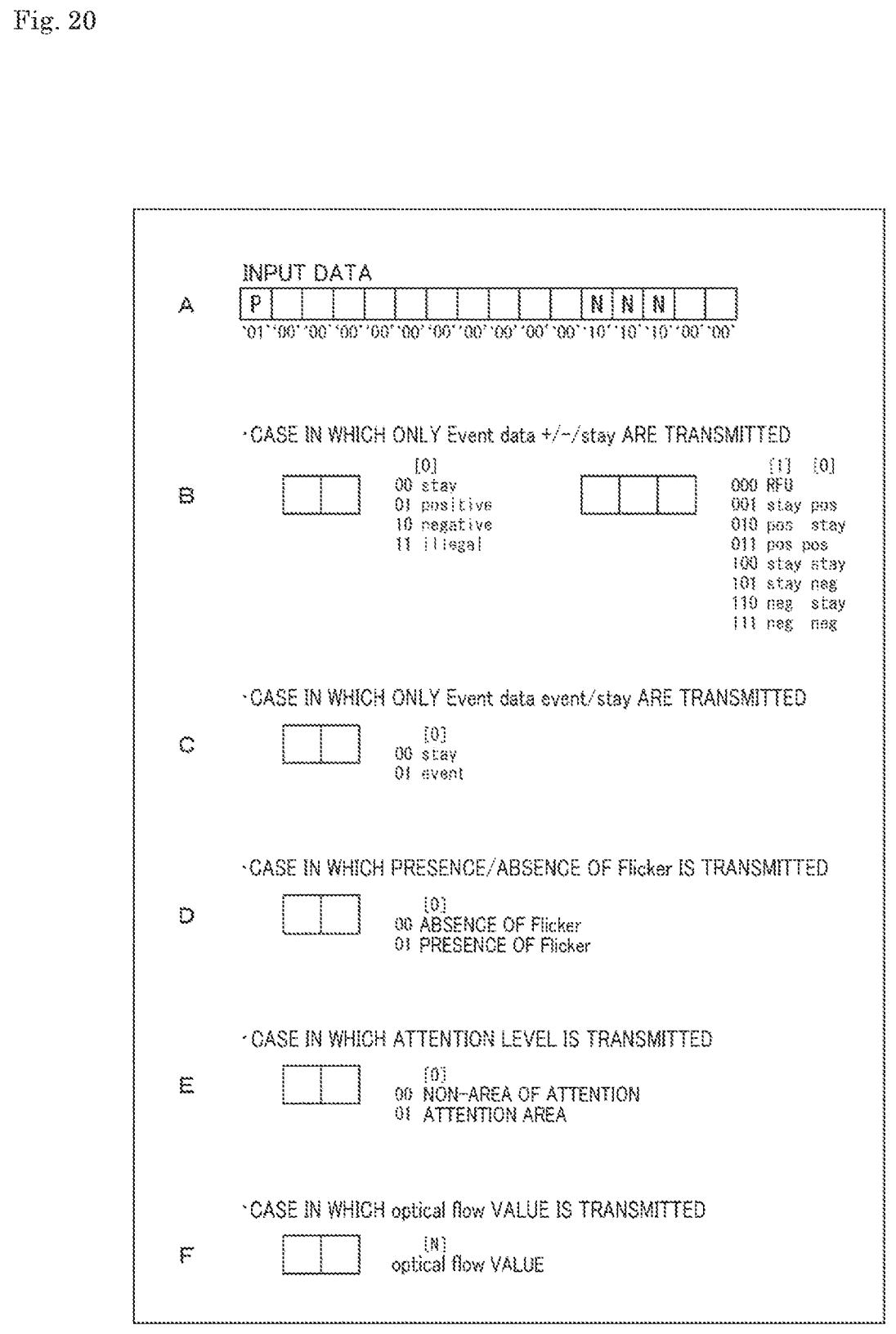

INPUT DATA

A | P | | | | | | | | | | N | N | N | | |

`01` `00` `00` `00` `00` `00` `00` `00` `00` `00` `00` `10` `10` `10` `00` `00`

·CASE IN WHICH ONLY Event data +/-/stay ARE TRANSMITTED

B

[0]
00 stay
01 positive
10 negative
11 illegal

[1] [0]
000 RFU
001 stay pos
010 pos  stay
011 pos  pos
100 stay stay
101 stay neg
110 neg  stay
111 neg  neg ·CASE IN WHICH ONLY Event data event/stay ARE TRANSMITTED

C

[0]
00 stay
01 event

·CASE IN WHICH PRESENCE/ABSENCE OF Flicker IS TRANSMITTED

D

[0]
00 ABSENCE OF Flicker
01 PRESENCE OF Flicker

·CASE IN WHICH ATTENTION LEVEL IS TRANSMITTED

E

[0]
00 NON-AREA OF ATTENTION
01 ATTENTION AREA

·CASE IN WHICH optical flow VALUE IS TRANSMITTED

F

[N]
optical flow VALUE

IMAGE SENSOR, DATA PROCESSING DEVICE, AND IMAGE SENSOR SYSTEM

TECHNICAL FIELD

The present disclosure relates to an image sensor, a data processing device, and an image sensor system and, more particularly to, an image sensor, a data processing device, and an image sensor system that can enhance versatility.

BACKGROUND ART

In recent years, the development of an image sensor that detects luminance changes of each of pixels as events in real-time (hereinafter, referred to as an Event-based Vision Sensor (EVS)) has been progressing.

For example, in PTL 1, a sensor architecture that enables sampling in a frame-based type, an event-based type, and a hybrid type with respect to frame-based type and event-based type methods is disclosed.

CITATION LIST

Patent Literature

PTL 1

Japanese Translation of PCT Application No. 2017-535999

SUMMARY

Technical Problem

Incidentally conventionally due to the characteristic of data output from an EVS being event-driven, the output format has not been determined, and it is necessary to design a new evaluation system to receive that data.

The present disclosure has been made in view of such circumstances and aims to further enhance versatility.

Solution to Problem

An image sensor according to one aspect of the present disclosure includes: an event detecting unit configured to detect an occurrence of an event that is a luminance change of light received by a photodiode; and a data transmitting unit configured to set event data representing details of the event as a part of payload data and transmit line information that is added to a line and relates to the event data in a frame structure in which the line information is stored in a beginning part of the payload data.

A data processing device according to one aspect of the present disclosure includes: a data receiving unit configured to receive event data and line information that have been transmitted from an image sensor including an event detecting unit configured to detect an occurrence of an event that is a luminance change of light received by a photodiode and a data transmitting unit configured to set event data representing details of the event as a part of payload data and transmit line information that is added to a line and relates to the event data in a frame structure in which the line information is stored in a beginning part of the payload data; and an event-related data processing unit configured to refer to the line information and perform data processing relating to the event detected by the event detecting unit for the event data.

An image sensor system according to one aspect of the present disclosure includes: an image sensor including an event detecting unit configured to detect an occurrence of an event that is a luminance change of light received by a photodiode and a data transmitting unit configured to set event data representing details of the event as a part of payload data and transmit line information that is added to a line and relates to the event data in a frame structure in which the line information is stored in a beginning part of the payload data; and a data processing device including a data receiving unit configured to receive the event data and the line information transmitted from the image sensor and an event-related data processing unit configured to refer to the line information and perform data processing relating to the event detected by the event detecting unit for the event data.

In one aspect of the present disclosure, an occurrence of an event that is a luminance change of light received by a photodiode is detected, event data representing details of the event is set as a part of payload data, and line information that is added to a line and relates to the event data is transmitted in a frame structure in which the line information is stored in a beginning part of the payload data. Then, the event data and the line information that have been transmitted are received, the line information is referred to, and data processing relating to the event is performed for the event data.

BRIEF DESCRIPTION OF DRAWINGS

FIG. 2 is a block diagram illustrating a configuration example of an EVS of a 3-chip stacking structure.

FIG. 5 is a diagram illustrating a first example of a frame configuration in which event data corresponding to 3 frames is connected in one frame.

FIG. 18 is a block diagram illustrating a third configuration example of an additional information generating unit.

FIG. 20 is a diagram describing a transmission method of pixel information.

DESCRIPTION OF EMBODIMENTS

Hereinafter, specific embodiments to which the present technology is applied will be described in detail with reference to the drawings.

<Configuration Example of Sensor System>

Figure 1:
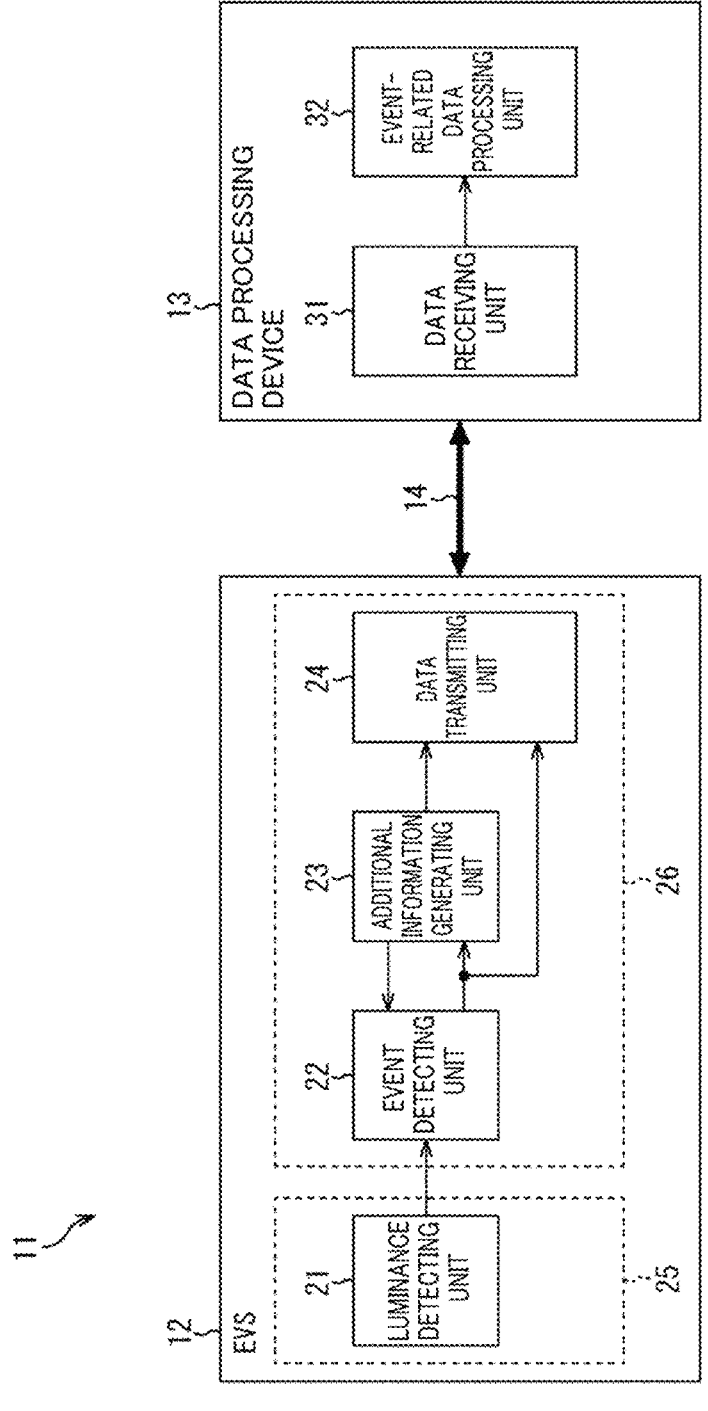
FIG. 1 is a block diagram illustrating a configuration example of one embodiment of a sensor system to which the present technology has been applied.

FIG. 1 is a block diagram illustrating a configuration example of one embodiment of a sensor system 11 to which the present technology has been applied.

In FIG. 1, the sensor system 11 is configured such that an EVS 12 and a data processing device 13 are connected through a data bus 14.

The EVS 12 is an image sensor that detects a luminance change of each pixel in real-time as an event and transmits event data representing details of the event to the data processing device 13 through the data bus 14. The EVS 12 is configured to have a luminance detecting unit 21, an event detecting unit 22, an additional information generating unit 23, and a data transmitting unit 24.

For example, the EVS 12 can be configured to have a stacked structure in which two chips including a pixel chip 25, in which the luminance detecting unit 21 is disposed, and a signal processing chip 26, in which the event detecting unit 22, the additional information generating unit 23, and the data transmitting unit 24 are disposed, are stacked. Here, the event detecting unit 22 is an analog circuit that serves as an Analog Front End (AFE). Thus, as illustrated in FIG. 2, the EVS 12 may have a stacked structure in which three chips including a pixel chip 25, in which the luminance detecting unit 21 is disposed, an AFE chip 27, in which the event detecting unit 22 is disposed, and a logic chip 28, in which the additional information generating unit 23 and the data transmitting unit 24 are disposed, are stacked.

The data processing device 13, for example, is configured using an application processor, a field programmable gate array (FPGA), and the like. The data processing device 13 performs various kinds of data processing on event data transmitted from the EVS 12 and acquires various kinds of information relating to an event. The data processing device 13 is configured to have a data receiving unit 31 and an event-related data processing unit 32, and details thereof will be described with reference to FIG. 11 to be described below.

The data bus 14, for example, transmits/receives data to/from the EVS 12 and the data processing device 13 in compliance with Camera Serial Interface-2 (CSI-2) that is a specification of an interface according to Mobile Industry Processor Interface (MIPI) Alliance.

The luminance detecting unit 21 is configured to have a photodiode disposed for each pixel, detects a luminance of light received by the photodiode, and supplies a luminance signal representing a luminance value thereof to the event detecting unit 22.

The event detecting unit 22 detects an occurrence of an event that is a change of a luminance signal supplied from the luminance detecting unit 21, for example, acquires a difference between a luminance value represented by the luminance signal and a predetermined reference value and, in a case in which the difference exceeds an event detection threshold of a positive side or an event detection threshold of a negative side, detects an occurrence of an event. Then, when an occurrence of an event is detected, the event detecting unit 22 outputs event data representing details of the event (for example, data representing whether a change of the luminance value from a reference value is to the positive side or the negative side). In addition, event data output from the event detecting unit 22 will be referred to also as event raw data as is appropriate.

The additional information generating unit 23 generates various types of additional information that is additionally disposed in event data on the basis of the event data output from the event detecting unit 22 and supplies the generated additional information to the data transmitting unit 24. For example, the additional information generating unit 23 can generate frame information, line information and pixel information as will be described below in addition to embedded data defined in CSI-2 as additional information.

The data transmitting unit 24 transmits event data output from the event detecting unit 22 and additional information supplied from the additional information generating unit 23 to the data processing device 13 in a frame configuration that is compliant with the specification of the data bus 14.

Figure 3:
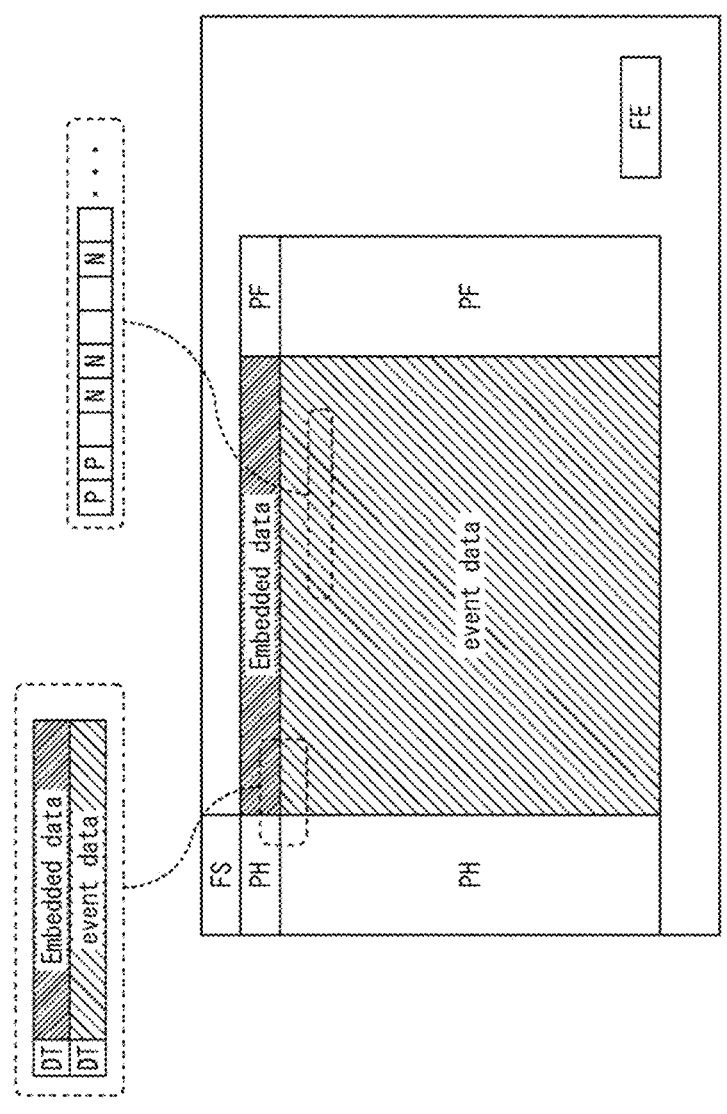
FIG. 3 is a diagram illustrating one example of a frame configuration of event data corresponding to one frame.

FIG. 3 is a diagram illustrating one example of a frame configuration of event data corresponding to one frame transmitted from the EVS 12 to the data processing device 13.

As illustrated in FIG. 3, event data corresponding to one frame is stored in a plurality of long packets disposed in a line shape between a frame start FS that is a short packet representing start of a frame and a frame end FE that is a short packet representing an end of the frame. In addition, in the example illustrated in FIG. 3, a long packet in which embedded data is stored is disposed at the start of a long packet in which event data is stored.

In a long packet, a packet header PH and a packet footer PF are disposed. In the packet header PH, a data type DT representing a type of data stored in a long packet is disposed, and in accordance with the data type DT, it can be identified which one of embedded data and event data is stored. In addition, the data type DT may be disposed at the start of an area in which data is stored in a long packet other than being disposed in the packet header PH.

As the event data, for example, polarity information of an event that is data representing positive P in a pixel of which a luminance value has changed from a reference value to the positive side and representing negative N in a pixel of which a luminance value has been changed from the reference value to the negative side can be used. In addition, as the event data, data other than the polarity information of an event may be used.

In addition, the disposition position of embedded data is not limited to a beginning part of event data as illustrated in FIG. 3. Furthermore, a frame configuration in which a plurality of pieces of embedded data are disposed may be used.

Figure 4:
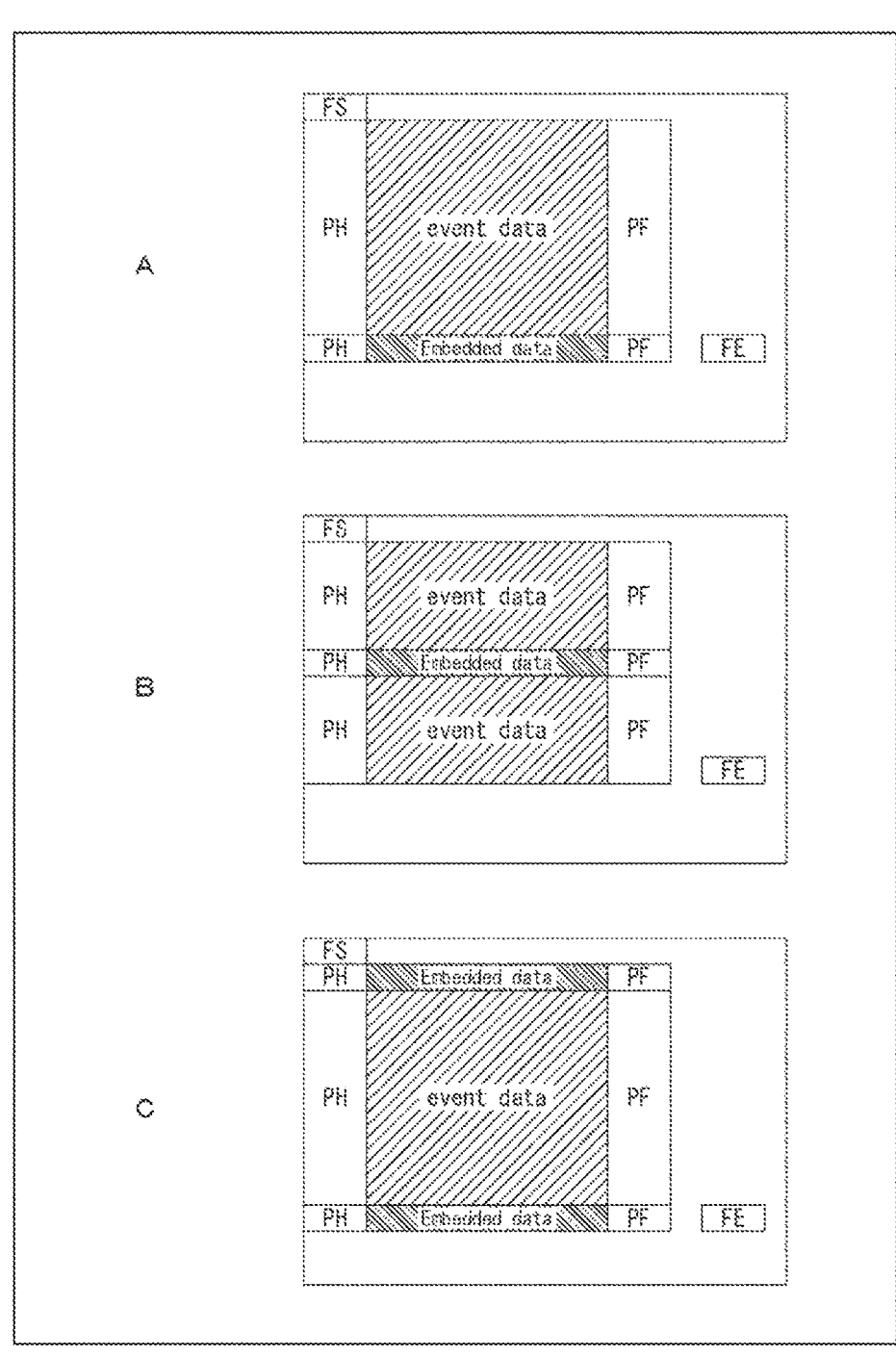
FIG. 4 is a diagram illustrating a disposition example of embedded data.

For example, a frame configuration in which an insertion position of embedded data is an end part of event data as illustrated in A of FIG. 4 or a frame configuration in which the insertion position is in the middle of event data as illustrated in B of FIG. 4 may be used.

In addition, as illustrated in C of FIG. 4, a frame configuration in which embedded data is disposed in both a beginning part and an end part of event data may be used. For example, in a case in which information determined at a time point at which an event is acquired such as a time stamp, a frame number, or the like is used as embedded data, it is appropriate to dispose the embedded data at in a beginning part of event data. On the other hand, when information requiring a predetermined arithmetic operation after acquisition of an event, for example, information relating to a flicker, an optical flow, a threshold, or the like is used as embedded data, it is appropriate to dispose the embedded data in an end part of event data.

In addition, instead of transmitting single event data corresponding to one piece of image data as one frame, a plurality of pieces of event data corresponding to a plurality of pieces of image data may be connected and transmitted as one frame.

Figure 5:
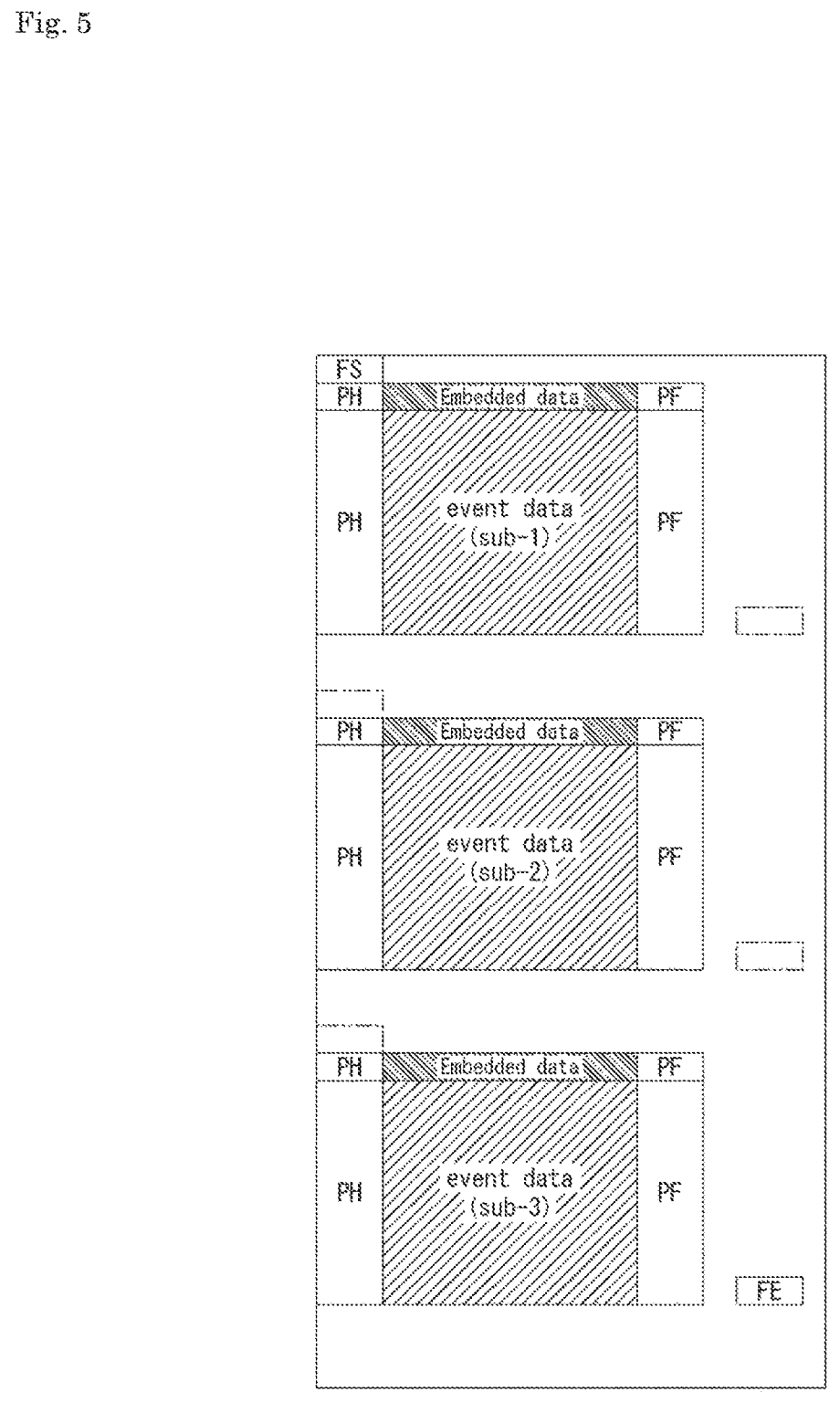
Figure 6:
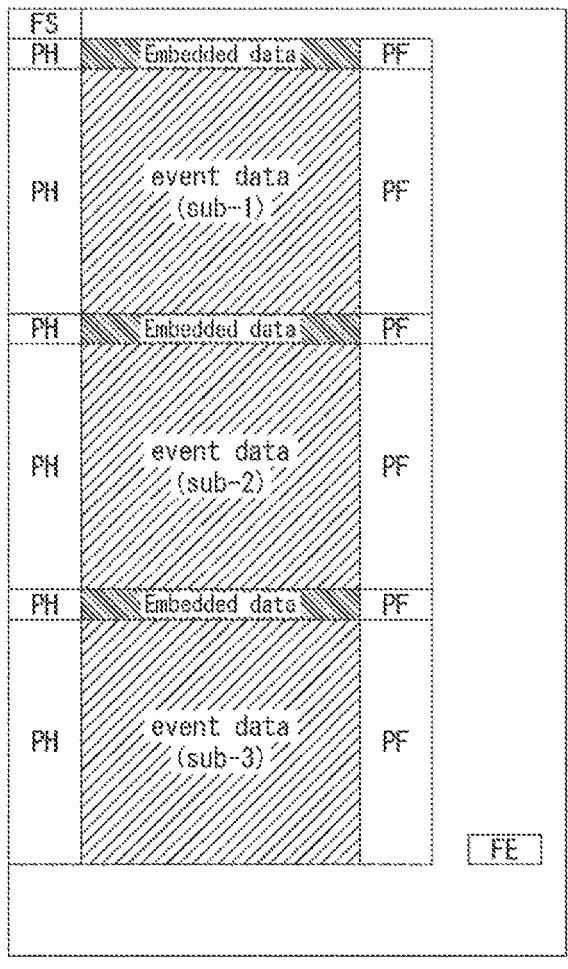
FIG. 6 is a diagram illustrating a second example of a frame configuration in which event data corresponding to 3 frames is connected in one frame.

Referring to FIGS. 5 and 6, a frame structure in which event data corresponding to three frames corresponding to three images is connected as subframes and is transmitted as one frame will be described.

The frame structure illustrated in FIG. 5 is configured as one frame by causing a frame end FE of a subframe that becomes first event data, a frame start FS and a frame end FE of a subframe that becomes second event data, and a frame start FS of a subframe that becomes third event data not to be recognized. In other words, by causing only a frame start FS of the subframe that becomes the first event data and a frame end FE of the subframe that becomes the third event data to be recognized, even when a structure in which event data transmitted therebetween is actually connected is not formed, it is recognized as one frame.

The frame structure illustrated in FIG. 6 is formed to be a structure in which a subframe that becomes first event data, a subframe that becomes second event data, and a subframe that becomes third event data are actually connected, whereby one frame is configured. In addition, a gap may be formed between such subframes.

For example, by configuring the data receiving unit 31 to have an internal counter and counting the number of subframes using the data receiving unit 31, event data can be received by recognizing a plurality of subframes as one frame.

<First Configuration Example of Additional Information Generating Unit>

Figure 7:
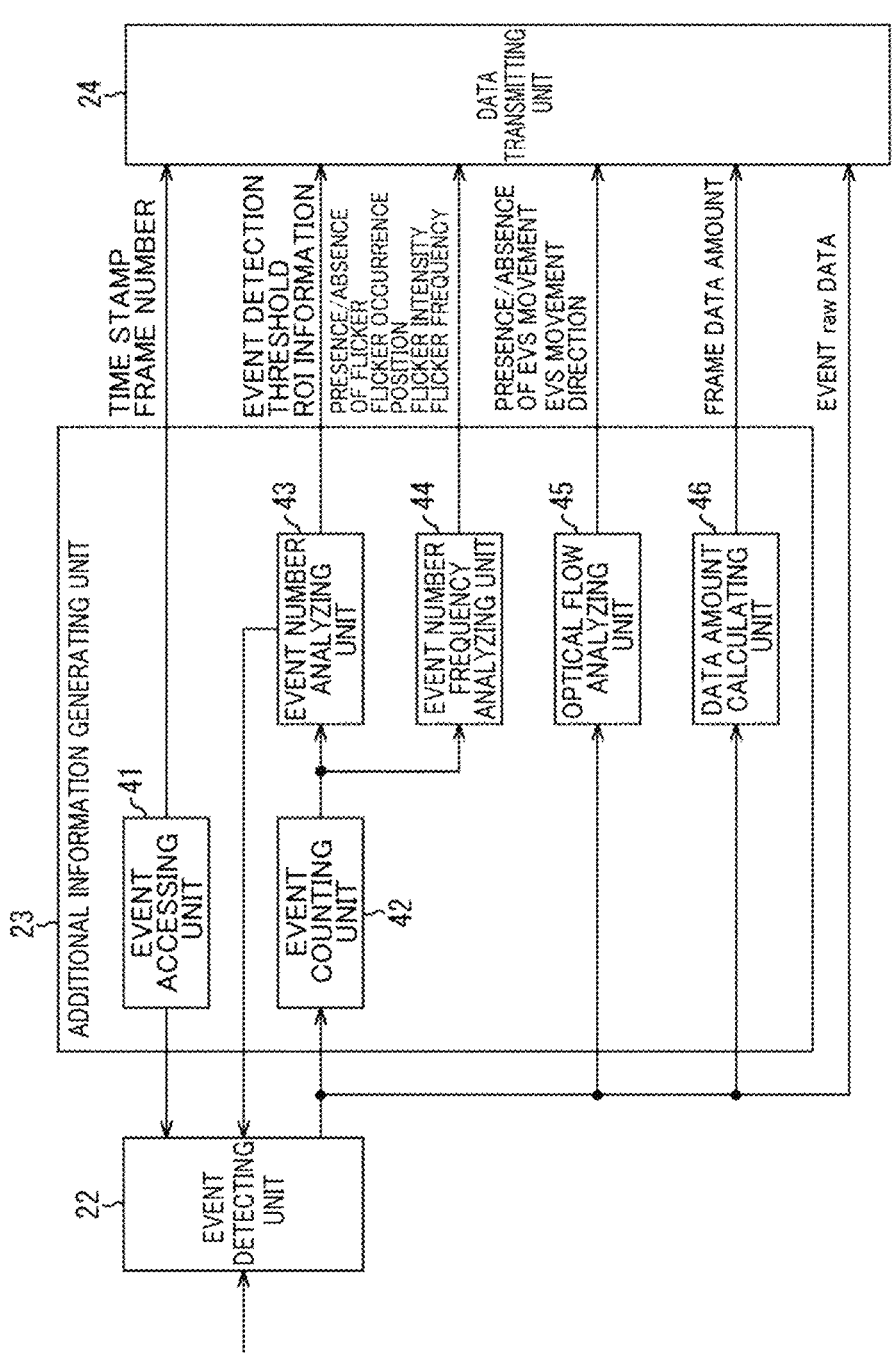
FIG. 7 is a block diagram illustrating a first configuration example of an additional information generating unit.

FIG. 7 is a block diagram illustrating a first configuration example of an additional information generating unit 23.

The additional information generating unit 23 illustrated in FIG. 7 generates frame information added to a frame as additional information that is additionally disposed in event data. For example, the frame information is data that may be acquired once in a predetermined period of which a minimum resolution is one frame or more.

For example, the additional information generating unit 23 generates information of frame information itself, threshold information, flicker information, movement information, and Region of Interest (ROI) information as frame information. Other than that, information representing various kinds of setting values, an event polarity a type of data (a type including a possibility other than an event) and the like may be used as frame information.

As information of the frame information itself, a time stamp representing a time at which the frame has been generated, a frame number representing which frame number the frame is, a frame data amount representing a data amount of data configuring the frame, and the like are used. As the threshold information, event detection thresholds that become thresholds used for detecting an occurrence of an event (the event detection threshold of the positive side and the event detection threshold of the negative side as described above) are used. As the flicker information, information representing presence/absence of a flicker, an occurrence position of a flicker, an intensity of a flicker, and a frequency of a flicker is used. As the movement information, information representing presence/absence of movement of the EVS 12 and a movement direction is used.

The ROI information is information that represents a target area that is an area that becomes a target in which an event is detected.

The additional information generating unit 23 is configured to include an event accessing unit 41, an event counting unit 42, an event number analyzing unit 43, an event number frequency analyzing unit 44, an optical flow analyzing unit 45, and a data amount calculating unit 46.

The event accessing unit 41 generates a time stamp and a frame number and supplies them to the data transmitting unit 24. In addition, the event accessing unit 41 instructs a timing at which the event detecting unit 22 scans event data.

Figure 8:
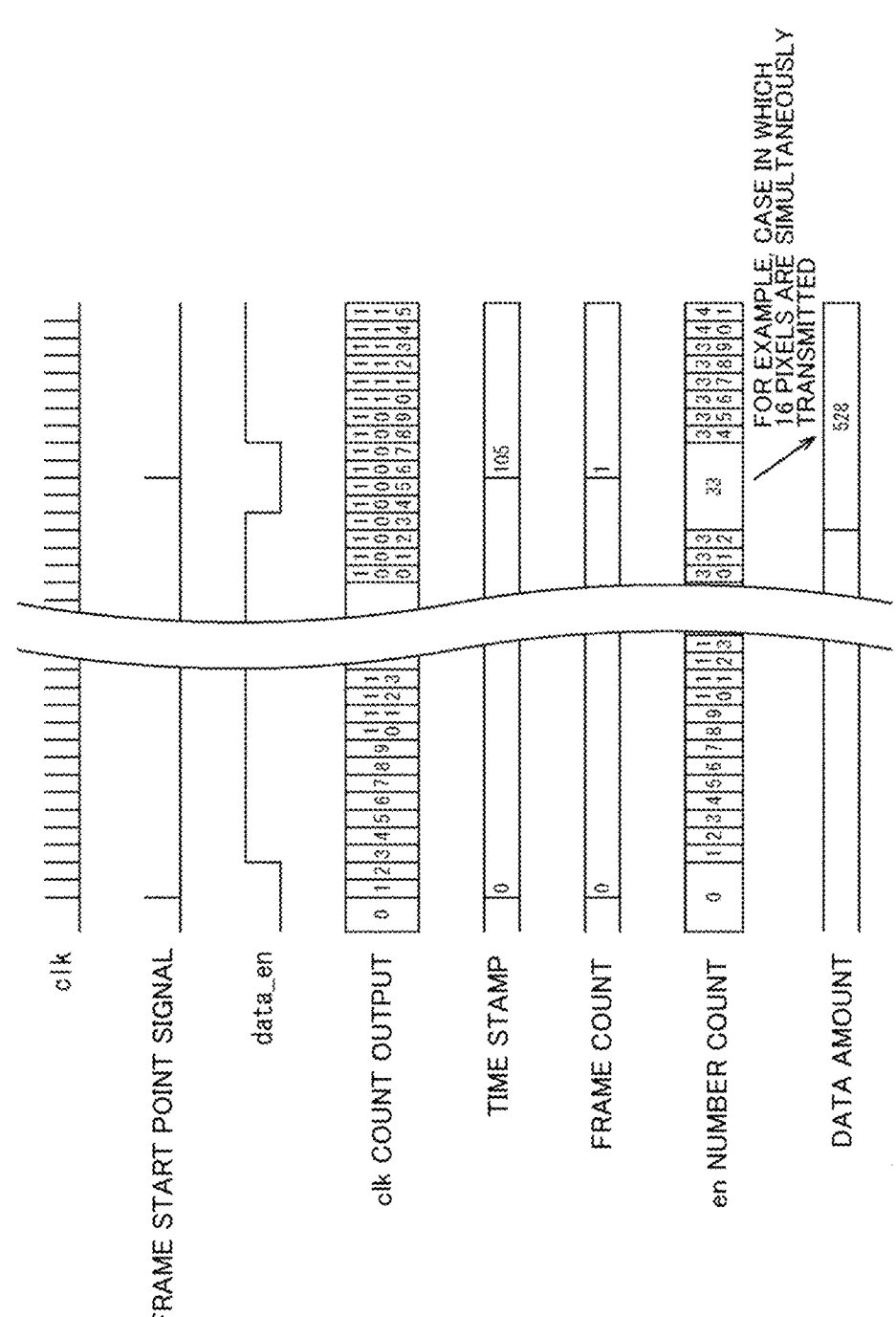
FIG. 8 is a diagram describing a time stamp, a frame number, and a data amount.

For example, the event accessing unit 41 has a circuit for counting clocks clk as illustrated in FIG. 8 and, when receiving an instruction from the outside, can operate thereafter in accordance with an internal timer. For example, the event accessing unit 41 generates a clk count output at a timing at which a frame start point signal instructing the event detecting unit 22 of a start point of a frame becomes on as a time stamp. In addition, the event accessing unit 41 generates a frame count that is counted up at a timing at which a time stamp is generated as a frame number.

The event counting unit 42 counts the number of times with which an event has occurred on the basis of event raw data supplied from the event detecting unit 22 and supplies an event number representing the count value to the event number analyzing unit 43 and the event number frequency analyzing unit 44.

The event number analyzing unit 43, by analyzing an event number supplied from the event counting unit 42, performs setting of an event detection threshold and generation of ROI information and supplies the event detection threshold and the ROI information to the data transmitting unit 24.

For example, in a case in which the event number is too large, the event number analyzing unit 43 determines that the current event detection threshold is lowly set and highly sets the event detection threshold such that events occur at an appropriate frequency. On the other hand, in a case in which the event number is too small, the event number analyzing unit 43 determines that the current event detection threshold is highly set and lowly sets the event detection threshold such that events occur at an appropriate frequency. Then, the event number analyzing unit 43 can adjust the frequency at which an event is detected by feeding back the event detection threshold to the event detecting unit 22. In addition, although the event detection threshold is generally set from the outside of the EVS 12, the event detection threshold may be adaptively set inside of the EVS 12 by the event number analyzing unit 43, and thus it is necessary to output the event detection threshold set by the event number analyzing unit 43 to the outside.

The event number frequency analyzing unit 44, by analyzing the frequency of the event number supplied from the event counting unit 42, acquires flicker information representing presence/absence of a flicker, an occurrence position of a flicker, an intensity of a flicker, and a frequency of a flicker and supplies the flicker information to the data transmitting unit 24. For example, the flicker information represents information of a flicker light source present on a screen.

Figure 9:
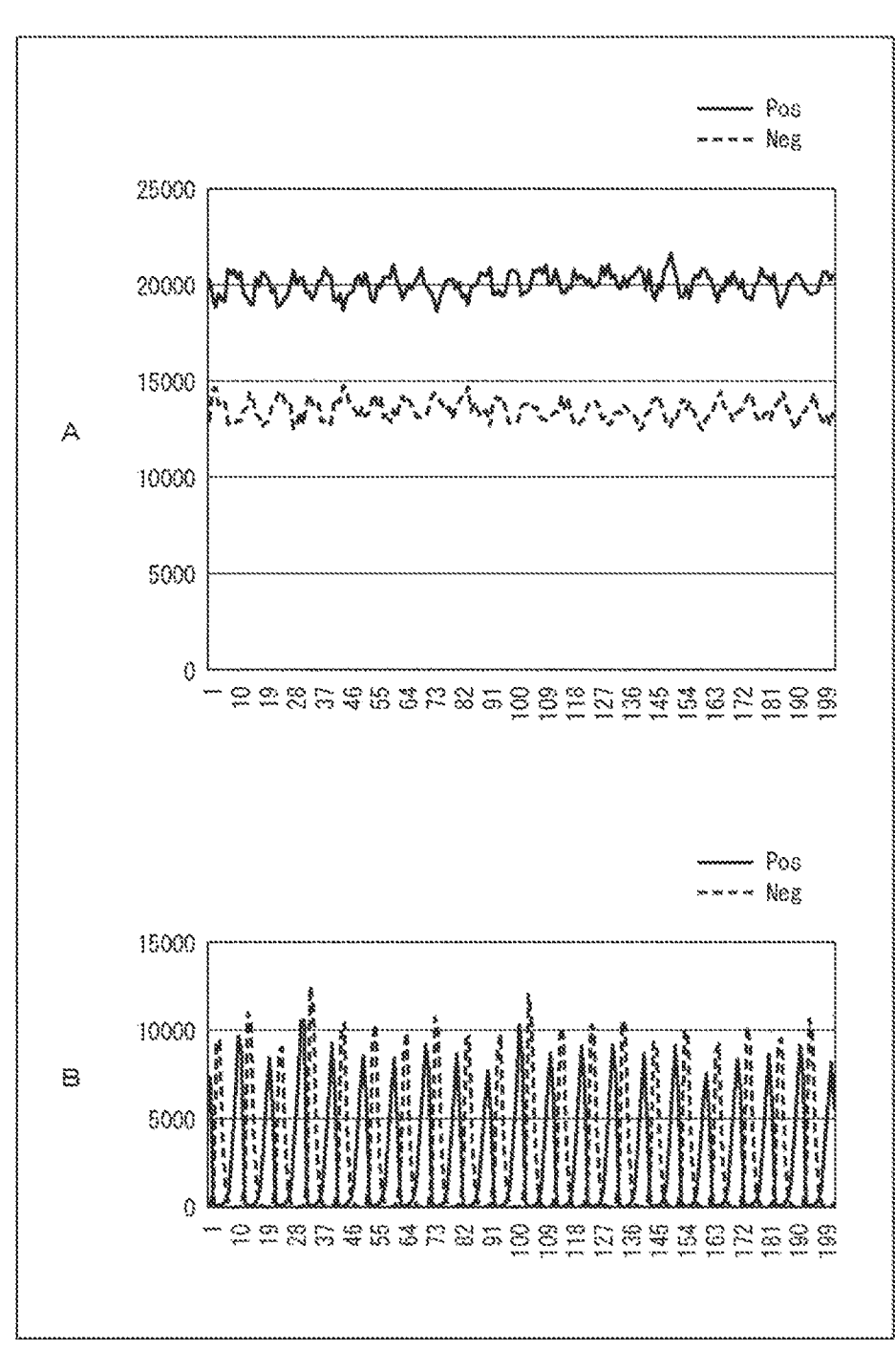
FIG. 9 is a diagram describing presence/absence of a flicker and event data.

For example, a sampling example of event data in a state in which no flicker is being generated is illustrated in A of FIG. 9, and a sampling example of event data in a state in which a flicker is being generated is illustrated in B of FIG. 9.

For example, in a case in which a flicker is being generated in accordance with on and off of a light source, positive event data and negative event data appear with being biased to on and off. In this way, a flicker appears as an event number, and thus flicker information can be acquired by using the event counting unit 42 and the event number frequency analyzing unit 44.

The optical flow analyzing unit 45 analyzes movement from luminance information of the inside of an image on the basis of event raw data supplied from the event detecting unit 22 and performs an optical flow analysis acquiring movement of an object using a speed vector. In accordance with this, the optical flow analyzing unit 45 acquires information representing presence/absence of movement of the EVS 12 and a movement direction and supplies the acquired information to the data transmitting unit 24.

The data amount calculating unit 46 calculates a frame data amount that becomes a data amount per frame on the basis of event raw data supplied from the event detecting unit 22 and supplies the data amount to the data transmitting unit 24.

For example, as illustrated in FIG. 8, the data amount calculating unit 46 can calculate a frame data amount on the basis of an en number count value acquired by counting clocks clk of a period in which a data enable signal data_en is on. In addition, in a case in which event data of a plurality of pixels is simultaneously transmitted, the en number count value may be multiplied by the number thereof, and when the en number count value is 33, and event data of 16 pixels is simultaneously transmitted, the frame data amount becomes 528.

In the way, the additional information generating unit 23 can supply the time stamp, the frame number, the event detection threshold, the ROI information, the flicker information, the information representing the presence/absence of movement and the movement direction of the EVS 12, and the frame data amount to the data transmitting unit 24. Then, the data transmitting unit 24 can store such information in a frame structure as illustrated in A of FIG. 10 as frame information and transmit the information to the data processing device 13 through the data bus 14 together with event data. In B of FIG. 10, one example of an output format of frame information and event data output in compliance with the CSI-2 specification is illustrated.

In other words, the data transmitting unit 24 can store frame information in accordance with a disposition position of embedded data in the frame structure described with reference to FIG. 3. For example, frame information may be configured to be included in a part of embedded data. In addition, similar to the embedded data illustrated in FIG. 4 described above, an insertion position of frame information may be an end part or a middle part of event data, and frame information may be disposed in both a beginning part and an end part of the event data. Furthermore, as illustrated in FIGS. 5 and 6 described above, even when a plurality of pieces of event data are connected and are formed as one frame, frame information can be stored similar to the embedded data of each subframe.

The EVS 12 including the additional information generating unit 23 configured as described above employs a frame structure in which frame information is stored similar to the embedded data and can transmit frame information in an output format according to this frame structure. In other words, the EVS 12 is transmitted in a frame structure in which frame information is configured as a part of embedded data, and event data is configured as a part of payload data.

In accordance with this, the EVS 12 can further improve versatility.

<Configuration Example of Data Processing Device>

Figure 11:
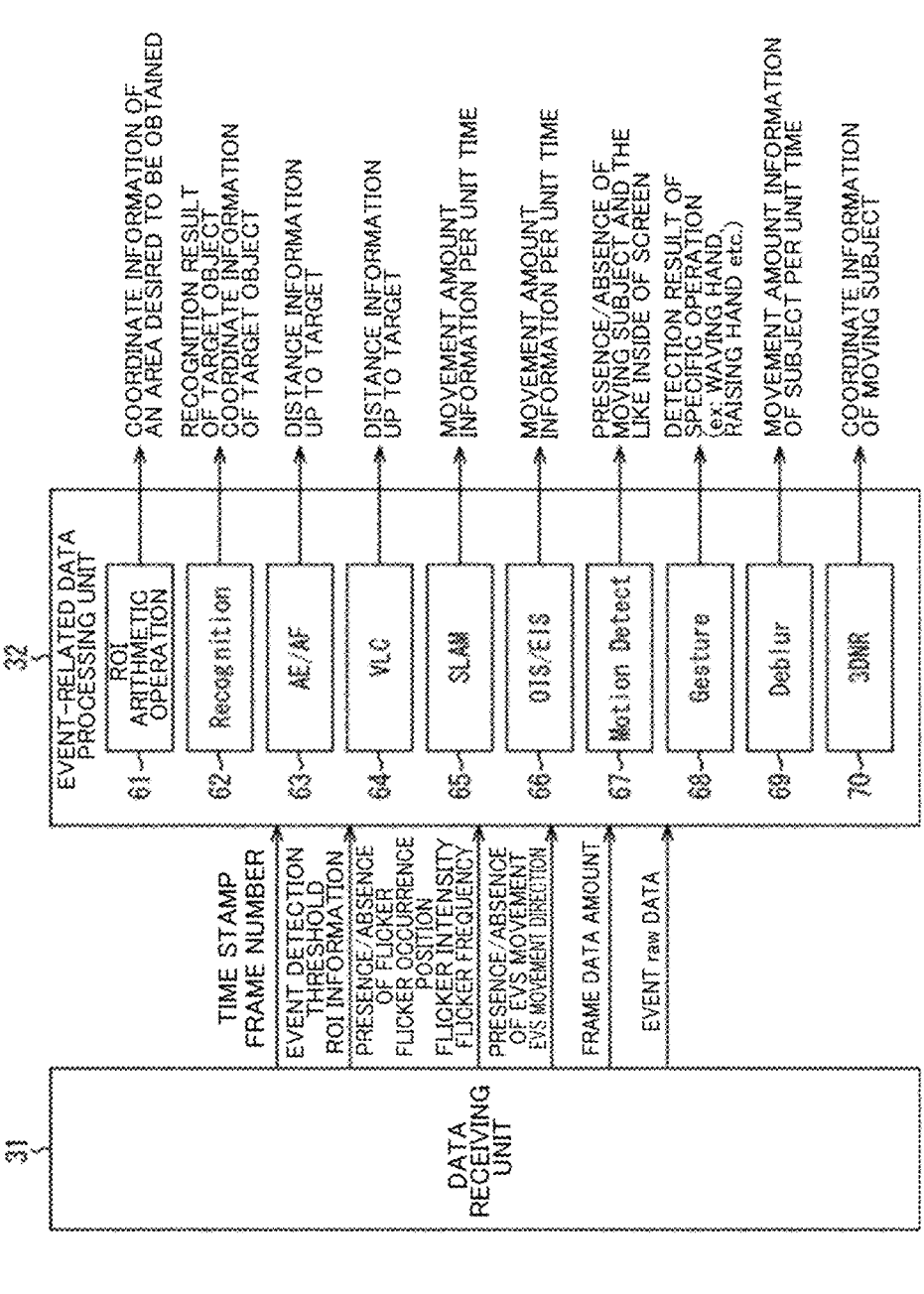
FIG. 11 is a block diagram illustrating a configuration example of a data processing device.

FIG. 11 is a block diagram illustrating a configuration example of the data processing device 13.

As illustrated in FIG. 1 described above, the data processing device 13 is configured to have the data receiving unit 31 and the event-related data processing unit 32.

Figure 10:
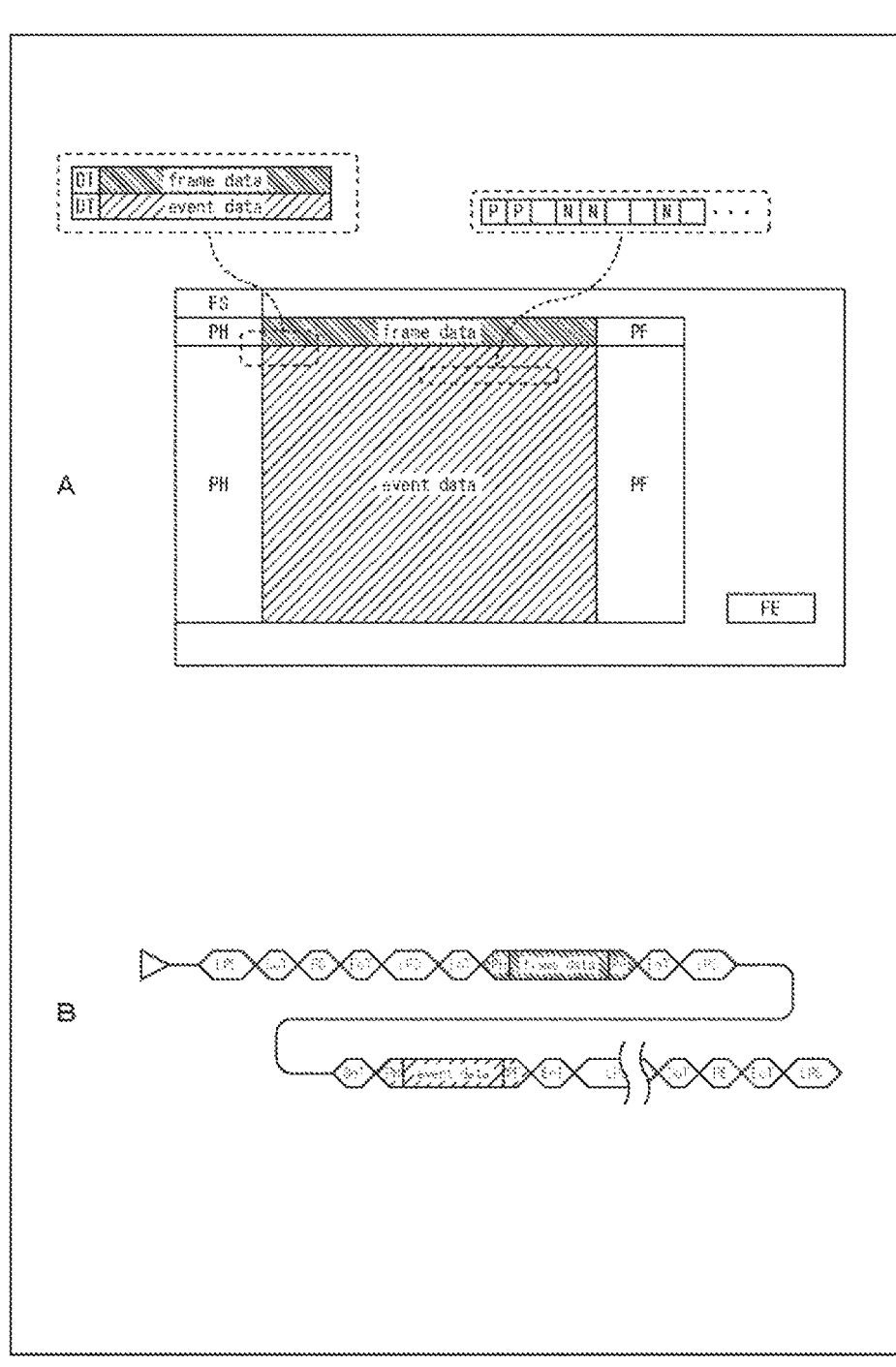
FIG. 10 is a diagram illustrating one example of a frame configuration in which frame information is stored.

The data receiving unit 31 receives frame information and event raw data transmitted from the data transmitting unit 24 in the frame structure as illustrated in FIG. 10. Then, the data receiving unit 31 supplies the event raw data to the event-related data processing unit 32 as it is, extracts various types of information included in the frame information, and supplies the extracted information to the event-related data processing unit 32. In other words, a time stamp, a frame number, an event detection threshold, ROI information, flicker information, information representing presence/absence of movement and a movement direction of the EVS 12, and a frame data amount are supplied to the event-related data processing unit 32 from the data receiving unit 31.

The event-related data processing unit 32 refers to various types of information included in the frame information and can perform various kinds of data processes relating to an event detected by the event detecting unit 22 on event raw data supplied from the data receiving unit 31.

As illustrated in the drawing, the event-related data processing unit 32 is configured to have an ROI arithmetic operation processing unit 61, a recognition processing unit 62, an AE/AF processing unit 63, a VLC processing unit 64, a SLAM processing unit 65, an OIE/EIS processing unit 66, a motion detect processing unit 67, a gesture processing unit 68, a deblur processing unit 69, and a 3DNR processing unit 70. Each process described here is merely one example, and the event-related data processing unit 32 can perform various processes other than the processes described here on the basis of the event raw data.

The ROI arithmetic operation processing unit 61, for example, performs an ROI arithmetic operation process for acquiring coordinate information of an area desired to be obtained and outputs the coordinate information of the area.

The recognition processing unit 62, for example, performs a recognition process for recognizing a target object that has generated an event and outputs a recognition result and coordinate information of the target object.

The auto exposure/auto focus (AE/AF) processing unit 63 outputs distance information representing a distance to a target that is acquired in an AE/AF process that automatically matches an exposure or a focus for the target that has generated an event.

The VLC processing unit 64 performs a VLC process and acquires and outputs distance information representing a distance to a target.

By performing a simultaneous localization and mapping (SLAM) process in which estimation of a self-position and generation of an environment map are simultaneously performed, the SLAM processing unit 65 acquires and outputs movement amount information representing a movement amount of the EVS 12 per unit time.

The optical image stabilization/electronic image stabilizer (OIS/EIS) processing unit 66 outputs movement amount information representing a movement amount of the EVS 12 per unit time that is acquired in an OIE/EIS process in which an optical-type camera shake correction or an electronic-type camera shake correction is performed.

The motion detect processing unit 67 performs a motion detection process for detecting presence/absence and the like of a moving subject inside of the screen and outputs information representing presence/absence and the like of the moving subject.

The gesture processing unit 68 performs a gesture process for detecting a specific operation performed by a subject and outputs information representing a detection result thereof (for example, an operation of waving a hand, an operation of raising a hand, or the like).

The deblur processing unit 69 outputs movement amount information representing a movement amount of a subject per unit time that is acquired in a deblur process in which blurring of the subject is eliminated.

The 3DNR processing unit 70 outputs coordinate information representing coordinates of a moving subject that are acquired in a 3DNR process in which three-dimensional noise of the subject is eliminated.

<Modified Example of First Configuration Example of Additional Information Generating Unit>

Figure 12:
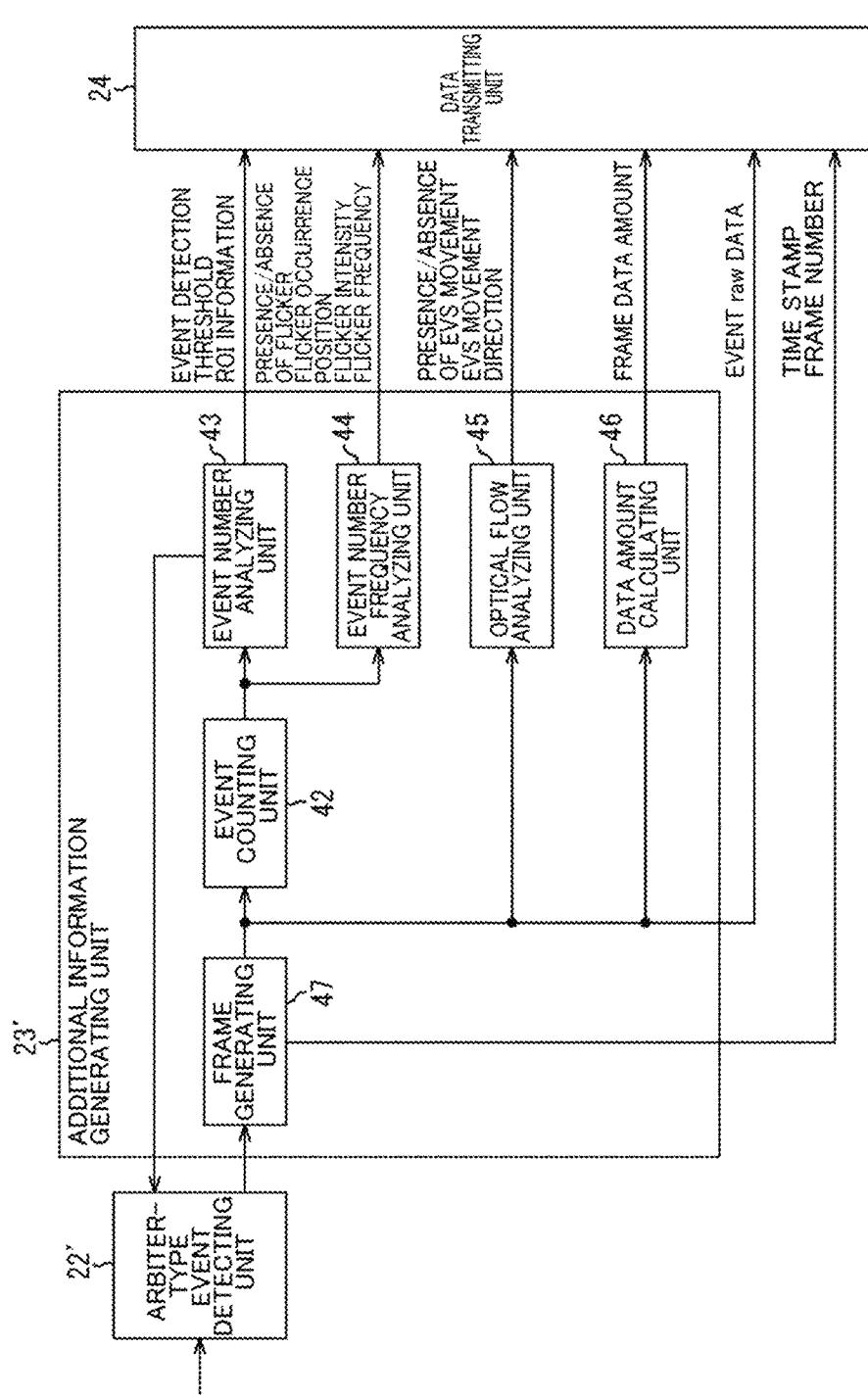
FIG. 12 is a block diagram illustrating a configuration example of an additional information generating unit corresponding to an arbiter type.

FIG. 12 is a block diagram illustrating a modified example of the first configuration example of the additional information generating unit 23. In addition, in an additional information generating unit 23' illustrated in FIG. 12, the same reference signs will be assigned to components that are common to the additional information generating unit 23 illustrated in FIG. 7, and detailed description thereof will be omitted.

For example, the event detecting unit 22 and the additional information generating unit 23 illustrated in FIG. 7 described above are of a scan type, and by outputting event data regardless of presence/absence of an occurrence of an event, one frame is configured. In contrast to this, an additional information generating unit 23' is configured to be in correspondence with an arbiter-type event detecting unit 22' that outputs event data only at a timing at which an event has occurred.

As illustrated in the drawing, the additional information generating unit 23' is configured to include a frame generating unit 47, which is a configuration different from that of the additional information generating unit 23 illustrated in FIG. 7.

The frame generating unit 47 generates event data corresponding to one frame by complementing event data at a timing at which no event has occurred from event data output from the arbiter-type event detecting unit 22' and supplies the generated event data to the event counting unit 42, the optical flow analyzing unit 45, and the data amount calculating unit 46. In addition, the frame generating unit 47 supplies event raw data to the data transmitting unit 24 and supplies a time stamp and a frame number of the generated frame to the data transmitting unit 24.

Figure 13:
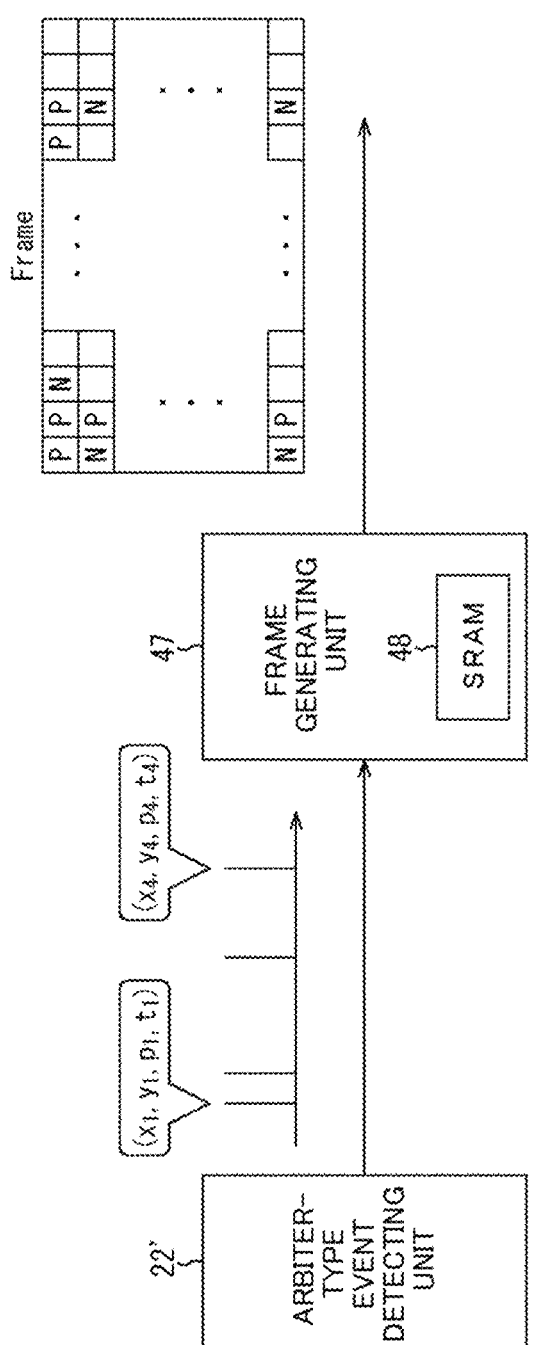
FIG. 13 is a diagram describing a process performed by a frame generating unit.

A process performed by the frame generating unit 47 will be described with reference to FIG. 13.

For example, when an n-th event has occurred, the arbiter-type event detecting unit 22' outputs n-th event data $(x_n, y_n, p_n, t_n)$ representing coordinate information and time information at that timing. The frame generating unit 47 can cause a static random access memory (SRAM) 48 to temporarily store event data that has occurred in a period corresponding to a specific one frame in accordance with the coordinate information. Then, when event data that has occurred in a period corresponding to the one frame is stored in the SRAM, the frame generating unit 47 can output such event data in the format of a frame.

In other words, the arbiter-type event detecting unit 22' does not output event data in the concept called a frame, and thus the arbiter-type EVS 12 needs to include the frame generating unit 47.

<Second Configuration Example of Additional Information Generating Unit>

Figure 14:
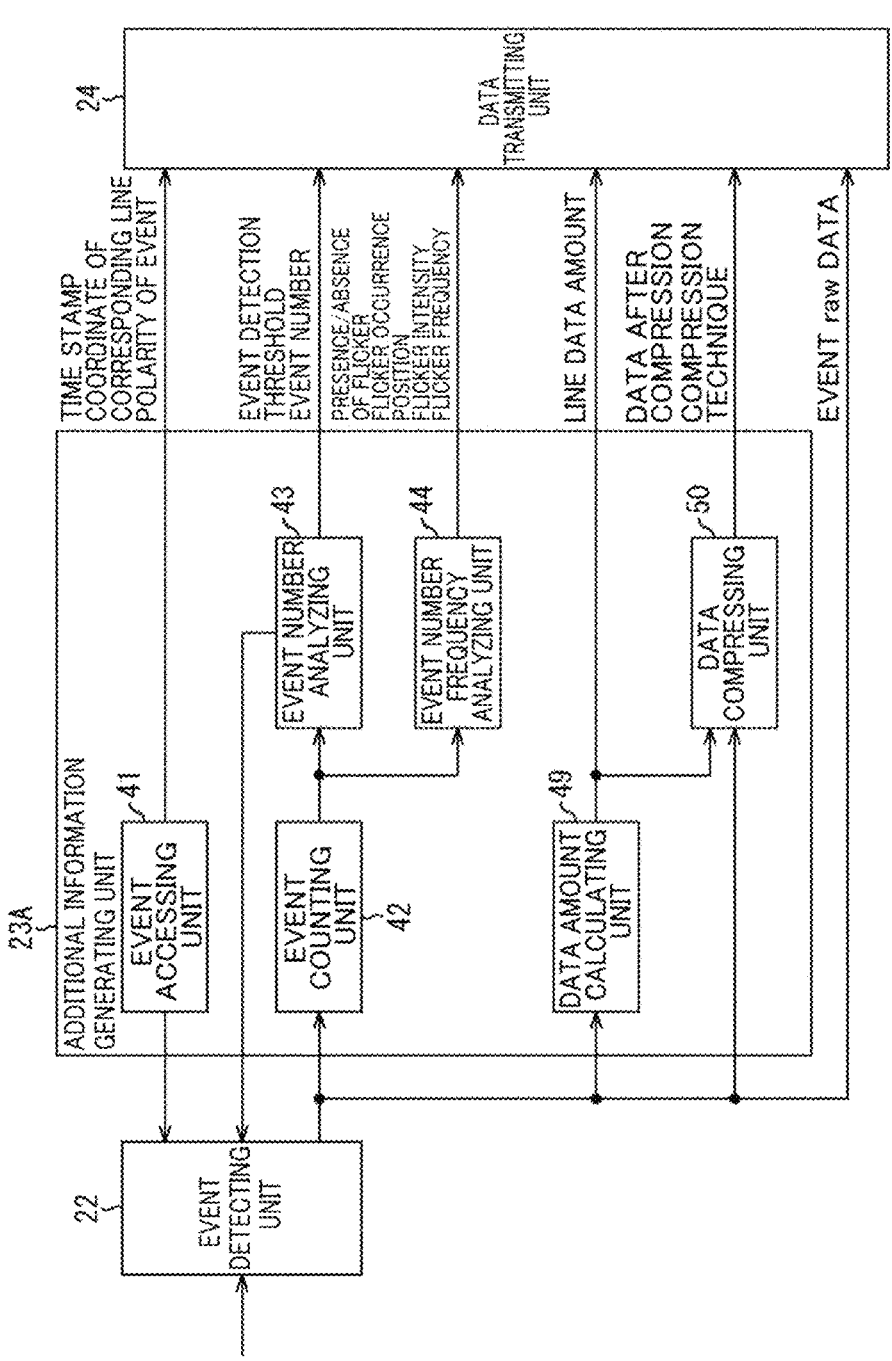
FIG. 14 is a block diagram illustrating a second configuration example of an additional information generating unit.

FIG. 14 is a block diagram illustrating a second configuration example of the additional information generating unit 23. In addition, in an additional information generating unit 23A illustrated in FIG. 14, the same reference signs will be assigned to components that are common to the additional information generating unit 23 illustrated in FIG. 7, and detailed description thereof will be omitted.

The additional information generating unit 23A illustrated in FIG. 14 generates line information that is added to a line as additional information that is additionally disposed in the event data.

For example, the additional information generating unit 23A generates information of line information itself, identification information of this line, and flicker information as line information.

As the information of the line information itself, a data amount (length) of the line information itself, an identifier used for identifying line information, and the like are used. As the identification information of this line, a time stamp and information representing coordinates (a position) of this line, a data amount (length) of this line, an event number (an activation rate and an attention level) of this line, an event detection threshold of this line, an event polarity of this line, a type of data (a type including a possibility other than an event), a compression technique, and the like are used. As the flicker information, information representing presence/ absence of a flicker in this line, an occurrence position of a flicker in this line, an intensity of a flicker of this line, a frequency of a flicker of this line is used.

In addition, the information of the line information itself can be given by the data transmitting unit 24. Furthermore, a part of such information may be stored in embedded data. In addition, this line may be one row or a plurality of rows.

For example, line information given for every 10 rows is inserted as line information of a first row among these 10 rows.

The additional information generating unit 23A is configured to include the event accessing unit 41, the event counting unit 42, the event number analyzing unit 43, and the event number frequency analyzing unit 44 to have a configuration similar to the additional information generating unit 23 illustrated in FIG. 7.

The additional information generating unit 23A is configured to include a data amount calculating unit 49 and a data compressing unit 50 to have a configuration different from the additional information generating unit 23 illustrated in FIG. 7.

The event accessing unit 41 generates a time stamp, coordinates of a line, and an event polarity of this line and supplies them to the data transmitting unit 24.

The event number analyzing unit 43 acquires an event number of a line, performs setting of an event detection threshold of this line, and supplies the event detection threshold of this line and the event number of this line to the data transmitting unit 24.

The event number frequency analyzing unit 44 acquires flicker information of this line representing presence/ab- sence of a flicker in this line, an occurrence position of a flicker in this line, an intensity of a flicker in this line, and a frequency of a flicker of the line and supplies the flicker information to the data transmitting unit 24.

The data amount calculating unit 49 calculates a line data amount that becomes a data amount of a line that becomes a processing target on the basis of event raw data supplied from the event detecting unit 22 and supplies the line data amount to the data transmitting unit 24 and the data com- pressing unit 50.

The data compressing unit 50 performs a data compress- ing process for compressing event raw data supplied from the event detecting unit 22 using a compression technique set in advance and supplies data after compression acquired as a result of the process to the data transmitting unit 24 together with the compression technique.

In this way the additional information generating unit 23A can supply the time stamp, the coordinates of a correspond- ing line, the event polarity of the line, the event detection threshold of the line, the event number of the line, the flicker information of the line, the line data amount of the line, the data after compression, and the compression technique to the data transmitting unit 24.

Figure 15:
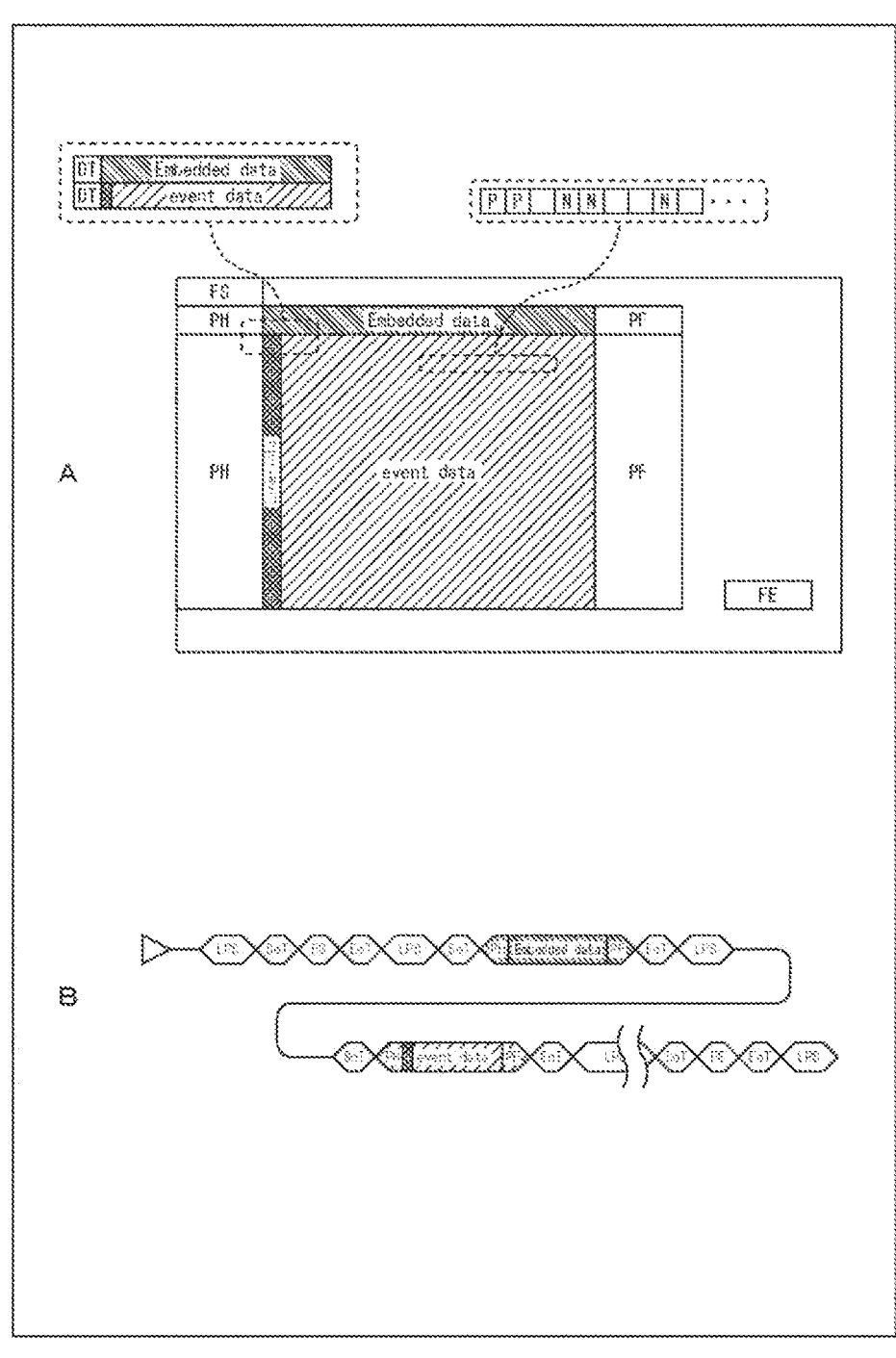
FIG. 15 is a diagram illustrating one example of a frame configuration in which line information is stored.

Then, the data transmitting unit 24 can store such infor- mation in a frame structure as illustrated in A of FIG. 15 as line information and transmit the information to the data processing device 13 through the data bus 14 together with event data. In B of FIG. 15, an output example of line information and event data output in compliance with the CSI-2 specification is illustrated.

In other words, as illustrated in FIG. 15, the data trans- mitting unit 24 stores line information in a beginning part of an area in which data is stored (that is, immediately after a packet header PH) in a long packet in which event data is stored for each line.

Figure 16:
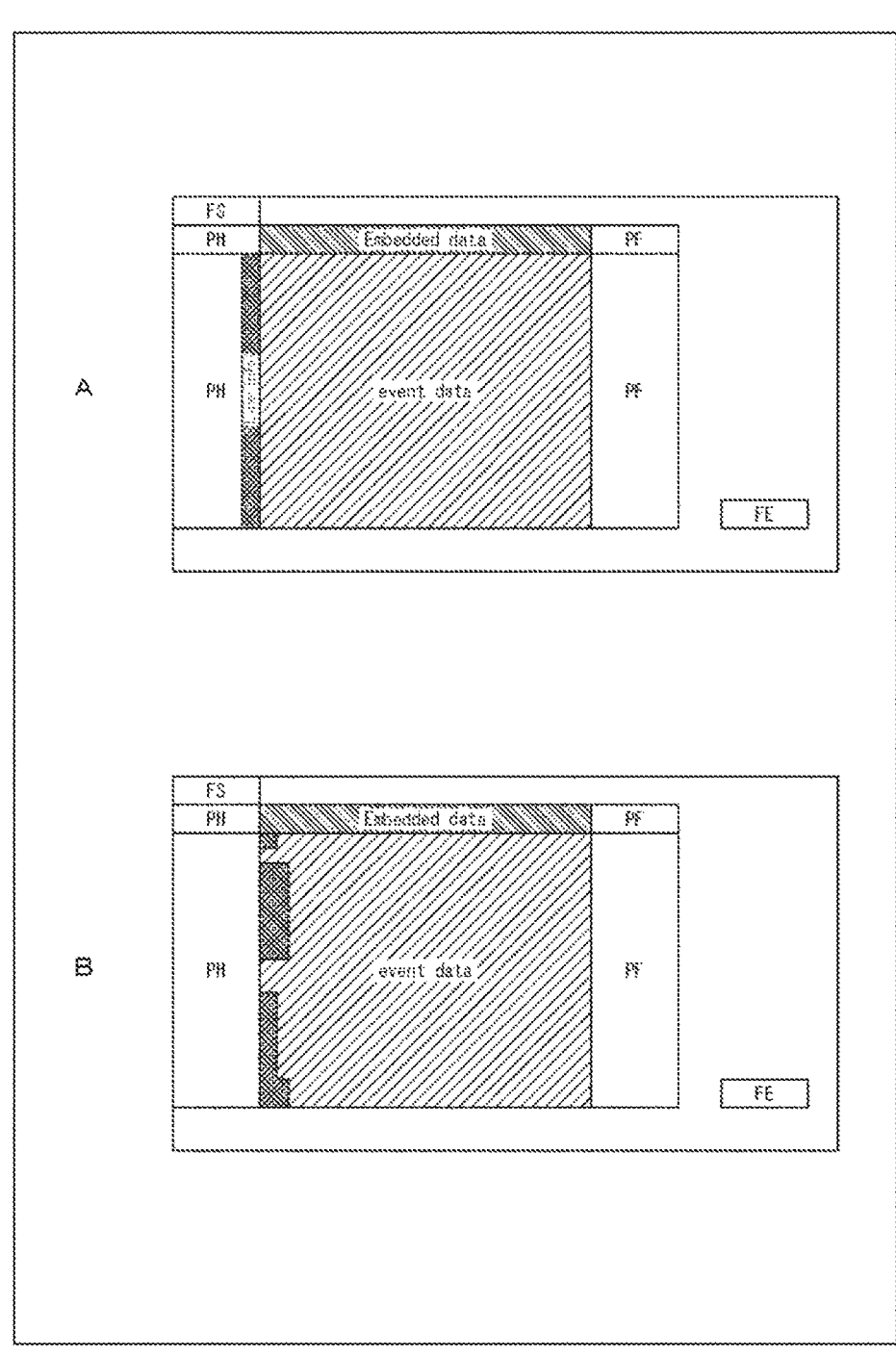
FIG. 16 is a diagram illustrating another example of a frame configuration in which line information is stored.

In addition, as illustrated in A of FIG. 16, line information may be configured to be included in the packet header PH. Furthermore, as illustrated in B of FIG. 16, a data length of the line information is arbitrary.

In this way although the insertion position, the insertion number of times, and the like of the line information are arbitrary in view of practical use, it is preferable that the line information be disposed in a beginning part of a line. In other words, in a case in which line information is infor- mation used for identifying event data, by transmitting the line information before the event data, the processing effi- ciency of the event data can be improved on the data processing device 13 side. In addition, by transmitting line information before event data, the data processing device 13 can handle the event data output from the EVS 12 while maintaining compatibility with a conventional specification.

The EVS 12 including the additional information gener- ating unit 23A configured as described above employs a frame structure in which line information is stored at a predetermined position of the line and can transmit the line information in an output format according to this frame structure. In other words, the EVS 12 transmits line infor- mation in a frame structure in which frame information is stored in a beginning part of payload data, and event data is configured as a part of the payload data. In accordance with this, the EVS 12 can further improve the versatility.

Then, by analyzing the packet header PH and the line information, the data processing device 13 can determine a process to be performed for the event data on the basis of details written in the line information.

<Modified Example of Second Configuration Example of Additional Information Generating Unit>

Figure 17:
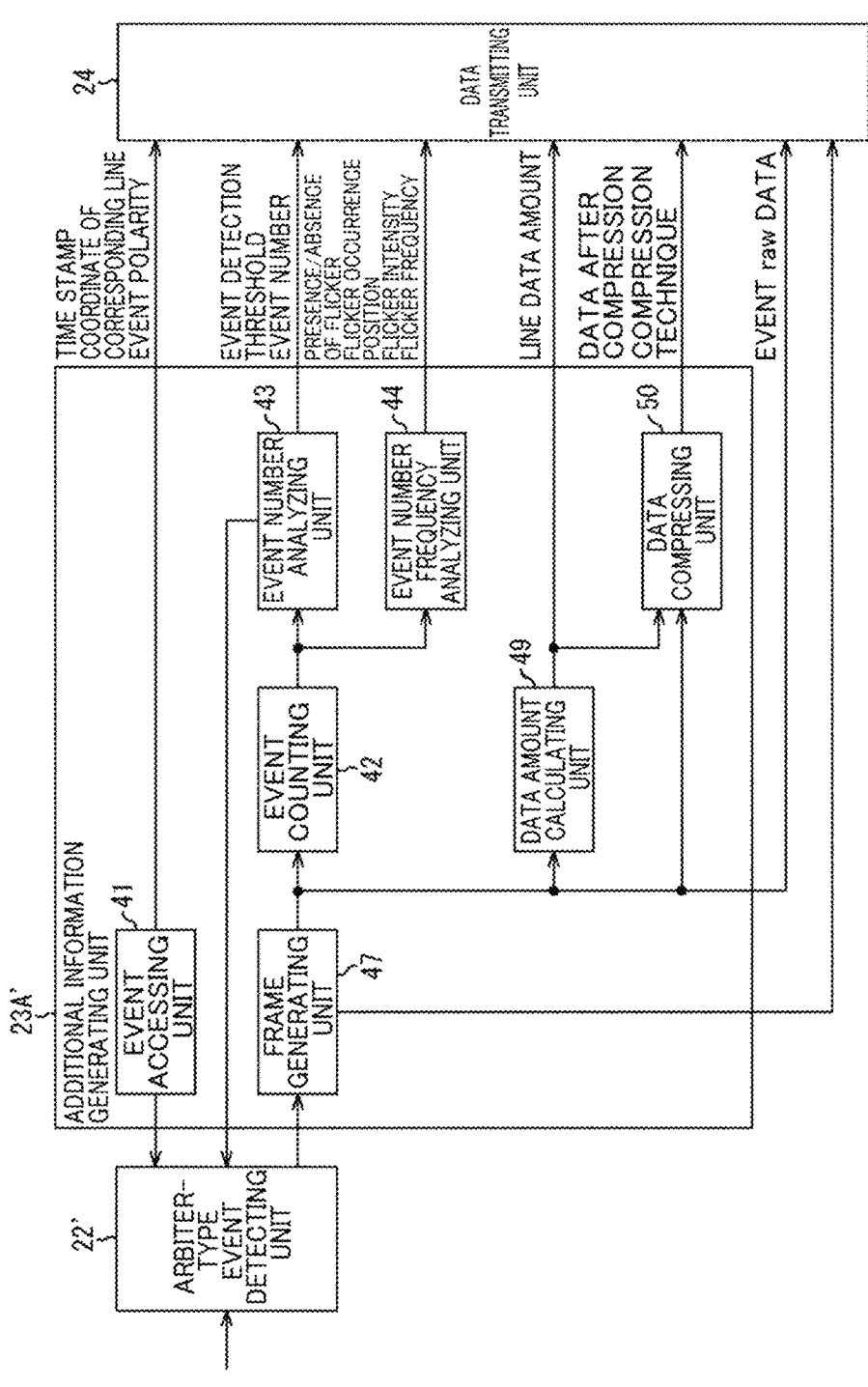
FIG. 17 is a block diagram illustrating a configuration example of an additional information generating unit corresponding to an arbiter type.

FIG. 17 is a block diagram illustrating a modified example of the second configuration example of the additional infor- mation generating unit 23. In addition, in an additional information generating unit 23A illustrated in FIG. 17, the same reference signs will be assigned to components that are common to the additional information generating unit 23A illustrated in FIG. 14, and detailed description thereof will be omitted.

For example, the event detecting unit 22 and the additional information generating unit 23A illustrated in FIG. 14 described above are of a scan type, and by outputting event data regardless of presence/absence of an occurrence of an event, one frame is configured. In contrast to this, an additional information generating unit 23A is configured to be in correspondence with an arbiter-type event detecting unit 22' that outputs event data only at a timing at which an event has occurred.

As illustrated in the drawing, the additional information generating unit 23A is configured to include the frame generating unit 47, which is a configuration different from that of the additional information generating unit 23A illustrated in FIG. 14. As described above with reference to FIG. 13, the frame generating unit 47 can temporarily store event data that has occurred in a period corresponding to a certain one frame in the SRAM 48 and output the event data that has occurred in the period corresponding to the one frame in the format of the frame.

<Third Configuration Example of Additional Information Generating Unit>

Figure 18:
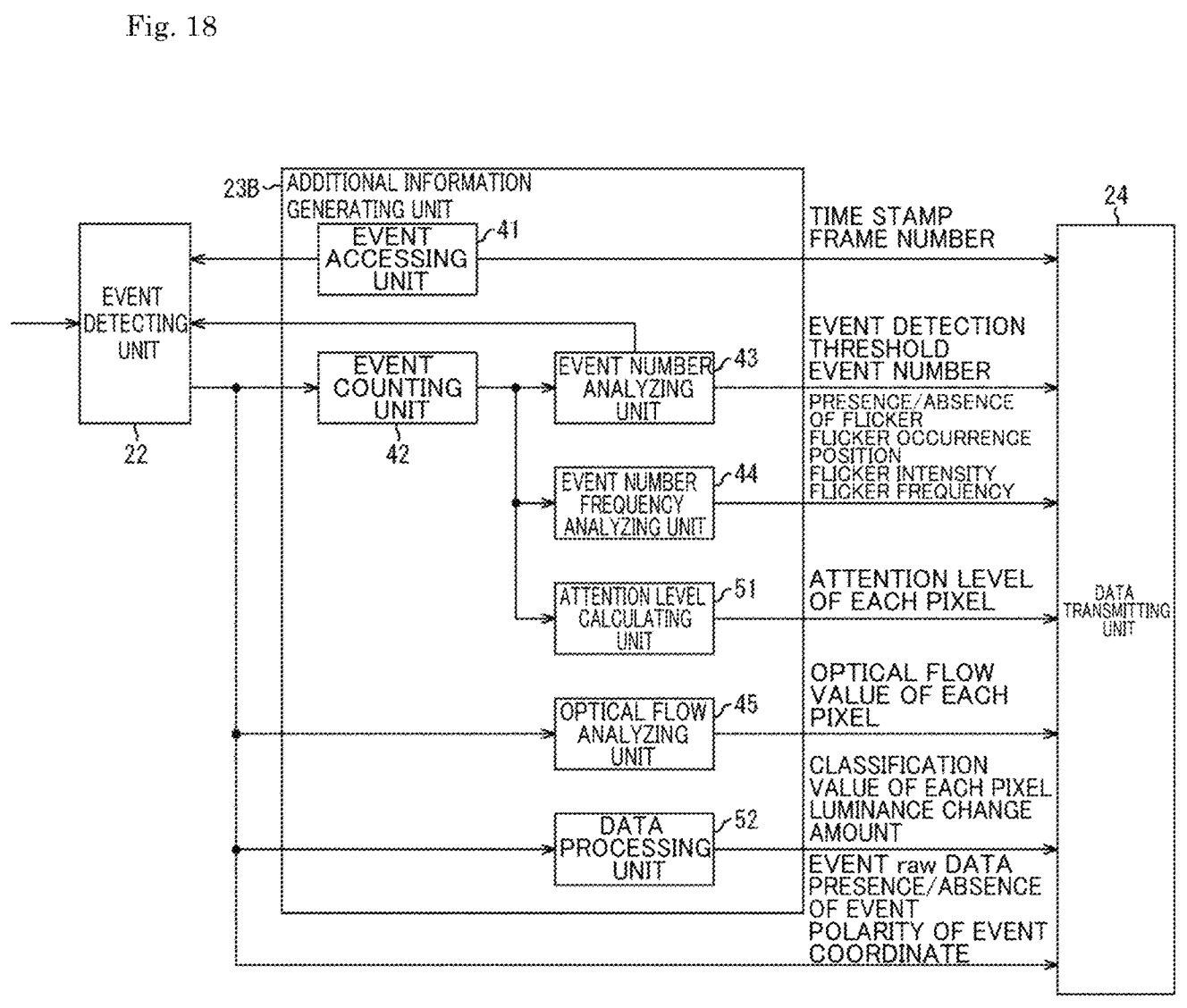

FIG. 18 is a block diagram illustrating a third configuration example of the additional information generating unit 23. In addition, in an additional information generating unit 23B illustrated in FIG. 18, the same reference signs will be assigned to components that are common to the additional information generating unit 23 illustrated in FIG. 7, and detailed description thereof will be omitted.

The additional information generating unit 23B illustrated in FIG. 18 generates pixel information that is added to a pixel as additional information that is additionally disposed in event data.

For example, the additional information generating unit 23B generates event information, flicker information, and information that is acquired from the event information as pixel information.

As the event information, a time stamp, coordinates, presence/absence of an event, a polarity of an event that has occurred, an event detection threshold, a luminance change amount, an event number (an activation rate), and the like are used. As the flicker information, information representing presence/absence of a flicker, an occurrence position of a flicker, an intensity of a flicker, and a frequency of a flicker is used. The information acquired from event information is information assigned to one pixel or an area over a plurality of pixels on the basis of an arithmetic operation based on event information of each pixel, and information representing an optical flow, an attention level, a classification value, and the like is used.

The additional information generating unit 23B is configured to include the event accessing unit 41, the event counting unit 42, the event number analyzing unit 43, the event number frequency analyzing unit 44, and the optical flow analyzing unit 45 to have a configuration similar to the additional information generating unit 23 illustrated in FIG. 7. The additional information generating unit 23B is configured to include an attention level calculating unit 51 and a data processing unit 52 to have a configuration different from the additional information generating unit 23 illustrated in FIG. 7.

The optical flow analyzing unit 45 acquires an optical flow value of each pixel on the basis of event raw data supplied from the event detecting unit 22 and supplies the optical flow value to the data transmitting unit 24.

The attention level calculating unit 51 calculates an attention level of each pixel on the basis of an event number supplied from the event counting unit 42 and supplies the calculated attention level to the data transmitting unit 24.

The data processing unit 52, for example, is configured using a neural network and the like, acquires a classification value and a luminance change amount of each pixel by performing data processing using machine learning based on event raw data supplied from the event detecting unit 22, and supplies them to the data transmitting unit 24.

Figure 19:
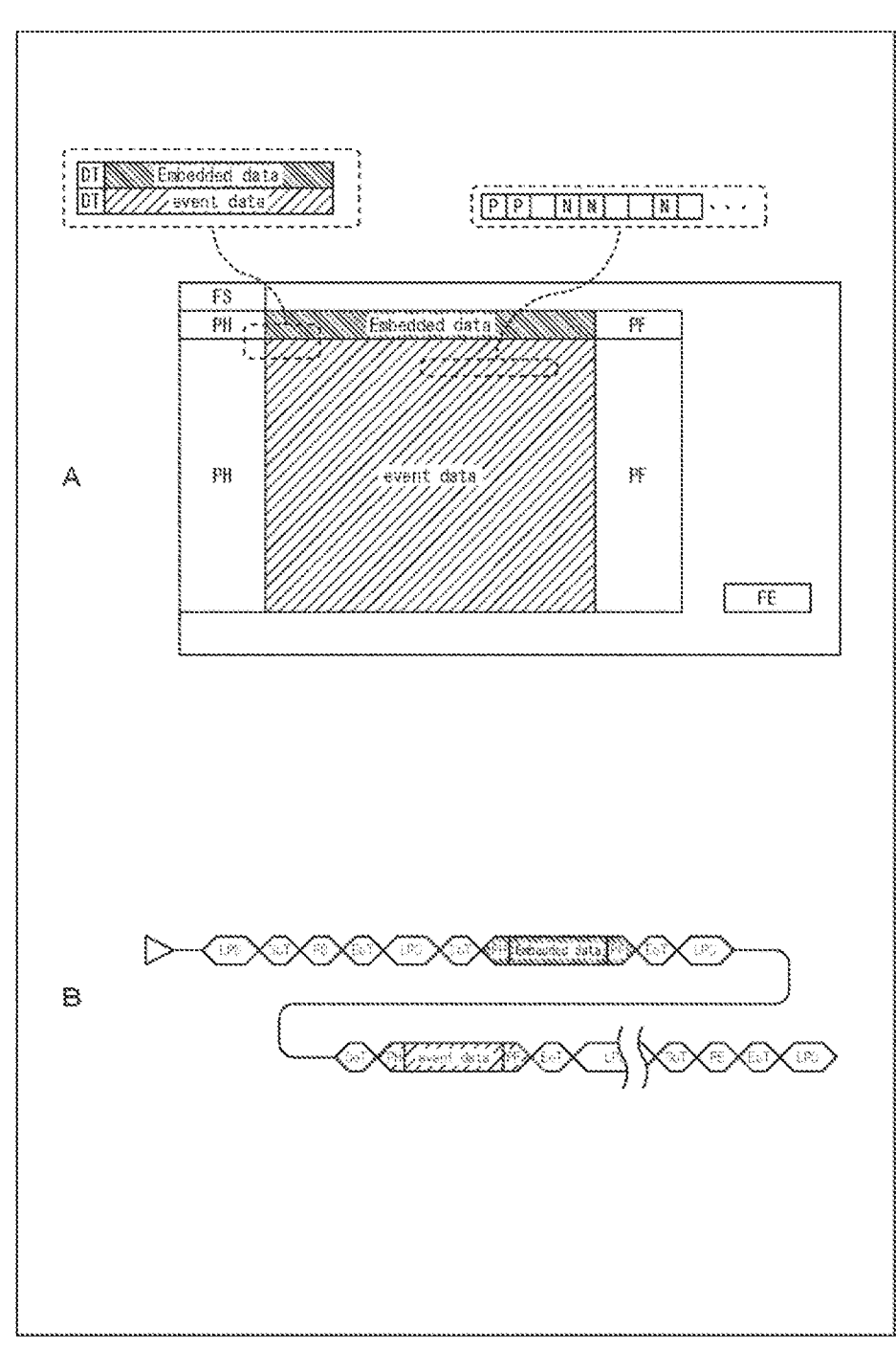
FIG. 19 is a diagram illustrating one example of a frame configuration in which pixel information is stored.

In this way the additional information generating unit 23B can supply a time stamp, a frame number, an event detection threshold, an event number, a flicker information, an attention level of each pixel, an optical flow value of each pixel, a luminance change amount, presence/absence of an event, and a polarity of an event to the data transmitting unit 24. Then, the data transmitting unit 24 can embed such information as pixel information in data of each pixel together with event data and store the information in a frame structure as illustrated in A of FIG. 19. In B of FIG. 19, an output example of event data (data in which pixel information is embedded for each pixel) output in compliance with the CSI-2 specification is illustrated.

In addition, the data transmitting unit 24 can insert mode information, which represents a data amount of certain bits that are used in data corresponding to one pixel, into a data type DT in accordance with a data amount of pixel information embedded in data of a pixel. For example, in a case in which the mode information is mode 1, the data amount of a pixel is two bits of 0/−/+, and in a case in which the mode information is mode 2, the data amount of a pixel is a necessary data amount a in addition to the two bits of 0/−/+. In accordance with this, the output of the EVS 12 can be flexibly changed in accordance with the use of an application, a necessary information amount, accuracy and the like.

A method of transmitting pixel information embedded in data of a pixel will be described with reference to FIG. 20.

In A of FIG. 20, one example of input data input from the event detecting unit 22 to the additional information generating unit 23B is illustrated. For example, "01" is input to positive event data, "10" is input to negative event data, and "00" is input to stay event data having no change of the luminance.

In B of FIG. 20, one example of data of a case in which only event data (+/−/stay) is transmitted using two bits or three bits is illustrated.

For example, only the event data (+/−/stay) is transmitted using two bits, "01" is input to positive event data, "10" is input to negative event data, and "00" is input to stay event data. In addition, only the event data (+/−/stay) is transmitted using three bits, "001" is input to stay/positive event data, "010" is input to positive/stay event data, "011" is input to positive/positive event data, "100" is input to stay/stay event data, "101" is input to stay/negative event data, "110" is input to negative/stay event data, and "111" is input to negative/negative event data.

In C of FIG. 20, one example of data of a case in which only event data (event/stay) is transmitted using two bits is illustrated. For example, "00" is input to stay event data, and "01" is input to event data representing an event occurrence.

In D of FIG. 20, one example of data of a case in which pixel information representing presence/absence of a flicker is transmitted using two bits is illustrated. For example, "00" is input to pixel information representing absence of a flicker, and "01" is input to pixel information representing presence of a flicker.

In E of FIG. 20, one example of data of a case in which pixel information representing an attention level is transmitted using two bits is illustrated. For example, "00" is input to pixel information representing no area of attention, and "01" is input to pixel information representing an area of attention.

In F of FIG. 20, one example of data of a case in which pixel information representing an optical flow value is transmitted using two bits is illustrated.

In accordance with such a method of transmitting data (a data format), the EVS 12 can select transmission of only event data and transmission of event data to which pixel information has been added. In addition, such selection (selection of a data length and details) can be fixedly performed using a fuse, a ROM, or the like or can be configured to be dynamically selectable in unit of frames. In a case in which transmission is configured to be dynamically selectable in units of frames, for example, frame information stored in the embedded data can be used.

The EVS 12 including the additional information generating unit 23B configured as described above employs a frame structure in which pixel information is embedded in the event data and can transmit pixel information in an output format according to this frame structure. In accordance with this, the EVS 12 can further improve versatility.

The data processing device 13 can be configured to include a circuit that determines presence/absence of switching between modes representing how many bits are used in data corresponding to one pixel on the basis of data acquired from the EVS 12 and generates a switching instruction signal to be transmitted to the EVS 12.

<Modified Example of Second Configuration Example of Additional Information Generating Unit>

Figure 21:
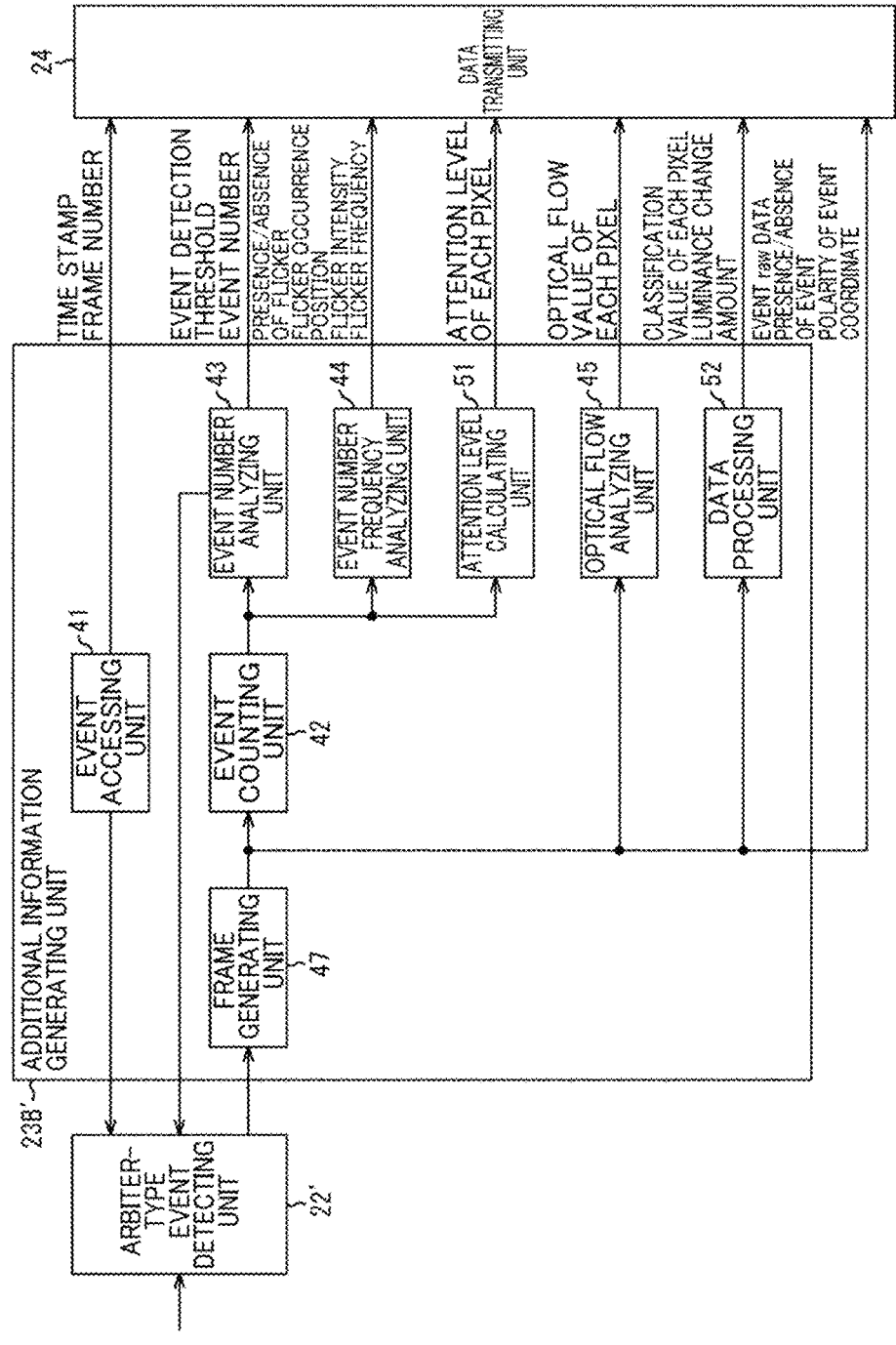
FIG. 21 is a block diagram illustrating a configuration example of an additional information generating unit corresponding to an arbiter type.

FIG. 21 is a block diagram illustrating a modified example of the second configuration example of the additional information generating unit 23. In addition, in an additional information generating unit 23B' illustrated in FIG. 21, the same reference signs will be assigned to components that are common to the additional information generating unit 23B illustrated in FIG. 18, and detailed description thereof will be omitted.

For example, the event detecting unit 22 and the additional information generating unit 23B illustrated in FIG. 18 described above are of a scan type, and by outputting event data regardless of presence/absence of an occurrence of an event, one frame is configured. In contrast to this, an additional information generating unit 23B' is configured to be in correspondence with an arbiter-type event detecting unit 22' that outputs event data only at a timing at which an event has occurred.

As illustrated in the drawing, the additional information generating unit 23B' is configured to include a frame generating unit 47, which is a configuration different from that of the additional information generating unit 23B illustrated in FIG. 18. As described above with reference to FIG. 13, the frame generating unit 47 can temporarily store event data that has occurred in a period corresponding to a certain one frame in the SRAM 48 and output the event data that has occurred in the period corresponding to the one frame in the format of the frame.

<Configuration for Switching between Plurality of Physical Layers>

A configuration example of the sensor system 11 that can perform switching between a plurality of physical layers will be described with reference to FIGS. 22 and 23.

For example, the sensor system 11 can use A-PHY that has a transmission distance of about 15 m and is a SerDes specification for connecting device inside of a vehicle as a physical layer used for transmitting data between the EVS 12 and the data processing device 13. In addition, the sensor system 11 may use a physical layer of a specification other than A-PHY (for example, C-PHY, D-PHY, or the like) and is configured to be able to perform switching between such physical layers.

Figure 22:
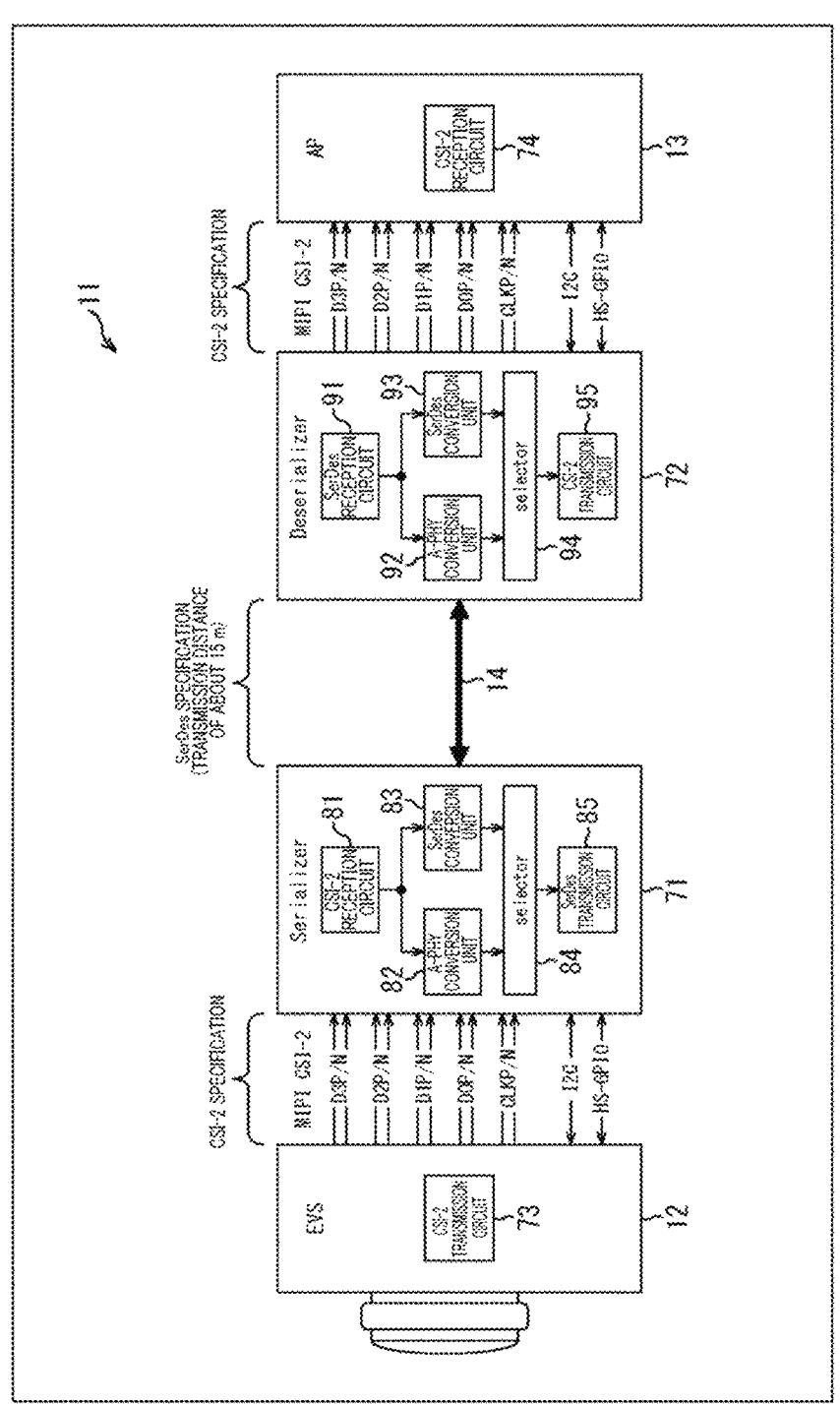
FIG. 22 is a block diagram illustrating a configuration example of a sensor system that is able to perform switching between physical layers in a serializer and a deserializer.

FIG. 22 illustrates a configuration example of a sensor system 11 having a function of performing switching between physical layers in a serializer and a deserializer.

As illustrated in FIG. 22, the sensor system 11 is configured to include a serializer 71 and a deserializer 72. The sensor system 11 is configured to perform communication using the CSI-2 specification between the EVS 12 and the serializer 71 and between the data processing device 13 and the deserializer 72 and perform communication through the data bus 14 between the serializer 71 and the deserializer 72.

The EVS 12 includes a CSI-2 transmission circuit 73 that corresponds to the data transmitting unit 24 illustrated in FIG. 1, and the data processing device 13 is configured to include a CSI-2 reception circuit 74 that corresponds to the data receiving unit 31 illustrated in FIG. 1.

The serializer 71 is configured to include a CSI-2 reception circuit 81, an A-PHY conversion unit 82, a SerDes conversion unit 83, a selector 84, and a SerDes transmission circuit 85.

In the serializer 71, event data transmitted from the CSI-2 transmission circuit 73 of the EVS 12 is received by the CSI-2 reception circuit 81 and is supplied to the A-PHY conversion unit 82 and the SerDes conversion unit 83. The A-PHY conversion unit 82 converts event data supplied from the CSI-2 reception circuit 81 in serial in compliance with the A-PHY specification and supplies the converted event data to the selector 84. The SerDes conversion unit 83 performs serial conversion of event data supplied from the CSI-2 reception circuit 81 in accordance with a general SerDes specification other than the A-PHY and supplies the converted event data to the selector 84. The selector 84, for example, in accordance with a predetermined selection signal, selects one of event data, which has been serially-converted, supplied from the A-PHY conversion unit 82 and event data, which has been serially-converted, supplied from the SerDes conversion unit 83 and supplies the selected event data to the SerDes transmission circuit 85. The SerDes transmission circuit 85 transmits the serially-converted event data selected by the selector 84 through the data bus 14.

The deserializer 72 is configured to include a SerDes reception circuit 91, an A-PHY conversion unit 92, a SerDes conversion unit 93, a selector 94, and a CSI-2 transmission circuit 95.

In the deserializer 72, event data transmitted through the data bus 14 is received by the SerDes reception circuit 91 and is supplied to the A-PHY conversion unit 92 and the SerDes conversion unit 93. The A-PHY conversion unit 92 performs de-serial conversion of event data supplied from the SerDes reception circuit 91 in accordance with the A-PHY specification and supplies the converted event data to the selector 94. The SerDes conversion unit 93 performs de-serial conversion, which corresponds to the serial conversion performed by the SerDes conversion unit 83, of event data supplied from the SerDes reception circuit 91 and supplies the converted event data to the selector 94. The selector 94, for example, selects one of event data supplied from the A-PHY conversion unit 92 and event data supplied from the SerDes conversion unit 93 in accordance with a predetermined selection signal and supplies selected event data to the CSI-2 transmission circuit 95. The CSI-2 transmission circuit 95 transmits the event data selected by the selector 94 to the CSI-2 reception circuit 74 of the data processing device 13.

By employing such a configuration, the sensor system 11 can perform switching between the serial conversion according to the A-PHY specification and the serial conversion according to the general SerDes specification in the serializer 71 and the deserializer 72. Then, switching between the A-PHY conversion unit 82 and the SerDes conversion unit 83 and switching between the A-PHY conversion unit 92 and the SerDes conversion unit 93 are performed such that serial conversion of the same specification is performed in the serializer 71 and the deserializer 72.

Figure 23:
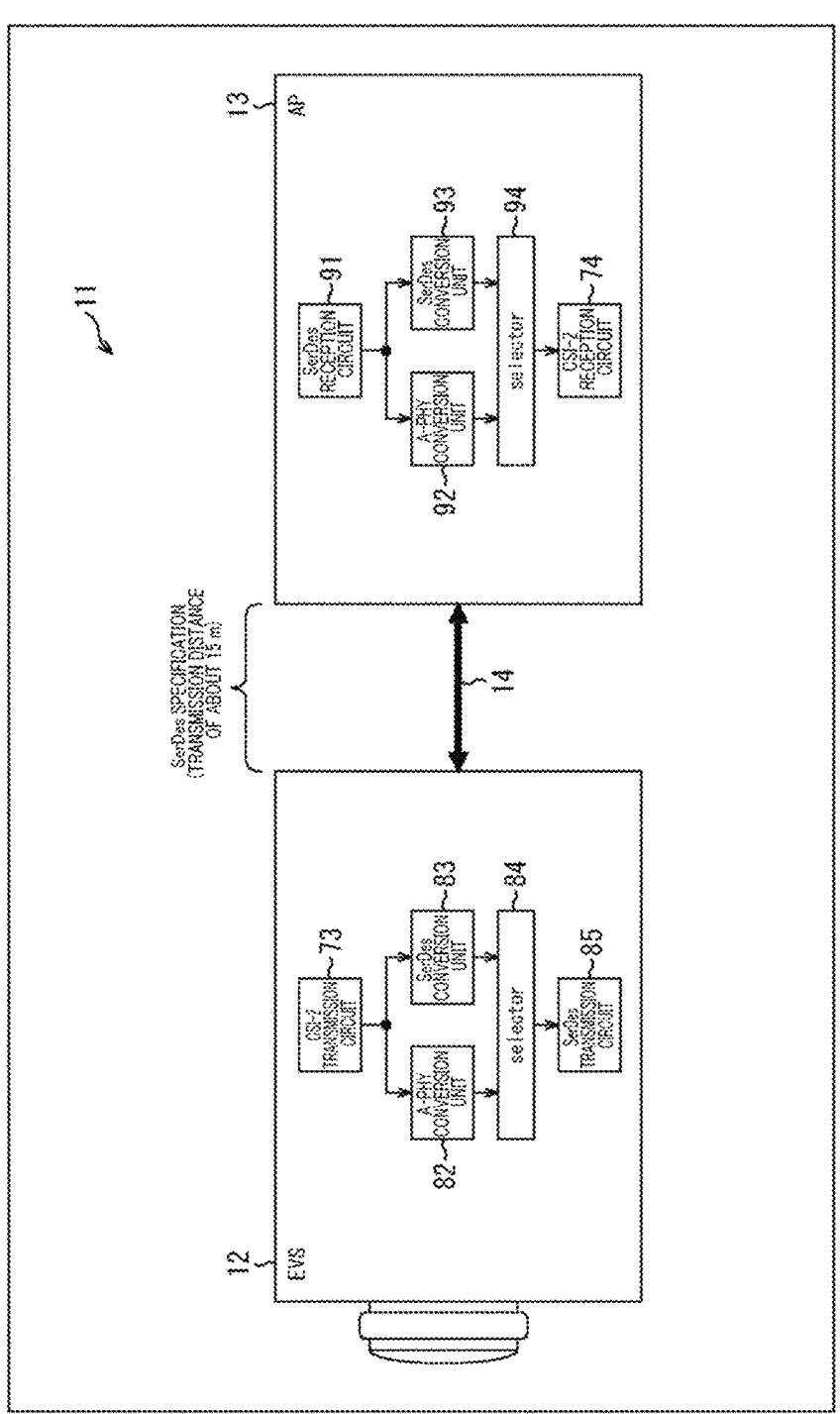
FIG. 23 is a block diagram illustrating a configuration example of a sensor system that is able to perform switching between physical layers in an EVS and a data processing device.

FIG. 23 illustrates a configuration example of a sensor system 11 having a function of switching between physical layers in an EVS 12 and a data processing device 13.

As illustrated in FIG. 23, the EVS 12 is configured to include a CSI-2 transmission circuit 73, A-PHY conversion unit 82, a SerDes conversion unit 83, a selector 84, and a SerDes transmission circuit 85. The data processing device 13 is configured to include a CSI-2 reception circuit 74, a SerDes reception circuit 91, an A-PHY conversion unit 92, a SerDes conversion unit 93, and a selector 94.

By employing such a configuration, the sensor system 11 can perform switching between the serial conversion according to the A-PHY specification and the serial conversion according to the general SerDes specification in the EVS 12 and the data processing device 13. Then, switching between the A-PHY conversion unit 82 and the SerDes conversion unit 83 and switching between the A-PHY conversion unit 92 and the SerDes conversion unit 93 are performed such that serial conversion of the same specification is performed in the EVS 12 and the data processing device 13.

<Configuration Example of Electronic Device>

A configuration example of an electronic device including the EVS 12 will be described with reference to FIGS. 24 to 27.

Figure 24:
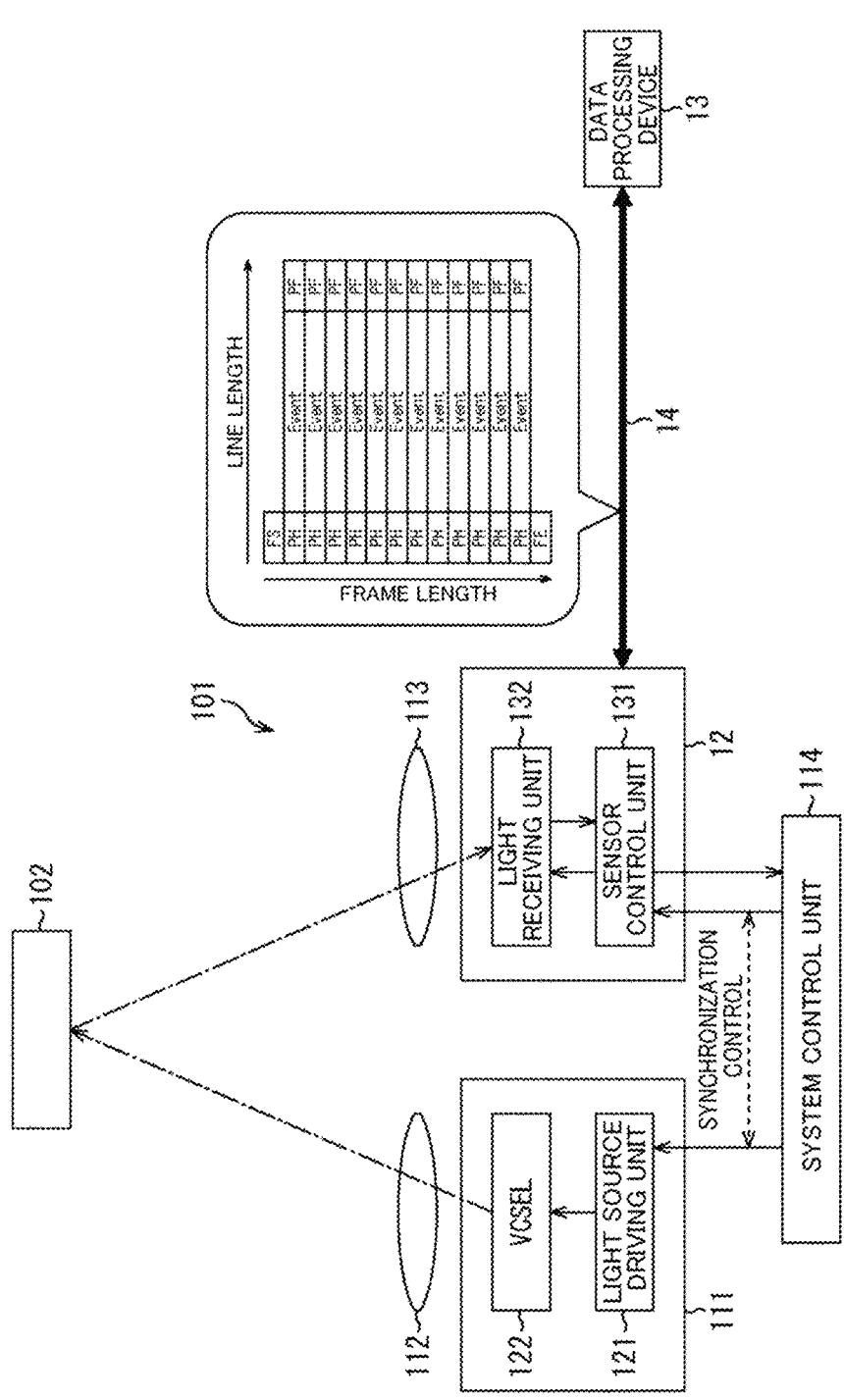
FIG. 24 is a diagram describing a configuration example of an electronic device including an EVS.

FIG. 24 is a block diagram illustrating a configuration example of an electronic device 101 including the EVS 12.

As illustrated in FIG. 24, the electronic device 101 including the EVS 12 is configured to include a laser light source 111, an emission lens 112, an imaging lens 113, the EVS 12, and a system control unit 114.

The laser light source 111, as illustrated in FIG. 24, for example, is configured from a Vertical Cavity Surface Emitting Laser (VCSEL) 122 and a light source driving unit 121 that drives the VCSEL 122. However, the laser light source is not limited to the VCSEL 122, and various light sources such as a light emitting diode (LED) and the like may be used. In addition, the laser light source 111 may be any one of a point light source, a planar light source, or a linear light source. In the case of a planar light source or a linear light source, the laser light source 111, for example, may have a configuration in which a plurality of point light sources (for example, VCSELs) are arranged in one or two dimensions.

In addition, in this embodiment, the laser light source 111, for example, may emit light of a wavelength band different from a wavelength band of visible light such as infrared (IR) light or the like.

The emission lens 112 is disposed on an emission face side of the laser light source 111 and converts light emitted from the laser light source 111 into emission light of a predetermined enlargement angle.

The imaging lens 113 is disposed on a light reception face side of the EVS 12 and forms an image according to incident light on the light reception face of the EVS 12. In incident light, reflection light that is emitted from the laser light source 111 and is reflected by the subject 102 may be included as well.

The EVS 12, as illustrated in FIG. 24, for example, is configured from a light receiving unit 132 in which pixels detecting events (hereinafter, referred to as event pixels) are arranged in a two-dimensional lattice shape and a sensor control unit 131 that generates frame data based on event data detected by the event pixels by driving the light receiving unit 132.

The system control unit 114, for example, is configured using a processor (CPU) and drives the VCSEL 122 through the light source driving unit 121. In addition, the system control unit 114 acquires event data detected in accordance with on/off of the laser light source 111 by controlling the EVS 12 in synchronization with control of the laser light source 111.

For example, emission light emitted from the laser light source 111 is projected to the subject 102 by passing though the emission lens 112. This projected light is reflected by the subject 102. Then, light reflected by the subject 102 is incident in the EVS 12 by passing through the imaging lens 113. The EVS 12 generates event data by receiving reflection light reflected by the subject 102 and generates frame data that is one image on the basis of the generated event data.

The frame data generated by the EVS 12 is supplied to the data processing device 13 through the data bus 14. As illustrated in the drawing, in a configuration in which a frame header FS indicating the beginning of the frame data, a line header PH indicating the beginning of each piece of line data, a line footer PF indicating the end of each piece of line data, line data Event interposed between the line header PH and line footer PF, and a frame footer FE indicating the end of the frame data are output, line data Event of all the lines composing the frame data is included between the frame header FS and the frame footer FE. In addition, in each piece of line data Event, in addition to event data (such as a positive event, a negative event, or no presence of events) for all pixels constituting the line, flags and the like indicating an y address representing the position of the line, whether the line data is uncompressed data, compressed data using a certain encoding method, and a processing result of a certain signal process may be included.

The data processing device 13 configured from an application processor and the like performs predetermined processes such as an image process, a recognition process, and the like on frame data input from the EVS 12.

Figure 25:
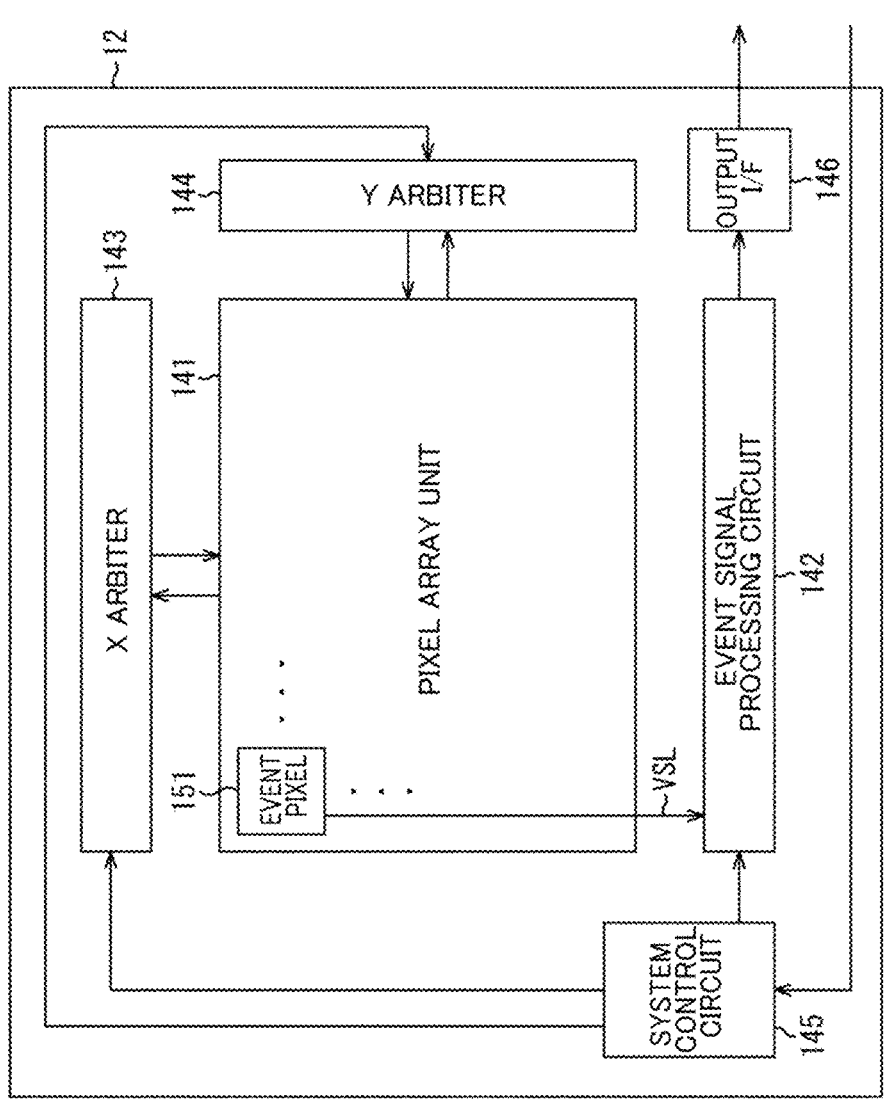
FIG. 25 is a block diagram illustrating a schematic configuration example of an EVS.

FIG. 25 is a block diagram illustrating a schematic configuration example of the EVS 12.

For example, a pixel array unit 141, an X arbiter 143, and a Y arbiter 144 illustrated in FIG. 25 correspond to the luminance detecting unit 21 and the arbiter-type event detecting unit 22' described above. In addition, as functions of the event signal processing circuit 142 and the system control circuit 145 illustrated in FIG. 25, the additional information generating unit 23' described above are embedded, and the output interface 146 illustrated in FIG. 25 corresponds to the data transmitting unit 24 described above.

As illustrated in FIG. 25, the EVS 12 is configured to include a pixel array unit 141, an X arbiter 143, a Y arbiter 144, an event signal processing circuit 142, a system control circuit 145, and an output interface (I/F) 146.

The pixel array unit 141 has a configuration in which a plurality of event pixels 151 each detecting events on the basis of changes in the luminance of incident light are arranged in a two-dimensional lattice shape. In the following description, a row direction (also referred to as a row direction) refers to an arrangement direction of pixels of a pixel row (in the drawing, a horizontal direction), and a column direction (also referred to as a column direction) refers to an arrangement direction of pixels of a pixel column (in the drawing, a vertical direction).

Each event pixel 151 includes a photoelectric conversion element that generates electric charge corresponding to the luminance of incident light, in a case in which a change in the luminance of incident light is detected on the basis of an optical current start to flow from the photoelectric conversion element, outputs a request for reading data from it to the X arbiter 143 and the Y arbiter 144, and outputs an event signal indicating detection of an event in accordance with arbitration according to the X arbiter 143 and the Y arbiter 144.

Each event pixel 151 detects presence/absence of an event in accordance with an occurrence/no-occurrence of a change exceeding a predetermined threshold in an optical current corresponding to the luminance of incident light. For example, each event pixel 151 detects a luminance change exceeding a predetermined threshold (a positive event) or a luminance change below the predetermined threshold (a negative event) as an event.

When an event is detected, the event pixel 151 outputs a request for a permission for output of an event signal representing an occurrent of the event to the X arbiter 143 and the Y arbiter 144. Then, in a case in which a response indicating a permission for output of an event signal is received from each of the X arbiter 143 and the Y arbiter 144, the event pixel 151 outputs an event signal to the event signal processing circuit 142.

Each of the X arbiter 143 and the Y arbiter 144 arbitrates the request for output of an event signal supplied from each of a plurality of event pixels 151 and transmits a response based on an arbitration result thereof (permission/no-permission of output of the event signal) and a reset signal for resetting detection of an event to the event pixel 151 that has output the request.

The event signal processing circuit 142 generates event data by performing predetermined signal processing on an event signal input from the event pixel 151 and outputs the generated event data.

As described above, a change in the optical current generated by the event pixel 151 can also be perceived as an optical quantity change (luminance change) of light incident in the photoelectric conversion unit of the event pixel 151. Thus, an event can also be described as an optical quantity change (a luminance change) of an event pixel 151 that exceeds a predetermined threshold. In the event data representing an occurrence of an event, at least position information such as coordinates indicating a position of the event pixel 151 at which an optical quantity change as an event has occurred is included. In the event data, in addition to position information, a polarity of the optical quantity change can be configured to be included.

For a series of event data output at a timing at which an event has occurred from an event pixel 151, as long as an interval between pieces of event data is maintained to be an interval at the time of an occurrence of an event, the event data can be regarded to implicitly include time information indicating a relative time at which an event has occurred.

However, when an interval between pieces of event data is not maintained to be the interval at the time of an occurrence of an event in accordance with storage of the event data in a memory or the like, the time information that is implicitly included in the event data disappears. For this reason, before an interval between pieces of event data is not maintained to be that at the time of an occurrence of an event, the event signal processing circuit 142 may include time information representing a relative time at which the event has occurred such as a time stamp or the like in the event data.

Figure 26:
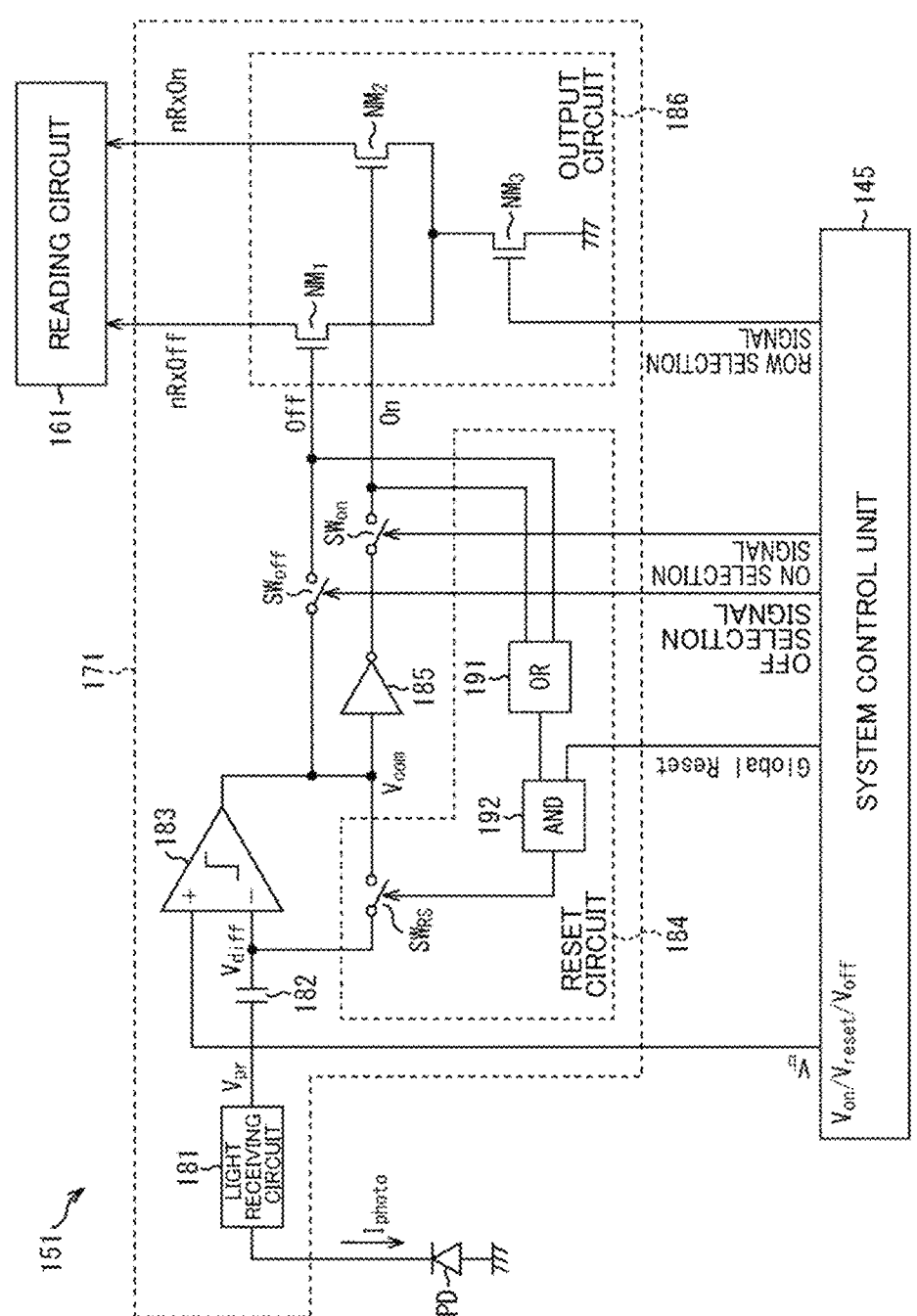
FIG. 26 is a circuit diagram illustrating a schematic configuration example of an event pixel.

FIG. 26 is a circuit diagram illustrating a schematic configuration example of the event pixel 151. In FIG. 26, a configuration example of a case in which one comparator performs detection of a positive event and detection of a negative event in a time divisional manner is illustrated.

Here, for example, events may include a positive event indicating that an amount of change in the optical current has exceeded an upper limit threshold and a negative event indicating that an amount of change thereof has been below a lower limit threshold. In that case, event data representing an occurrence of an event, for example, may include one bit representing the occurrence of the event and one bit representing a polarity of the event that has occurred. In addition, the event pixel 151 may be configured to have a function for detecting only a positive event or may be configured to have a function for detecting only a negative event.

As illustrated in FIG. 26, the event pixel 151, for example, includes a photoelectric conversion unit PD and an address event detecting circuit 171. The photoelectric conversion unit PD, for example, is configured using a photodiode and the like and causes electric charge generated in accordance with photoelectric conversion of incident light to flow out as an optical current $I_{photo}$.

The optical current $I_{photo}$ that has flown out flows into the address event detecting circuit 171.

The address event detecting circuit 171 includes a light receiving circuit 181, a memory capacity 182, a comparator 183, a reset circuit 184, an inverter 185, and an output circuit 186.

The light receiving circuit 181, for example, is configured from a current/voltage conversion circuit and converts the optical current $I_{photo}$ that has flown out from the photoelectric conversion unit PD into a voltage $V_{pr}$. Here, a relation of a voltage $V_{pr}$ with respect to an intensity (luminance) of light is generally a relation of logarithm. In other words, the light receiving circuit 181 converts an optical current $I_{photo}$ corresponding to the intensity of light emitted to a light receiving surface of the photoelectric conversion unit PD into a voltage $V_{pr}$ that is a logarithmic function. However, the relation between the optical current $I_{photo}$ and the voltage $V_{pr}$ is not limited to the relation of logarithm.

The voltage $V_{pr}$ corresponding to the optical current $I_{photo}$ output from the light receiving circuit 181 passes through the memory capacity 182 and becomes an inverting (−) input that is a first input of the comparator 183 as a voltage $V_{diff}$. Generally, the comparator 183 is configured using differential pair transistors. The comparator 183 has a threshold voltage $V_b$ given from the system control circuit 145 to be a non-inverting (+) input that is a second input and performs detection of a positive event and detection of a negative event in a time divisional manner. In addition, after detection of a positive event/a negative event, the event pixel 151 is reset using the reset circuit 184.

The system control circuit 145, as a threshold voltage $V_b$, outputs a voltage $V_{on}$ in a stage in which a positive event is detected, outputs a voltage $V_{off}$ in a stage in which a negative event is detected, and outputs a voltage $V_{reset}$ in a stage in which resetting is performed in a time divisional manner. The voltage $V_{reset}$ is set to a value between the voltage $V_{on}$ and the voltage $V_{off}$, preferably, an intermediate value between the voltage $V_{on}$ and the voltage $V_{off}$. Here, "the intermediate value" has a meaning including also a case of a substantially intermediate value in addition to a case of a precise intermediate value, and presence of various variations occurring in designing or manufacturing is allowed.

In addition, the system control circuit 145 outputs an on-selection signal to the event pixel 151 in a state in which a positive event is detected, outputs an off-selection signal thereto in a state in which a negative event is detected, and outputs a global reset signal (Global Reset) thereto in a stage in which resetting is performed. The on-selection signal is given to a selection switch $SW_{on}$ disposed between the inverter 185 and the output circuit 186 as a control signal thereof. The off-selection signal is given to a selection switch $SW_{off}$ disposed between the comparator 183 and the output circuit 186 as a control signal thereof.

In the stage in which a positive event is detected, the comparator 183 compares the voltage $V_{on}$ with a voltage $V_{diff}$, when the voltage $V_{diff}$ exceeds the voltage $V_{on}$, outputs positive event information On indicating that a change amount of the optical current $I_{photo}$ exceeds an upper limit threshold as a result of the comparison. The positive event information On is inverted by the inverter 185 and then is supplied to the output circuit 186 through the selection switch $SW_{on}$.

In the stage in which a negative event is detected, the comparator 183 compares the voltage $V_{off}$ with the voltage $V_{diff}$, when the voltage $V_{diff}$ is below the voltage $V_{off}$, outputs negative event information Off indicating that a change amount of the optical current $I_{photo}$ is below a lower limit threshold as a result of the comparison. The negative event information Off is supplied to the output circuit 186 through the selection switch $SW_{off}$.

The reset circuit 184 is configured to have a reset switch $SW_{RS}$, a two-input OR circuit 191, and a two-input AND circuit 192. The reset switch $SW_{RS}$ is connected between the inverting (−) input terminal and the output terminal of the comparator 183 and selectively forms a short circuit between the inverting input terminal and the output terminal by being in an on (closed) state.

The OR circuit 191 has the positive event information On that has passed through the selection switch $SW_{on}$ and the negative event information Off that has passed through the selection switch $SW_{off}$ as two inputs. The AND circuit 192 has an output signal of the OR circuit 191 as one input and a global reset signal given from the system control circuit 145 as the other input and causes the reset switch $SW_{RS}$ to be in the on (closed) state when one of the positive event information On or the negative event information Off is detected, and the global reset signal is in an active state.

In this way in accordance with the output signal of the AND circuit 192 becomes the active state, the reset switch $SW_{RS}$ forms a short circuit between the inverting input terminal and the output terminal of the comparator 183 and performs global resetting of the event pixel 151. In accordance with this, a reset operation is performed only for event pixels 151 in which an event has been detected.

The output circuit 186 is configured to have a negative-event output transistor $NM_1$, a positive-event output transistor $NM_2$, and a current source transistor $NM_3$. The negative-event output transistor $NM_1$ has a memory (not illustrated) used for maintaining the negative event information Off in a gate part thereof.

This memory is formed from gate parasitic capacitance of the negative-event output transistor $NM_1$.

Similar to the negative-event output transistor $NM_1$, the positive-event output transistor $NM_2$ has a memory (not illustrated) used for maintaining the positive event information On in a gate part thereof. This memory is formed from gate parasitic capacitance of the positive-event output transistor $NM_2$.

In the reading stage, the negative event information Off stored in the memory of the negative-event output transistor $NM_1$ and the positive event information On stored in the memory of the positive-event output transistor $NM_2$ are transmitted to the reading circuit 161 respectively through the output line nRxOff and the output line nRxOn for each pixel row of the pixel array unit 141 by applying a row selection signal from the system control circuit 145 to the gate electrode of the current source transistor $NM_3$. The reading circuit 161, for example, is a circuit disposed inside of the event signal processing circuit 142 (see FIG. 25).

As described above, the event pixel 151 is configured to have an event detecting function for performing detection of a positive event and detection of a negative event in a time divisional manner under control of the system control circuit 145 using one comparator 183.

Figure 27:
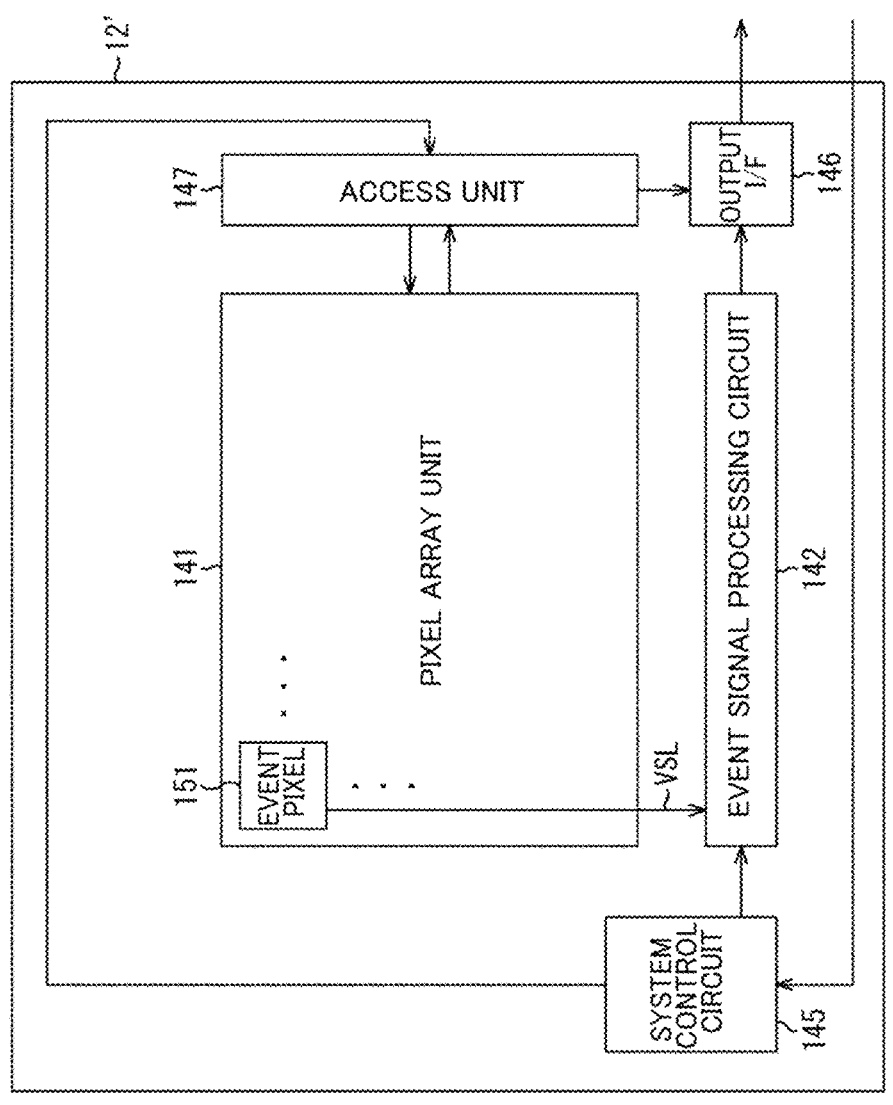
FIG. 27 is a block diagram illustrating a configuration example of an EVS of a scanning type.

FIG. 27 illustrates a configuration example of an EVS 12' of a scan type.

As illustrated in FIG. 27, the EVS 12' of the scan type is configured to include an accessing unit 147 in place of the X arbiter 143 and the Y arbiter 144 included in the EVS 12 of the arbiter type illustrated in FIG. 25. In other words, the EVS 12' includes the pixel array unit 141, the event signal processing circuit 142, the system control circuit 145, and the output interface 146 to have a configuration common to the EVS 12 illustrated in FIG. 25.

The accessing unit 147, for example, corresponds to the event accessing unit 41 illustrated in FIG. 7 and instructs each event pixel 151 of the pixel array unit 141 a timing at which event data is scanned.

<Configuration Example of Sensor System Including Plurality of Sensors>

A configuration example of a sensor system including a plurality of sensors will be described with reference to FIGS. 28 to 33.

Figure 28:
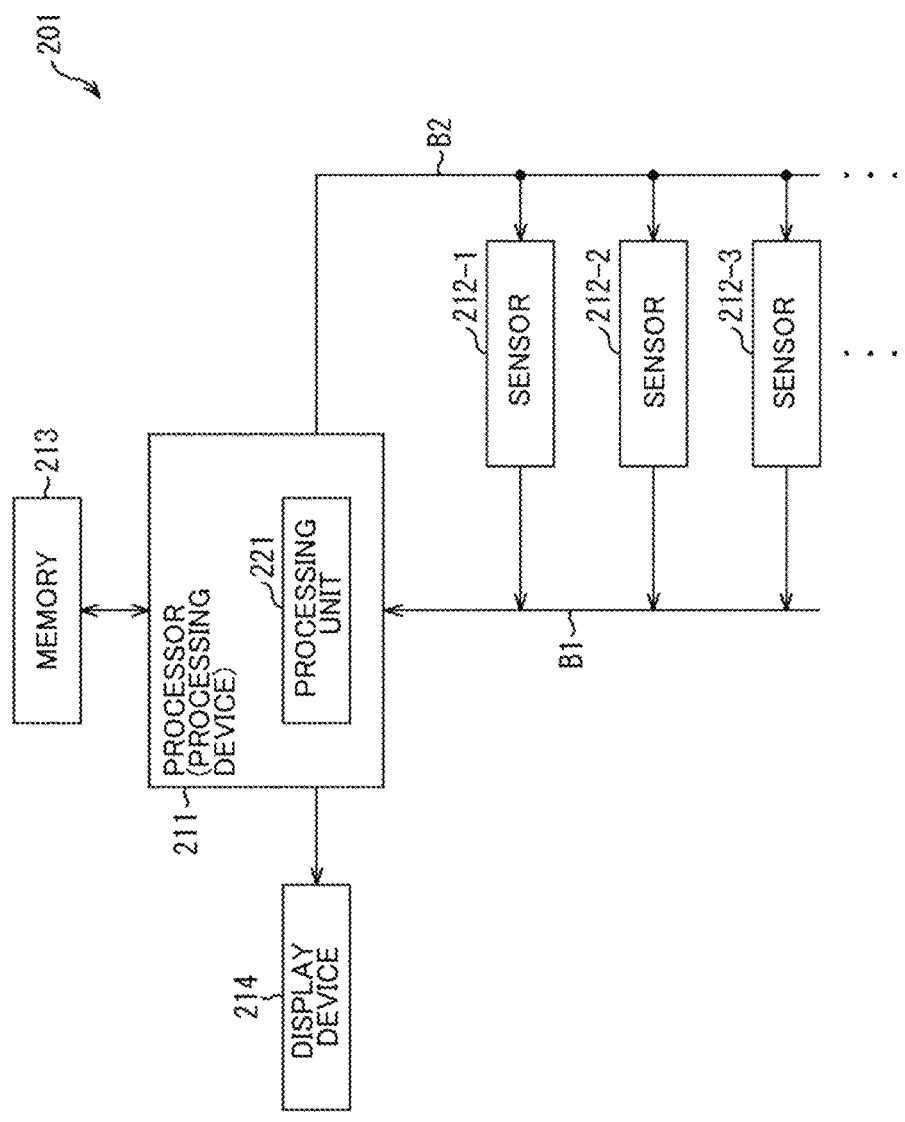
FIG. 28 is a block diagram illustrating a configuration example of a sensor system including a plurality of sensors.

For example, the EVS 12 described above can be used as all or one or more of sensors 212 illustrated in FIG. 28. In addition, a processor 211 illustrated in FIG. 28 corresponds to the data processing device 13 described above, and a data bus B1 illustrated in FIG. 28 corresponds to the data bus 14 described above.

FIG. 28 is an explanatory diagram illustrating one example of the configuration of a sensor system 201 according to this embodiment. Examples of the sensor system 201 include a communication device such as a smartphone, a drone (a device that is able to perform an operation according to a remote operation or an autonomous operation), a moving body such as a vehicle, and the like. In addition, an application example of the sensor system 201 is not limited to the examples described above.

The sensor system 201, for example, includes a processor 211, a plurality of sensors 212-1, 212-2, 212-3, . . . having a function for outputting an image, a memory 213, and a display device 214. Hereinafter, the plurality of sensors 212-1, 212-2, 212-3, . . . collectively or one sensor among the plurality of sensors 212-1, 212-2, 212-3, . . . representatively may be referred to as a "sensor 212".

In addition, although the sensor system 201 having three or more sensors 212 is illustrated in FIG. 28, the number of sensors 212 included in the system according to this embodiment is not limited to that of the example illustrated in FIG. 28. For example, the system according to this embodiment may an arbitrary number of sensors 212 which is two or more such as two sensors 212, three sensors 212, or the like.

Hereinafter, for the convenience of description, a case in which images are output from two sensors 212 among the plurality of sensors 212 included in the sensor system 201 or a case in which images are output from three sensors 212 among the plurality of sensors 212 included in the sensor system 201 will be described as an example.

The processor 211 and each of the plurality of sensors 212 are electrically connected to each other through one data bus B1. The data bus B1 is a transmission line of one signal that connects the processor 211 and each sensor 212. For example, data representing an image output from each sensor 212 (hereinafter, it may be referred to as "image data") is transmitted from the sensor 212 to the processor 211 through the data bus B1.

In the sensor system 201, a signal transmitted using the data bus B1, for example, is transmitted using an arbitrary specification in which start and end of data to be transmitted are identified using predetermined data such as the CSI-2 specification, PCI Express, or the like. Examples of the predetermined data described above include a frame start packet according to the CSI-2 specification, a frame end packet according to the CSI-2 specification, and the like.

Hereinafter, an example in which a signal to be transmitted through the data bus B1 is transmitted in compliance with the CSI-2 specification will be illustrated.

In addition, the processor 211 and each of the plurality of sensors 212 are electrically connected to each other through a control bus B2 different from the data bus B1. The control bus B2 is a transmission line of other signals that connects the processor 211 and each sensor 212. For example, control information (to be described below) output from the processor 211 is transmitted from the processor 211 to the sensor 212 through the control bus B2.

Hereinafter, an example in which, similar to the data bus B1, a signal transmitted using the control bus B2 is transmitted in compliance with the CSI-2 specification will be illustrated.

In addition, although an example in which the processor 211 and each of the plurality of sensors 212 are connected using one control bus B2 is illustrated in FIG. 28, the system according to this embodiment can take a configuration in which a control bus is disposed for each sensor 212. In addition, the processor 211 and each of the plurality of sensors 212 are not limited to the configuration in which control information (to be described below) is transmitted/received through the control bus B2, and, for example, a configuration in which control information (to be described below) is transmitted/received using radio communication of an arbitrary communication method capable of transmitting/receiving control information to be described below may be used.

The processor 211 is configured using one or two or more processors configured using an arithmetic operation circuit such as a micro processing unit (MPU) or the like, various processing circuits, and the like. The processor 211 is driven using electric power supplied from an internal power supply (not illustrated) configuring the sensor system 201 such as a battery or the like or electric power supplied from an external power supply of the sensor system 201.

The processor 211 is one example of a processing device according to this embodiment. The processing device according to this embodiment can be applied to an arbitrary circuit or an arbitrary device capable of performing a process of the processing unit to be described below (a process relating to a control method according to this embodiment).

The processor 211 performs "control relating to an image output from each of a plurality of sensors 212 connected to the data bus B1 through the data bus B1 (control relating to a control method according to this embodiment)".

The control relating to an image, for example, is performed by the processing unit 221 included in the processor 211. In the processor 211, a specific processor (or a specific processing circuit) or a plurality of processors (or a plurality of processing circuits) performing control relating to an image are responsible for the role of the processing unit 221.

In addition, the processing unit 221 is acquired by conveniently dividing the function of the processor 211. Thus, in the processor 211, for example, the control relating to an image according to this embodiment may be performed using a plurality of functional blocks. Hereinafter, a case in which the control relating to an image according to this embodiment is performed by the processing unit 221 will be described as an example.

The processing unit 221 performs control relating to an image by transmitting control information to each sensor 212.

In the control information according to this embodiment, for example, identification information representing the sensor 212, information for control, and a processing command are included. As the identification information according to this embodiment, for example, there is arbitrary data that can be used for identifying the sensor 212 such as an ID or the like set to the sensor 212.

The control information, as described above, for example, is transmitted through the control bus B2.

In addition, the control information transmitted by the processing unit 221, for example, is recorded in a register (one example of a recording medium) included in each sensor 212. Then, the sensor 212 outputs an image on the basis of the control information stored in the register.

The processing unit 221, for example, performs one of control relating to a first example illustrated in (1) described below to control relating to a fourth example illustrated in (4) described below as control relating to an image. In addition, an output example of an image in the sensor system 201 which is realized by the control relating to an image according to this embodiment will be described below.

(1) First Example of Control Relating to Image: Control of Connection of Image

The processing unit 221 performs control of connection of a plurality of images output from the sensors 212.

More specifically for example, by controlling a start of a frame and an end of a frame of a plurality of images output from the sensors 212, the processing unit 221 controls connection of the plurality of images.

A start of a frame in each sensor 212, for example, is controlled by the processing unit 221 controlling output of a start packet of a frame in each sensor 212. An example of a start packet of a frame includes a "Frame Start (FS) packet" according to the CSI-2 specification. Hereinafter, a start packet of a frame may be referred to as "FS" or "FS packet".

For example, by transmitting control information including data indicating whether a start packet of a frame is output (first output information; one example of information for controlling) to the sensor 212, the processing unit 221 controls output of a start packet of a frame in the sensor 212. As the above-described data indicating whether a start packet of a frame is output, for example, there is a flag indicating whether or not a start packet of a frame is output.

In addition, an end of a frame in each sensor 212, for example, is controlled by the processing unit 221 controlling output of an end packet of a frame in each sensor 212. An example of an end packet of a frame includes a "Frame End (FE) packet" according to the CSI-2 specification. Hereinafter, an end packet of a frame may be referred to as "FE" or "FE packet".

The processing unit 221, for example, by transmitting control information including data indicating whether an end packet of a frame is output (second output information; one example of information for control) to the sensor 212, controls output of an end packet of a frame in the sensor 212. As the above-described data indicating whether an end packet of a frame is output, for example, there is a flag indicating whether or not an end packet of a frame is output.

For example, as described above, by controlling a start of a frame and an end of a frame in a plurality of images output from the sensors 212 using the processing unit 221, data representing images as below is output from a plurality of sensors 212.

Data including a start packet of a frame and an end packet of a frame

Data including only a start packet of a frame

Data including only an end packet of a frame

Data not including a start packet of a frame and an end packet of a frame

The processor 211 receiving a plurality of images transmitted from a plurality of sensors 212 through the data bus B1 recognizes that transmission of an image has been started in a certain frame on the basis of a start packet of the frame included in a received image.

In addition, the processor 211 recognizes that transmission of an image has been ended in a certain frame on the basis of an end packet of the frame included in a received image.

Furthermore, in a case in which a start packet of a frame and an end packet of a frame are not included in a received image, the processor 211 does not recognize that transmission of an image in a certain frame has been started and transmission of an image in the certain frame has been ended. In addition, in the case described above, the processor 211 may recognize that transmission of an image in a certain frame is in the middle of the process.

Thus, in the processor 211 receiving a plurality of images transmitted from a plurality of sensors 212 through the data bus B1, processes as illustrated (a) and (b) below are realized. In addition, in a case in which another processing circuit capable of processing an image is connected to the data bus B1, the processing of images output from a plurality of sensors 212 may be performed by this other processing circuit. Hereinafter, a case in which the processing unit 221 included in the processor 211 performs processing of images output from a plurality of sensors 212 will be described as an example.

(a) First Example of Processing of Images Output from a Plurality of Sensors 212

In a case in which a start packet of a frame and an end packet of a frame are included in data transmitted from one sensor 212, the processing unit 221 processes an image output from this one sensor 212 as a single image.

(b) Second Example of Processing of Images Output from a Plurality of Sensors 212

In a "case in which a start packet of a frame is included in data transmitted from one sensor 212, and an end packet of a frame is included in data, which has been transmitted from another sensor 212, received after the reception of the data in which the start packet of this frame is included", the processing unit 221 composes an image of the data in which the start packet of the frame is included and an image of the data in which the end packet of the frame is included.

In addition, "before data in which an end packet of a frame is included is received in the case described above in the second example, when data not including a start packet of a frame and an end packet of a frame transmitted from one or two or more other sensors 212 is received", the processing unit 221 composes an image of data in which a start packet of a frame is included, an image of data not including a start packet of a frame and an end packet of a frame, and an image of data in which an end packet of a frame is included.

The processing unit 221 composes images transmitted from a plurality of sensors 212 as described above on the basis of a start packet of a frame and an end packet of a frame, whereby connection of a plurality of images transmitted from a plurality of sensors 212 is realized.

In addition, control of connection of a plurality of images according to this embodiment is not limited to the examples described above.

For example, by further controlling assignment of identifiers for a plurality of images output from the sensors 212, the processing unit 221 can control connection of a plurality of images.

Here, an identifier according to this embodiment is data from which an image output from the sensor 212 can be identified. As the identifier according to this embodiment, for example, there is one or both of a virtual channel (VC) value (also referred to as a "VC number") defined in the CSI-2 specification and a data type (DT) value defined in the CSI-2 specification. In addition, the identifier according to this embodiment is not limited to the example described above and, in control of connection of a plurality of images transmitted from a plurality of sensors 212 may be arbitrary data that can be used for identifying an image.

For example, by transmitting control information including data representing an identifier of an image (third output information; one example of information for control) to the sensor 212, the processing unit 221 controls assignment of an identifier to an image output from the sensor 212.

In a case in which an identifier is included in data transmitted from the sensor 212, the processing unit 221 recognizes an image to which a different identifier is assigned in a certain frame as a different image. In other words, in a case in which an identifier is included in data transmitted from the sensor 212, the processing unit 221 does not connect an image to which a different identifier is assigned.

Thus, by further controlling assignment of identifiers to a plurality of images output from the sensors 212 in addition to control of a start of a frame and an end of a frame, the processing unit 221 can realize control of connection of more various images than those of a case in which a start of a frame and an end of a frame are controlled.

FIGS. 29 to 33 are explanatory diagrams for describing one example of control relating to images in the processor 211 configuring the sensor system 201 according to this embodiment. Each of FIGS. 29 to 33 illustrates one example of a result of control of connection of images in the processor 211.

Figure 29:
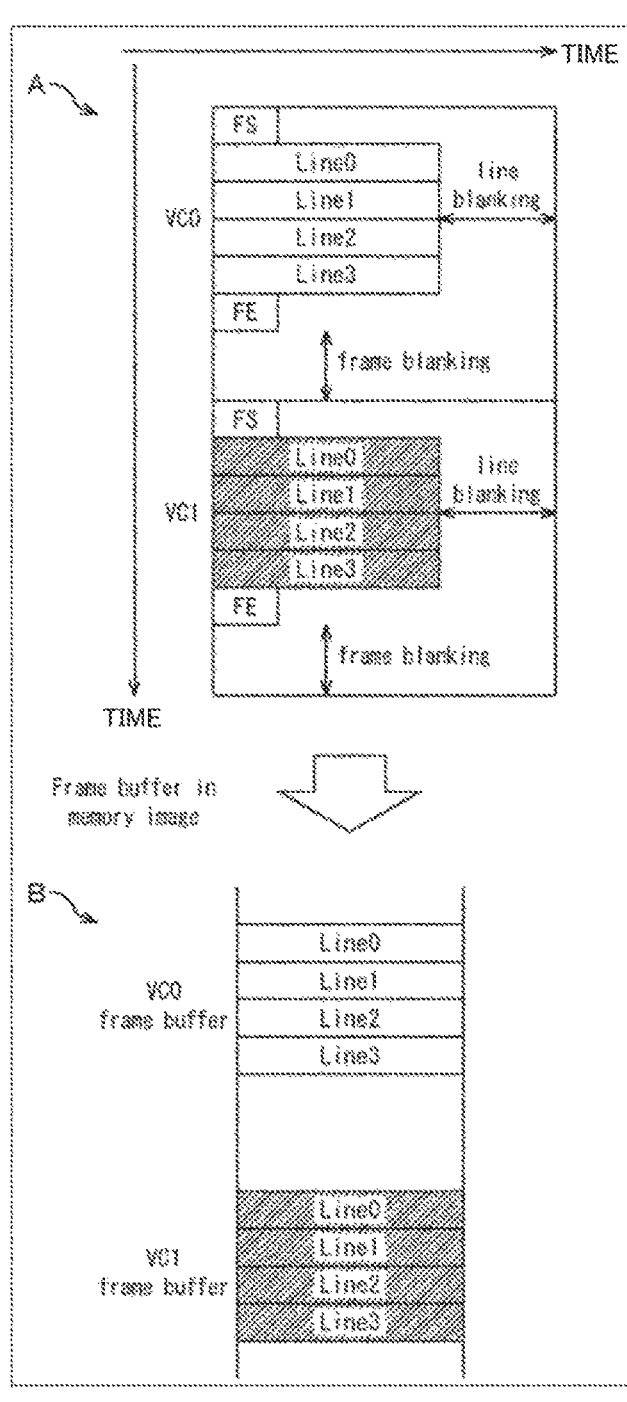
FIG. 29 is a diagram illustrating a first example of a control result of connection of images.

(1-1) First Example of Result of Control of Connection of Images: FIG. 29

A represented in FIG. 29 illustrates one example of data corresponding to a certain frame which has been acquired from two sensors 212 through the data bus B1 by the processor 211. In A represented in FIG. 29, an example in which data illustrated below has been received from one sensor 212 and another sensor 212 is illustrated.

One sensor 212: data including image data for each line, a start packet of a frame, an end packet of a frame, and VC value "0" (one example of an identifier; hereinafter the same)

Another sensor 212: data including image data for each line, a start packet of a frame, an end packet of a frame, and VC value "1" (one example of the identifier; hereinafter the same)

In addition, B represented in FIG. 29 represents a memory image of a case in which data represented in A of FIG. 29 is stored in a frame buffer of the memory 213. Furthermore, the data represented in A of FIG. 29 may be stored in another recording medium such as a recording medium included in the processor 211.

In a case in which the data as illustrated in A of FIG. 29 has been received, the processing unit 221, for example, as illustrated in B of FIG. 29, records images by dividing the data into frame buffers of respective VC values.

Figure 30:
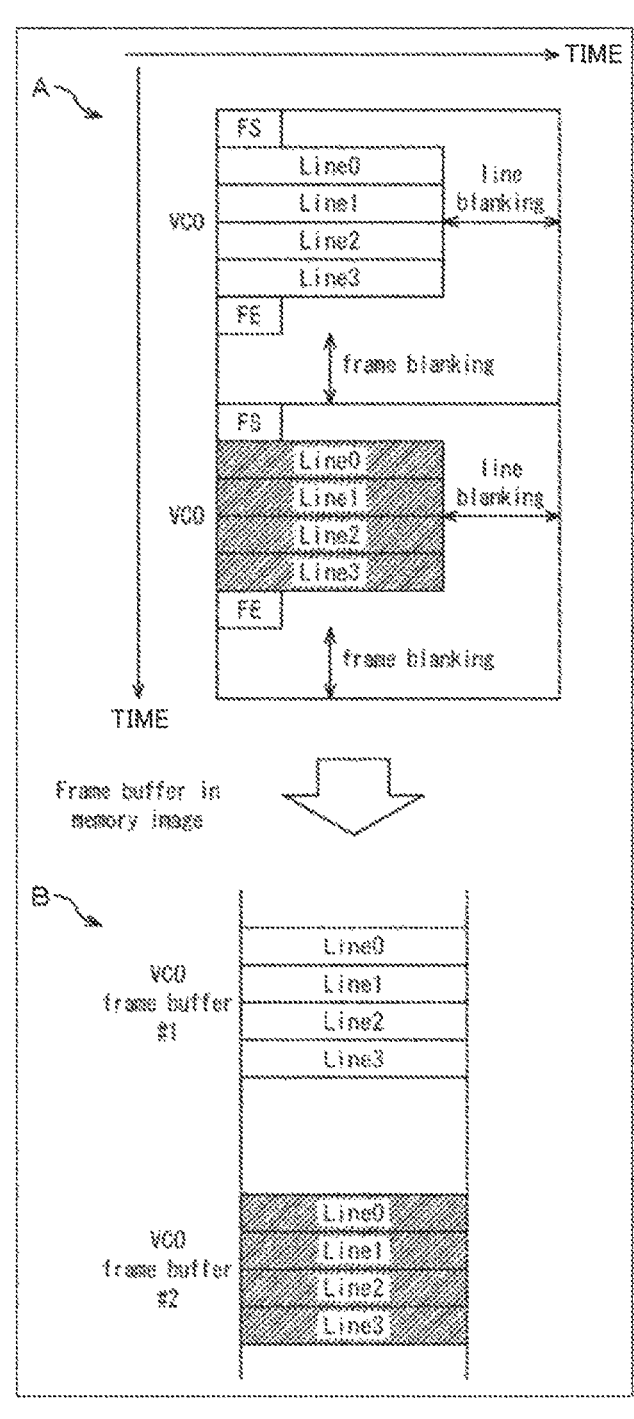
FIG. 30 is a diagram illustrating a second example of a control result of connection of images.

(1-2) Second Example of Result of Control of Connection of Images: FIG. 30

A represented in FIG. 30 illustrates one example of data corresponding to a certain frame which has been acquired from two sensors 212 through the data bus B1 by the processor 211. In A represented in FIG. 30, an example in which data illustrated below has been received from one sensor 212 and another sensor 212 is illustrated.

One Sensor 212: Data including image data for each line, a start packet of a frame, an end packet of a frame, and VC value "0"

Another sensor 212: Data including image data for each line, a start packet of a frame, an end packet of a frame, and VC value "0"

In a case in which the data as illustrated in A of FIG. 30 has been received, the processing unit 221, for example, as illustrated in B of FIG. 30, records images in frame buffers of the same VC values. The storage of images as illustrated in B of FIG. 30, for example, is realized using double buffers or the like.

Figure 31:
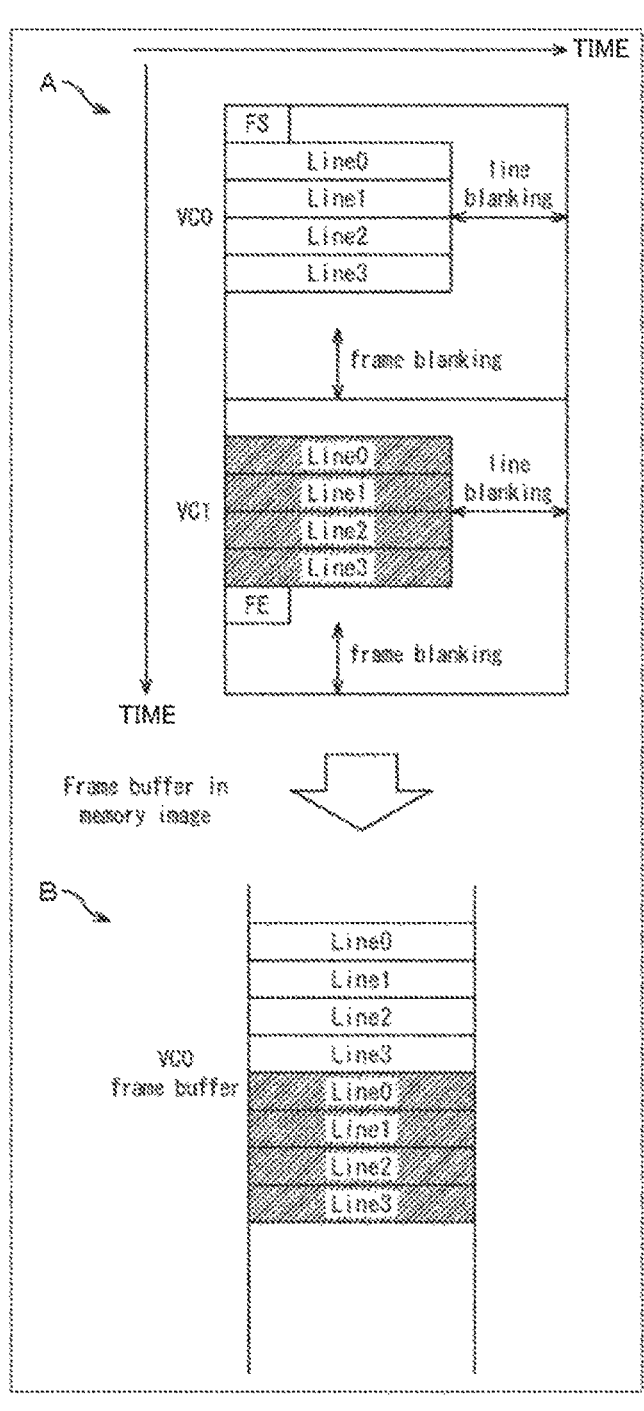
FIG. 31 is a diagram illustrating a third example of a control result of connection of images.

(1-3) Third Example of Result of Control of Connection of Images: FIG. 31

A represented in FIG. 31 illustrates one example of data corresponding to a certain frame which has been acquired from two sensors 212 through the data bus B1 by the processor 211. In A represented in FIG. 31, an example in which data illustrated below has been received from one sensor 212 and another sensor 212 is illustrated.

One Sensor 212: Data including image data for each line, a start packet of a frame, and VC value "0"

Another sensor 212: Data including image data for each line, an end packet of a frame, and VC value "0"

In a case in which the data as illustrated in A of FIG. 31 has been received, the processing unit 221, for example, as illustrated in B of FIG. 31, records images in a frame buffer by connecting two images in a vertical direction.

Figure 32:
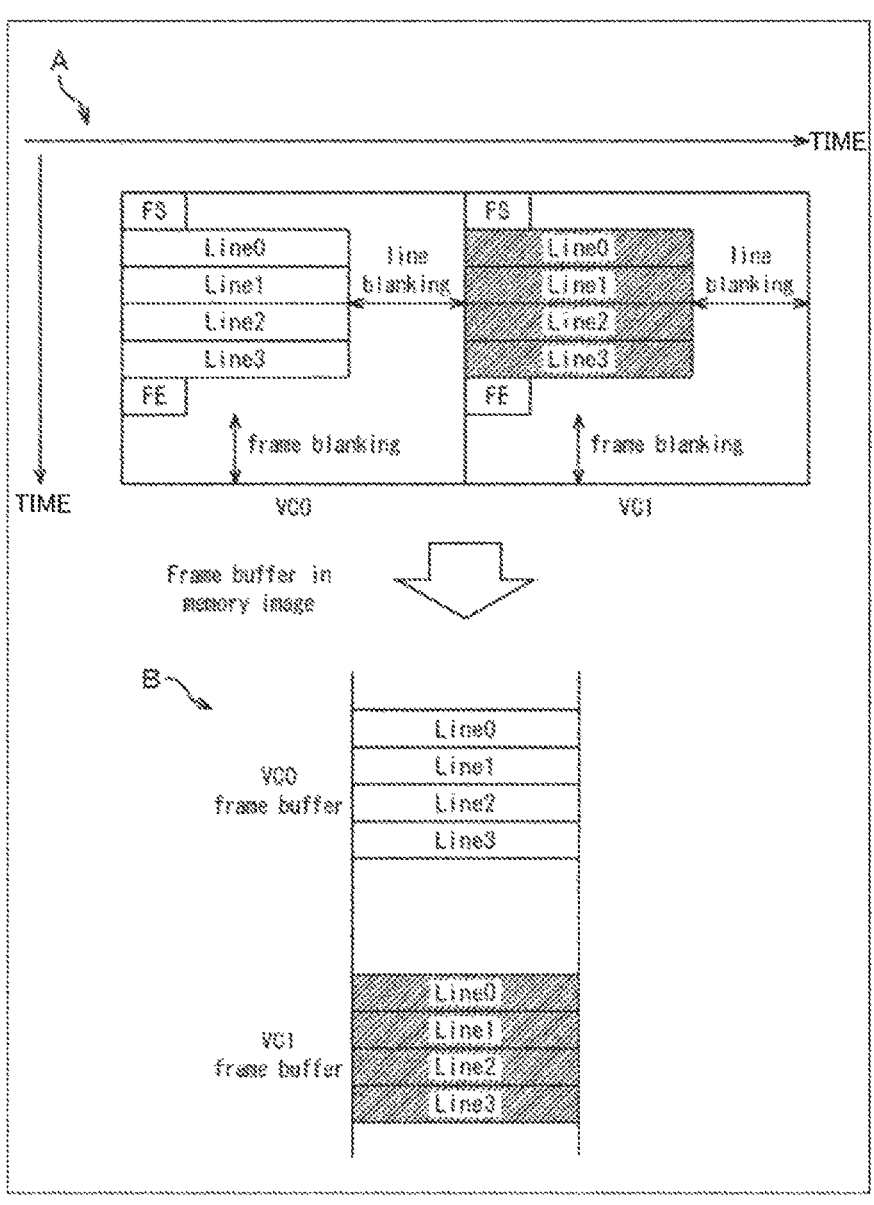
FIG. 32 is a diagram illustrating a fourth example of a control result of connection of images.

(1-4) Fourth Example of Result of Control of Connection of Images: FIG. 32

A represented in FIG. 32 illustrates one example of data corresponding to a certain frame which has been acquired from two sensors 212 through the data bus B1 by the processor 211. In A represented in FIG. 32, an example in which data illustrated below has been received from one sensor 212 and another sensor 212 is illustrated.

One Sensor 212: Data including image data for each line, a start packet of a frame, an end packet of a frame, and VC value "0"

Another sensor 212: Data including image data for each line, a start packet of a frame, an end packet of a frame, and VC value "1"

In a case in which the data as illustrated in A of FIG. 32 has been received, the processing unit 221, for example, as illustrated in B of FIG. 32, records images in frame buffers for respective VC values by dividing the data.

Figure 33:
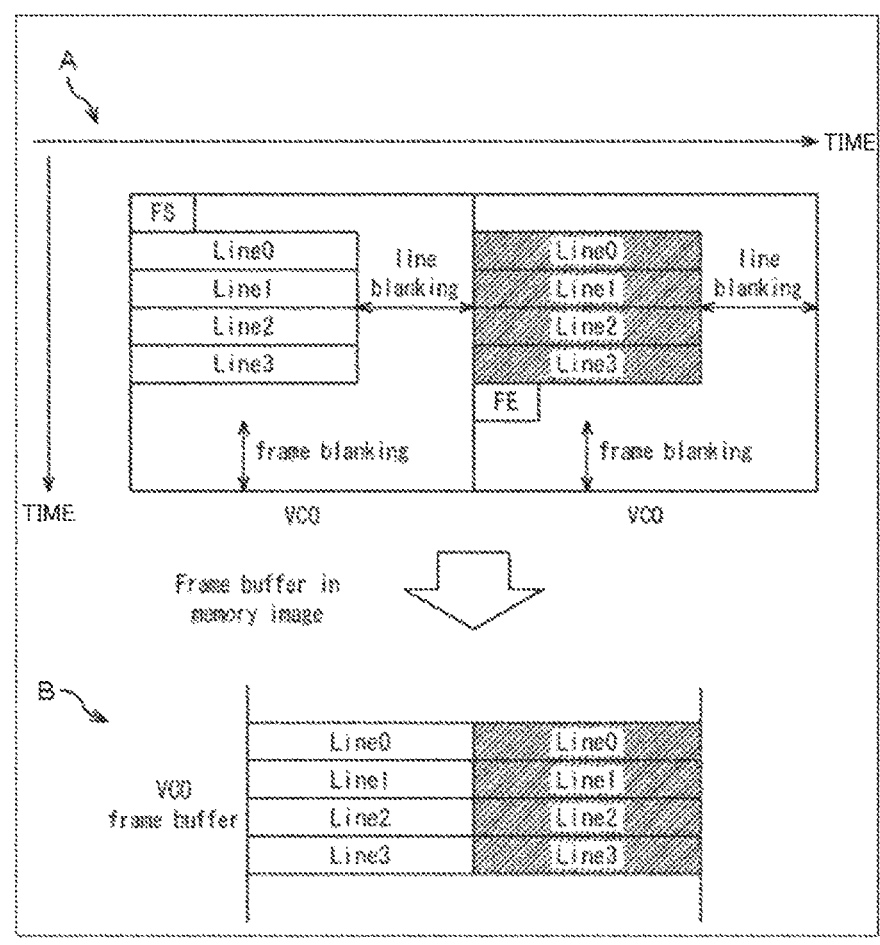
FIG. 33 is a diagram illustrating a fifth example of a control result of connection of images.

(1-5) Fifth Example of Result of Control of Connection of Images: FIG. 33

A represented in FIG. 33 illustrates one example of data corresponding to a certain frame which has been acquired from two sensors 212 through the data bus B1 by the processor 211. In A represented in FIG. 33, an example in which data illustrated below has been received from one sensor 212 and another sensor 212 is illustrated.

One Sensor 212: Data including image data for each line, a start packet of a frame, and VC value "0"

Another sensor 212: Data including image data for each line, an end packet of a frame, and VC value "0"

In a case in which the data as illustrated in A of FIG. 33 has been received, the processing unit 221, for example, as illustrated in B of FIG. 33, records images in a frame buffer by connecting two images in a horizontal direction.

In accordance with control of connection of images in the processing unit 221 of the processor 211, for example, as illustrated in FIGS. 29 to 33, images are selectively connected. In addition, it is apparent that the example of the result of control of connection of images using the processing unit 221 of the processor 100 according to this embodiment is not limited to the examples illustrated in FIGS. 29 to 33.

(2) Second Example of Control Relating to Image: Control of Output Image

The processing unit 221 performs control of images output from the sensors 212. As control of images output from the sensors 212 according to this embodiment, for example, there is one or both control of an image size of an image output from each sensor 212 and control of a frame rate of an image output from each of a plurality of sensors 212.

The processing unit 221, for example, by transmitting control information including one or both of data representing an image size and data representing a frame rate (one example of information for control) to the sensors 212, controls images output from the sensors 212.

(3) Third Example of Control Relating to Image: Output Timing Control of Image

The processing unit 221 controls an output timing of an image output from each image sensor.

For Example, by Transmitting Control Information Including Data Representing an output delay amount until an image is output after an image output command is received (one example of information for control) to the sensor 212, the processing unit 221 controls output timings of images output from the sensors 212.

(4) Fourth Example of Control Relating to Image:

The processing unit 221 may perform two or more controls among the control relating to the first example illustrated in (1) described above to the control relating to the third example illustrated in (3) described above.

As control relating to images, the processing unit 221, for example, performs the control relating to the first example illustrated in (1) described above to the control relating to the fourth example illustrated in (4) described above as the control relating to images.

For example, by including the processing unit 221, the processor 211 performs the process relating to the control relating to images as described above (a process relating to the control method according to this embodiment).

In addition, the process performed by the processor 211 is not limited to the process relating to the control relating to images as described above.

For example, the processor 211 can perform various processes such as a process relating to recording control of image data for a recording medium such as the memory 213 or the like as illustrated with reference to FIGS. 29 to 33, a process relating to display control of images for a display screen of the display device 214, a process of executing arbitrary application software, and the like. As a process relating to recording control, for example, there is "a process of delivering control data including a recording command and data to be recorded on a recording medium to a recording medium such as the memory 213 or the like". In addition, as the process relating to display control, for example, there is "a process of delivering control data including a display command and data to be displayed on a display screen to a display device such as the display device 214 or the like".

The sensor 212 is an image sensor. The image sensor according to this embodiment, for example, includes an imaging device such as a digital still camera, a digital video camera, a stereo camera, or the like and an arbitrary sensor device such as an infrared sensor, a distance image sensor, or the like and has a function of outputting a generated image. Here, an image generated by the sensor 212 corresponds to data indicating a sensing result acquired by the sensor 212.

The sensor 212, for example, as illustrated in FIG. 28, is connected to the data bus B1 to which another sensor 212 is connected.

In addition, the sensor 212 outputs an image on the basis of control information. As described above, the control information is transmitted from the processor 211, and the sensor 212 receives the control information through the control bus B2.

<One Example of Transmission Scheme>

One example of a transmission scheme from the sensor 212 to the processor 211 will be described with reference to FIGS. 34 and 35.

The sensor 212 stores area information and area data in a payload of a packet and transmits them for each row. For example, in the sensor 212, the additional information generating unit 23 sets area information corresponding to an area set for an image formed from event data for each row of the image, and the set area information and event data that becomes area data corresponding to the area are caused to be transmitted for each row. The sensor 212, for example, transmits the area information and the area data for each row in a predetermined order such as an ascending order or a descending order of y coordinate values or the like. In addition, the sensor 212 may transmit the area information and the area data for each row in a random order. Here, the area information is data (a data group) used for identifying an area set for an image on the reception device side. In the area information, for example, information representing a position of a row, identification information of an area included in a row, information representing a position of a column of an area included in a row, and information representing a size of an area included in a row are included.

Figure 34:
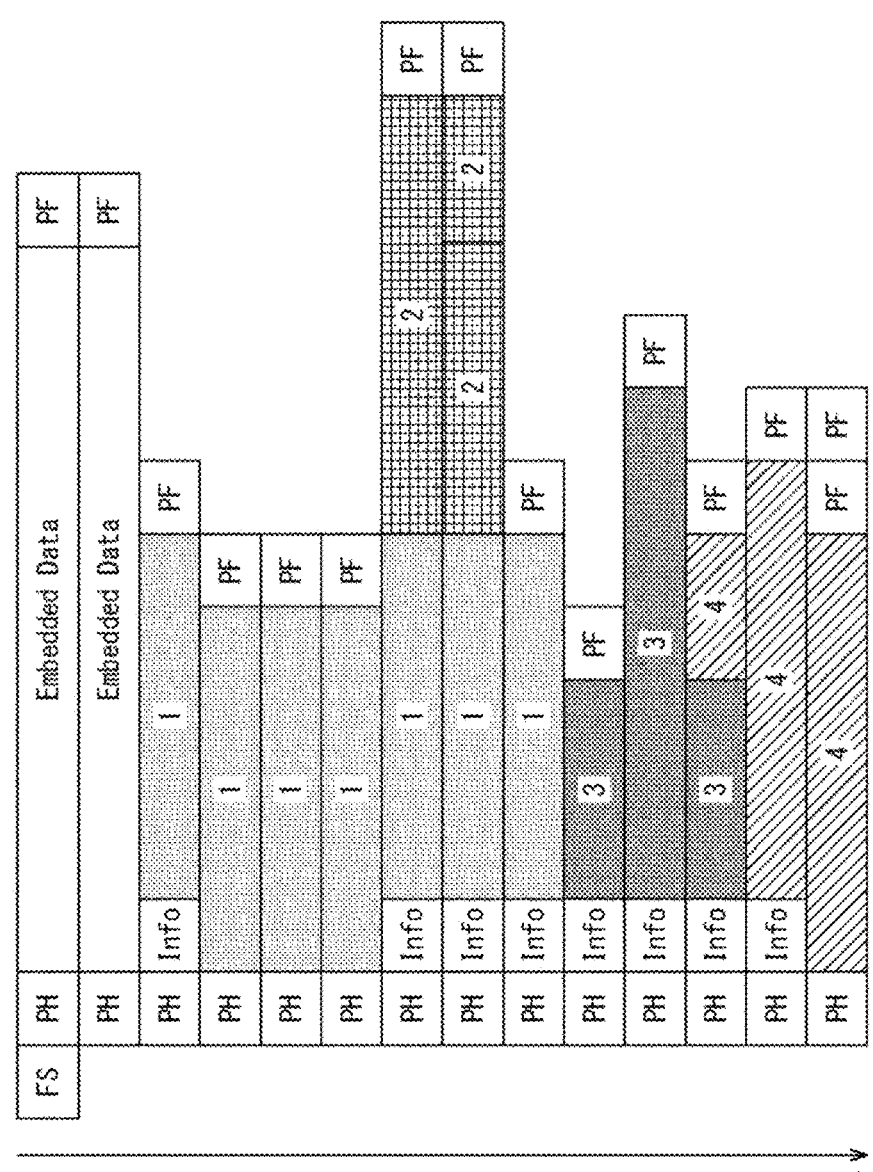
FIG. 34 is a diagram illustrating one example of data transmitted using a first transmission scheme.

FIG. 34 is an explanatory diagram illustrating one example of data transmitted using a first transmission scheme according to a transmission method according to this embodiment. FIG. 34 illustrates "an example in which area information and area data (event data of area 1, event data of area 2, event data of area 3, and event data of area 4) corresponding to each of area 1, area 2, area 3, and area 4 illustrated in FIG. 35 are stored in a payload of a long packet of MIPI and are transmitted for each row".

"FS" illustrated in FIG. 34 is a Frame Start (FS) packet in the MIPI CSI-2 specification, and "FE" illustrated in FIG. 34 is a Frame End (FE) packet in the MIPI CSI-2 specification (this similarly applies also to other diagrams).

"Embedded data" illustrated in FIG. 34 is data that can be embedded in a header or a footer of transmitted data. As "embedded data", for example, there is additional information that is additionally transmitted by the sensor 212. Hereinafter, embedded data may be represented as "EBD".

As the additional information according to this embodiment, for example, there is one or two or more among information representing a data amount of an area, information representing a size of an area, and information representing a priority level of an area.

As the information representing a data amount of an area, for example, there is data of an arbitrary format that can identify a data amount of the area such as "data representing a pixel number included in an area (or a data amount of the area) and a data amount of a header". In accordance with transmission of information representing a data amount of an area as "embedded data" illustrated in FIG. 34, a reception device can identify a data amount of each area.

In other words, in accordance with transmission of information representing a data amount of an area as "embedded data" illustrated in FIG. 34, even in a case in which a reception device does not have the function of calculating a data amount of each area on the basis of area information, the reception device can be caused to identify a data amount of the area.

As the information representing a size of an area, for example, there is data of an arbitrary format that can identify a size of an area such as "data representing a rectangular area including the area (for example, data representing a pixel number in a horizontal direction and a pixel number in a vertical direction in this rectangular area)" or the like.

The information representing a priority level of an area, for example, is data used in processing of data of an area. For example, a priority level represented by the information representing a priority level of an area is used for setting an order for processing areas and a process and the like of a case in which set areas overlap each other like area 3 and area 4 illustrated in FIG. 35.

In addition, the additional information according to this embodiment is not limited to the examples described above. For example, as the additional information according to this embodiment, there are various kinds of data such as exposure information representing an exposure value or the like of an image sensor device, gain information representing a gain of an image sensor device, and the like. Each of an exposure value represented by the exposure information and a gain represented by the gain information is set in an image sensor device in accordance with control of the processor 211 through the control bus B2.

Figure 35:
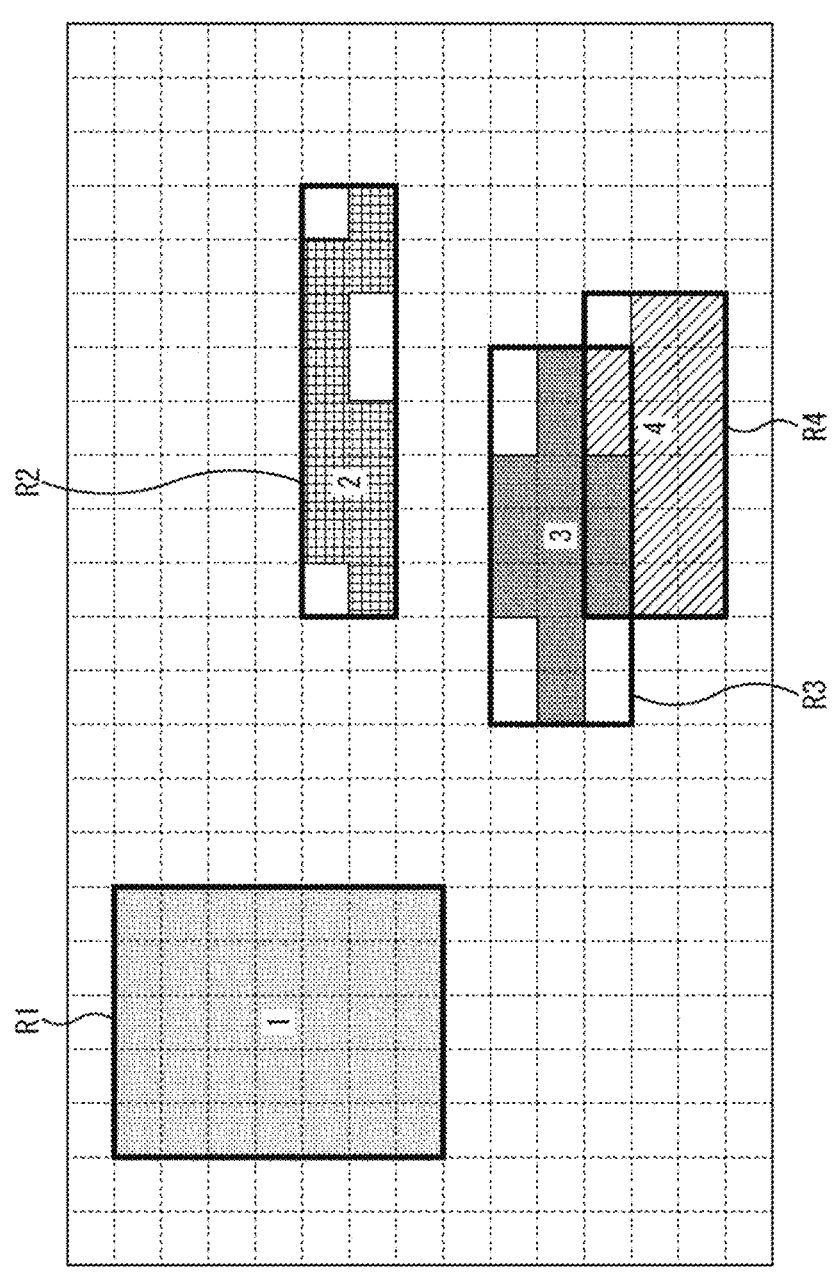
FIG. 35 is an explanatory diagram for describing one example of embedded data transmitted using a first transmission scheme.

FIG. 35 is an explanatory diagram for describing one example of embedded data transmitted using the first transmission scheme relating to the transmission method according to this embodiment. FIG. 35 illustrates an example in which information representing a size of an area is transmitted as "embedded data" illustrated in FIG. 34, and transmitted information representing a size of an area is data representing a minimum rectangular area including the area. In addition, FIG. 35 illustrates an example in which four areas including area 1, area 2, area 3, and area 4 are set.

In accordance with transmission of the information representing a size of an area as "embedded data" illustrated in FIG. 34, a reception device can identify a minimum rectangular area including area 1 illustrated in R1 of FIG. 35, a minimum rectangular area including area 2 illustrated in R2 of FIG. 35, a minimum rectangular area including area 3 illustrated in R3 of FIG. 35, and a minimum rectangular area including area 4 illustrated in R4 of FIG. 35. In other words, in accordance with transmission of information representing a size of an area as "embedded data" illustrated in FIG. 34, even in a case in which a reception device does not have a function for identifying a minimum rectangular area including each area on the basis of area information, the reception device can be caused to identify a minimum rectangular area including each area on the basis of the area information. In addition, it is apparent that the information representing a size of an area is not limited to data representing a minimum rectangular area including each area.

As the information representing a priority level of an area, for example, there is data of an arbitrary format that can identify a priority level of the area such as data in which ROI IDs are aligned in order of the highest to lowest priority levels, data in which ROI IDs are aligned in order of the lowest to highest priority levels, or the like. In accordance with transmission of the information representing a priority level of area as "embedded data" illustrated in FIG. 34, a reception device, for example, can identify a processing order of areas and an area to be processed with priority. In other words, in accordance with transmission of the information representing a priority level of an area as "embedded data" illustrated in FIG. 34, a process for an area in the reception device can be controlled.

In addition, it is apparent that examples of the information representing a data amount of an area, the information representing a size of an area, and the information representing a priority level of an area transmitted as "embedded data" illustrated in FIG. 34 are not limited to the examples described above.

"PH" illustrated in FIG. 34 is a packet header of a long packet. Here, a packet header of a long packet relating to the first transmission scheme may function as data (change information) representing whether or not information included in the area information has been changed from area information included in a packet that has been previously transmitted. In other words, "PH" illustrated in FIG. 34 can be regarded as one piece of data representing a data type of a long packet.

As one example, in a case in which information included in the area information has been changed from area information included in a packet that has been previously transmitted, the sensor 212 sets "0x38" in "PH". In this case, the sensor 212 stores the area information in a payload of a long packet.

As another example, in a case in which information included in the area information has not been changed from area information included in a packet that has been previously transmitted, the sensor 212 sets "0x39" in "PH". In this case, the sensor 212 does not store the area information in a payload of a long packet. In other words, in a case in which information included in the area information has not been changed from area information included in a packet that has been previously transmitted, the sensor 212 does not transmit the area information.

In addition, it is apparent that the data set in "PH" is not limited to the examples described above.

"Info" illustrated in FIG. 34 is area information stored in a payload (this similarly applies also to other diagrams). As illustrated in FIG. 34, the area information is stored in a beginning part of the payload. For example, the area information may be referred to as "ROI Info".

"1", "2", "3", and "4" illustrated in FIG. 34 respectively correspond to area data of area 1, area data of area 2, area data of area 3, and area data of area 4 that are stored in the payload (this similarly applies also to other diagrams). In addition, although each piece of area data is illustrated to be divided in FIG. 34, this division is illustrated for the convenience of description, and there is no division in data stored in the payload (this similarly applies also to other diagrams). For example, the area data may be referred to as "ROI DATA".

<Second Configuration Example of Sensor System>

Figure 36:
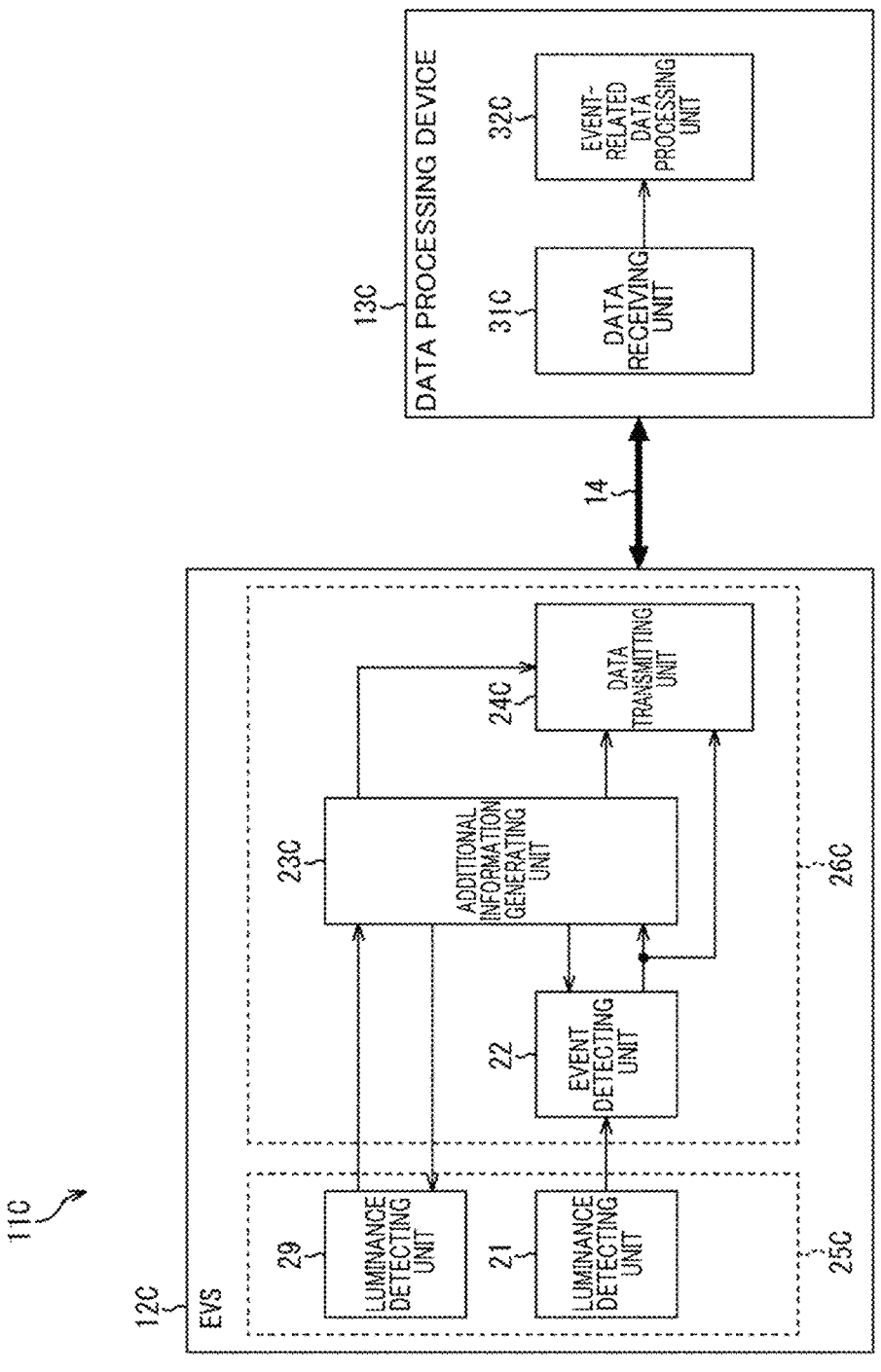
FIG. 36 is a block diagram illustrating a configuration example of a second embodiment of a sensor system to which the present technology has been applied.

FIG. 36 is a block diagram illustrating a configuration example of a second embodiment of a sensor system 11 to which the present technology has been applied. In a sensor system 11C illustrated in FIG. 36, the same reference signs will be assigned to components that are common to the sensor system 11 illustrated in FIG. 1, and detailed description thereof will be omitted.

As illustrated in FIG. 36, the sensor system 11C is configured such that an EVS 12C and a data processing device 13C are connected through a data bus 14. The EVS 12C may be formed to have a stacked structure in which two chips including a pixel chip 25C and a signal processing chip 26C are stacked or, as illustrated in FIG. 2 described above, may be formed to have a stacked structure in which three chips are stacked.

The EVS 12C is configured to have the luminance detecting unit 21 and the event detecting unit 22 to have a configuration common to the EVS 12 illustrated in FIG. 1. In the EVS 12C, a luminance detecting unit 29 for images is disposed in the pixel chip 25C, and an additional information generating unit 23C and a data transmitting unit 24C are disposed in the signal processing chip 26C to have a configuration different from the EVS 12 illustrated in FIG. 1. The data processing device 13C is configured to have a data receiving unit 31C and an event-related data processing unit 32C to have a configuration different from the data processing device 13C illustrated in FIG. 1.

The luminance detecting unit 29 for images, similar to a pixel included in a general Complementary Metal Oxide Semiconductor (CMOS) Image Sensor (CIS), for example, detects luminance of light for each color that has transmitted through an RGB color filter or luminance of light of all the wavelength regions.

Then, the luminance detecting unit 29 for images supplies a luminance signal for an image representing such a luminance value to the additional information generating unit 23C. In other words, in the pixel chip 25C, a luminance signal for images is output from the luminance detecting unit 29 for images, and a luminance signal for an EVS is output from the luminance detecting unit 21.

Here, data acquired by performing image data processing on the luminance signal for an image output from the luminance detecting unit 29 for images will be referred to as image data.

The additional information generating unit 23C, similar to the additional information generating unit 23A illustrated in FIG. 14 described above, generates line information added to each line as additional information that is additionally disposed in event data and supplies the line information to the data transmitting unit 24. The additional information generating unit 23C generates CIS information in addition to the information of line information itself, the identification information of this line, and the flicker information as described above as the line information.

As the CIS information, a frame number of image data and interference information with image data are used and are generated in units of lines of event data. As will be described with reference to FIGS. 39 and 40 to be described below, the luminance detecting unit 21 operates at a higher speed than that of an operation of the luminance detecting unit 29 for images. For this reason, in order to synchronize event data with image data, a frame number of the image data is used. In addition, it is assumed that an operation of the luminance detecting unit 29 for images interferes with an operation of the luminance detecting unit 21, and there is an influence according to the interference on event data that is acquired at approximately the same timing as a timing at which the luminance detecting unit 29 for images operates. Thus, in order to identify event data influenced in accordance with an interference of an operation of the luminance detecting unit 29 for images with an operation of the luminance detecting unit 21, interference information is used.

The data transmitting unit 24C transmits image data supplied through the additional information generating unit 23C in a frame configuration that is compliant with the specification of the data bus 14 to the data processing device 13 together with the event data output from the event detecting unit 22 and the line information supplied from the additional information generating unit 23.

Figure 37:
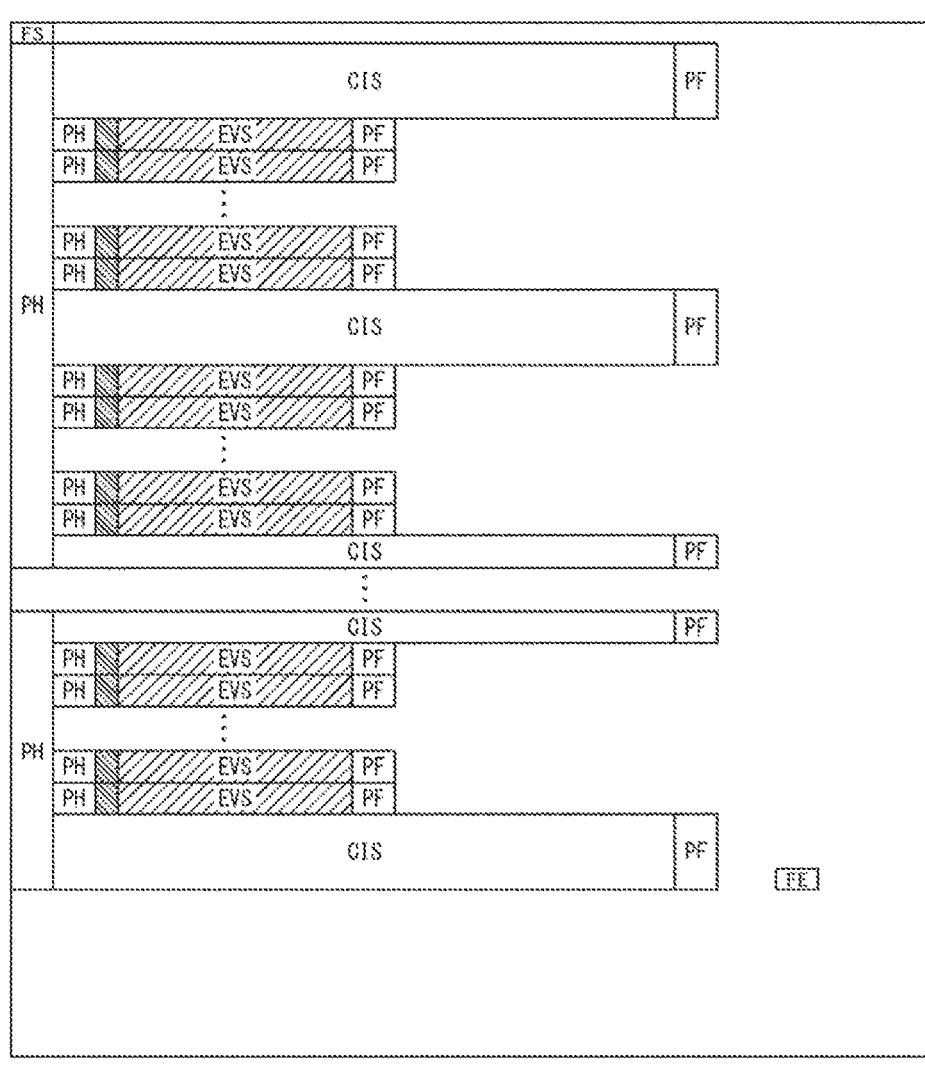
FIG. 37 is a diagram illustrating one example of a frame configuration of image data, event data, and line information corresponding to one frame.

FIG. 37 is a diagram illustrating one example of a frame configuration of image data, event data, and line information corresponding to one frame that is transmitted from the EVS 12C to the data processing device 13C.

As illustrated in FIG. 37, the data transmitting unit 24C generates transmission data of a frame configuration in which image data (CIS) corresponding to one line of an image and a plurality of pieces of line information and event data acquired during acquisition of the image data are alternately disposed. As described with reference to FIG. 15 described above, the line information is stored in a beginning part of an area in which data is stored in a long packet storing event data (EVS) for each line. For example, in output of the line information and the event data, a virtual channel can be used.

In addition, the process of generating transmission data of such a frame configuration, in other words, the process of framing image data, event data, and line information corresponding to one frame is not limited to be performed by the data transmitting unit 24C and may be performed by any one processing block of the inside of the signal processing chip 26C. In addition, such a framing process similarly applies also to the signal processing chip 26 of each configuration example described above.

The data receiving unit 31C receives image data, event data, and line information transmitted from the data transmitting unit 24 in the frame structure as illustrated in FIG. 37. Then, the data receiving unit 31 supplies the image data to an image processing unit not illustrated in the drawing, and the image processing unit performs image processing for the image data, whereby an image based on a luminance signal for images output from the luminance detecting unit 29 for images is constructed.

In addition, the data receiving unit 31C supplies the image data and the event data to the event-related data processing unit 32C as they are, extracts various kinds of information included in the line information, and supplies the extracted information to the event-related data processing unit 32C.

Similar to the event-related data processing unit 32 illustrated in FIG. 11, the event-related data processing unit 32C is configured to have an ROI arithmetic operation processing unit 61, a recognition processing unit 62, an AE/AF processing unit 63, a VLC processing unit 64, a SLAM processing unit 65, an OIE/EIS processing unit 66, a motion detect processing unit 67, a gesture processing unit 68, a deblur processing unit 69, and a 3DNR processing unit 70.

Then, the event-related data processing unit 32C refers to various kinds of information included in the line information and performs various kinds of data processing relating to an event detected by the event detecting unit 22 for event data supplied from the data receiving unit 31. In addition, the event-related data processing unit 32C can synchronize image data with event data in accordance with a frame number of image data at the time of performing data processing for event data and, by performing data processing for the event data by referring to the image data, for example, can achieve improvement of detection accuracy of an event.

In addition, as described above, image data and interference information are included in the line information. Thus, the event-related data processing unit 32C can identify event data influenced by an interference according to an operation of the luminance detecting unit 29 for images on the basis of the interference information with the image data. Then, the event-related data processing unit 32C can determine whether or not the event data identified on the basis of the interference information with the image data is to be used in various kinds of data processing relating to the event. For example, the event-related data processing unit 32C excludes the influence of event data influenced by the interference according to the operation of the luminance detecting unit 29 for images by not using the event data in various kinds of data processing relating to the event and can achieve improvement of detection accuracy of the event.

<Fourth Configuration Example of Additional Information Generating Unit>

Figure 38:
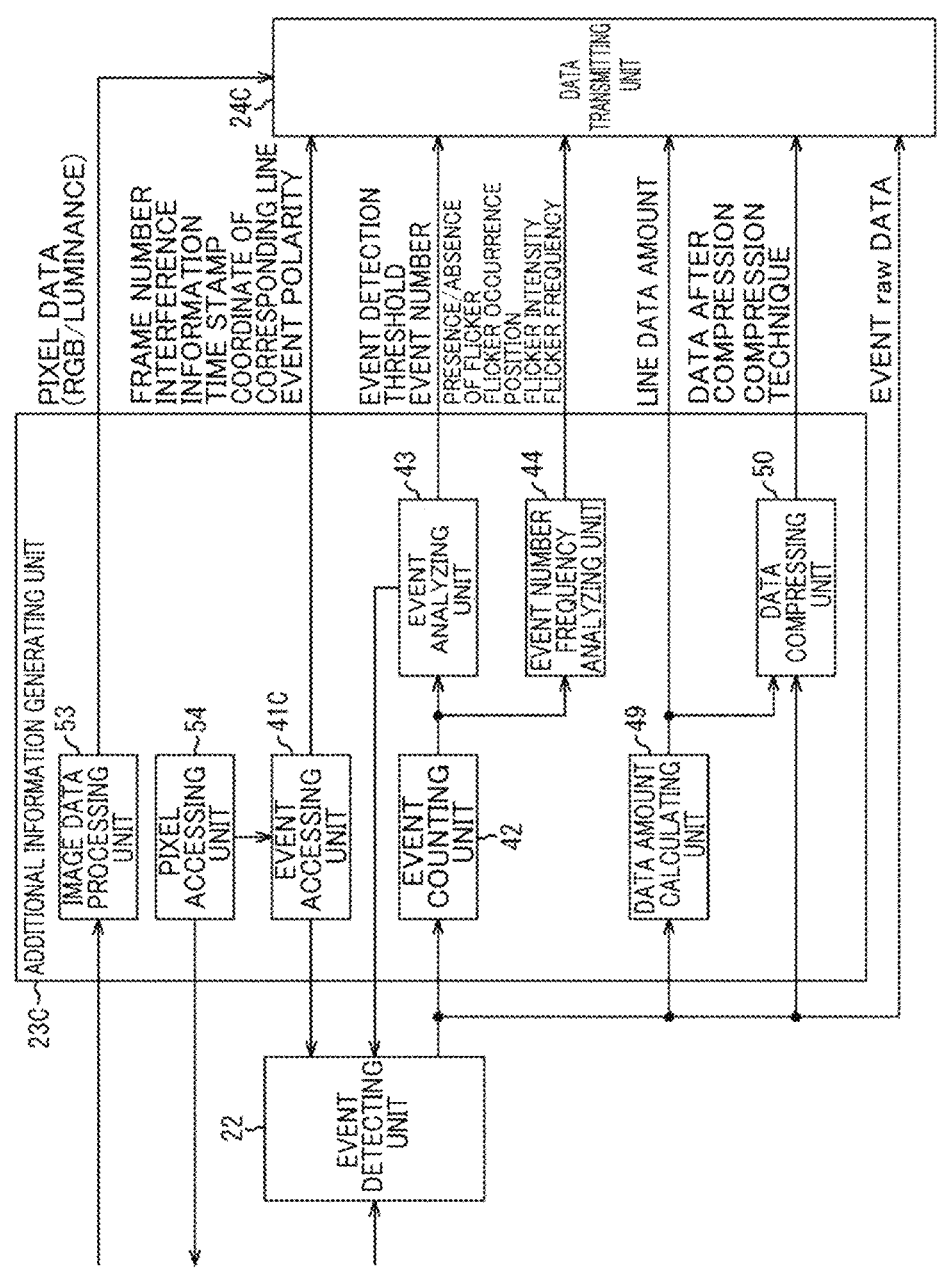
FIG. 38 is a block diagram illustrating a fourth configuration example of an additional information generating unit.

FIG. 38 is a block diagram illustrating a fourth configuration example of the additional information generating unit 23. In addition, in an additional information generating unit 23C illustrated in FIG. 14, the same reference signs will be assigned to components that are common to the additional information generating unit 23A illustrated in FIG. 14, and detailed description thereof will be omitted.

The additional information generating unit 23C is configured to include the event counting unit 42, the event number analyzing unit 43, the event number frequency analyzing unit 44, a data amount calculating unit 49, and a data compressing unit 50 to have a configuration that is similar to the additional information generating unit 23A illustrated in FIG. 14. The additional information generating unit 23C is configured to include an event accessing unit 41C, an image data processing unit 53, and a pixel accessing unit 54 to have a configuration that is different from the additional information generating unit 23A illustrated in FIG. 14.

Similar to the event accessing unit 41 described above, the event accessing unit 41C generates a time stamp, coordinates of a line, and an event polarity of this line and supplies them to the data transmitting unit 24. In addition, the event accessing unit 41C generates a frame number of image data and interference information with the image data in accordance with a timing signal supplied from the pixel accessing unit 54 and supplies them to the data transmitting unit 24C.

The image data processing unit 53 performs image data processing for a luminance signal for images supplied from the luminance detecting unit 29 for images and supplies image data (RGB/luminance) acquired as a result of the processing to the data transmitting unit 24C.

The pixel accessing unit 54 accesses the luminance detecting unit 29 for images, controls a shutter and a lead of the luminance detecting unit 29 for images, and supplies a timing signal representing a timing at which such an operation has been performed to the event accessing unit 41C.

Here, a timing of the operation of the luminance detecting unit 29 for images, a timing of the operation of the luminance detecting unit 21, and interference information with image data will be described with reference to FIG. 39.

Figure 39:
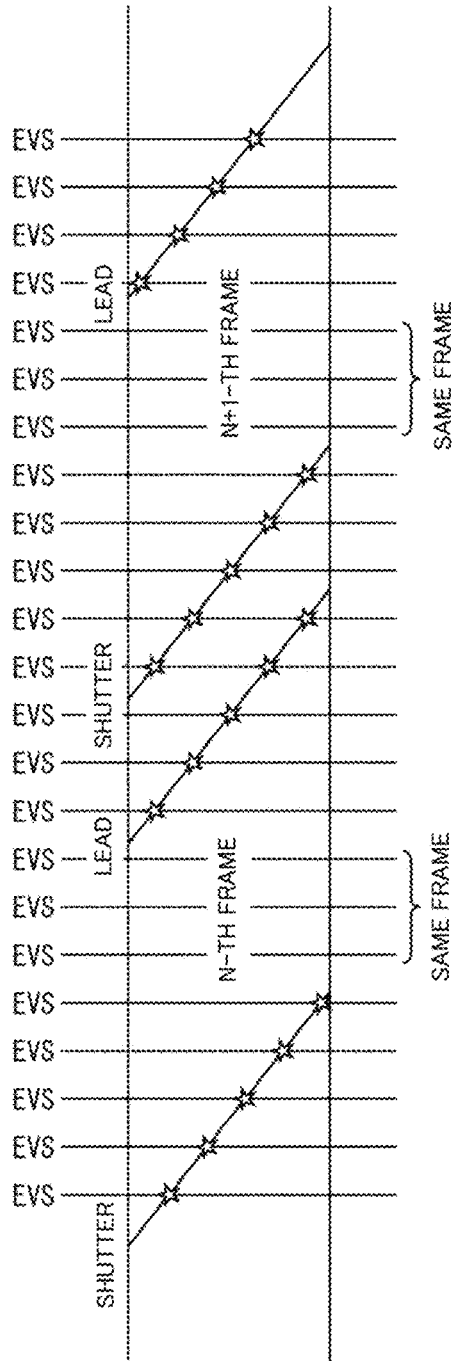
FIG. 39 is a diagram describing an operation timing and interference information.

In FIG. 39, one example of a timing of the operation (the shutter and the lead) of the luminance detecting unit 29 for images and a timing of the operation (detection and the lead) of the luminance detecting unit 21 at the time of acquisition of image data of an N-th frame and an (N+1)-th frame is illustrated.

The luminance detecting unit 21 operates at a speed higher than that of the luminance detecting unit 29 for images. In the illustrated example, while the shutter of the luminance detecting unit 29 for images corresponding to one frame is operated, the luminance detecting unit 21 performs five operations, and event data of each of the operations is acquired. Similarly, in the illustrated example, while the lead of the luminance detecting unit 29 for images corresponding to one frame is operated, the luminance detecting unit 21 performs five operations, and event data of each of the operations is acquired.

In FIG. 39, at timings at which the operation of the luminance detecting unit 29 for images and the operation of the luminance detecting unit 21 coincide with each other, star marks are illustrated. In addition, event data acquired at a timing at which a star mark is represented in FIG. 39, that is, event data acquired at approximately the same timing as the timing at which the luminance detecting unit 29 for images operates is assumed to have the influence of an interference of the operation of the luminance detecting unit 29 for images with the operation of the luminance detecting unit 21.

Thus, the pixel accessing unit 54 supplies a timing signal representing a timing at which the luminance detecting unit 29 for images operates to the event accessing unit 41C, and the event accessing unit 41C generates interference information with image data on the basis of the timing signal. In accordance with this, the event-related data processing unit 32C can determine whether or not event data influenced by an interference according to the operation of the luminance detecting unit 29 for images is to be used in various kinds of data processing relating to events.

Alternatively in a case in which event data influenced by an interference according to the operation of the luminance detecting unit 29 for images is determined not to be used in advance, at a timing at which the luminance detecting unit 29 for images operates, the luminance detecting unit 21 may be configured not to be operated.

Figure 40:
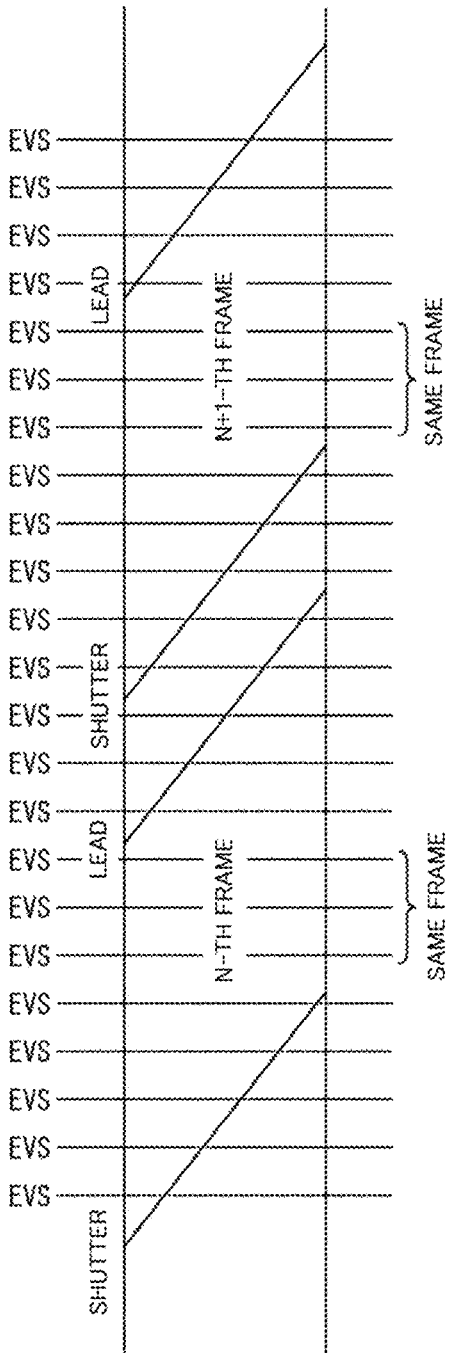
FIG. 40 is a diagram describing an example in which generation of event data is skipped.

In other words, as denoted by broken lines in FIG. 40, only in short periods before/after a timing coinciding with the operation of the luminance detecting unit 29 for images, the operation of the luminance detecting unit 21 is stopped, whereby acquisition of event data at that timing can be skipped. Also in this case, by generating interference information with image data using the event accessing unit 41C, the event-related data processing unit 32C can recognize that event data has not been acquired at that timing on the basis of the interference information with image data and perform various kinds of data processing relating to an event.

In addition, while the interference information with image data is information that is required for event data for each line, a frame number of the image data is information that is common for every one frame in each line. Thus, over one frame, a frame number of image data of a case in which the luminance detecting unit 29 for images and the luminance detecting unit 21 do not operate at approximately the same timing may be included in frame information of an EBD or the like.

For example, in the example illustrated in FIGS. 39 and 40, there are three operations of the luminance detecting unit 21 for which a case in which all the operations of the luminance detecting unit 21 belong to the same frame is formed, and an interference according to the operation of the luminance detecting unit 29 for images does not occur in event data acquired by such three operations of the luminance detecting unit 21. Thus, in the CIS information of a case in which all the operations of the luminance detecting unit 21 belong to the same frame, interference information with image data is not included, and a frame number of the image data is included. In accordance with this, in a case in which all the operations of the luminance detecting unit 21 belong to the same frame, the CIS information may be configured to be included in frame information in units of frames of an EBD or the like instead of being included in the line information.

A pixel array in the pixel chip 25C will be described with reference to FIG. 41.

Figure 41:
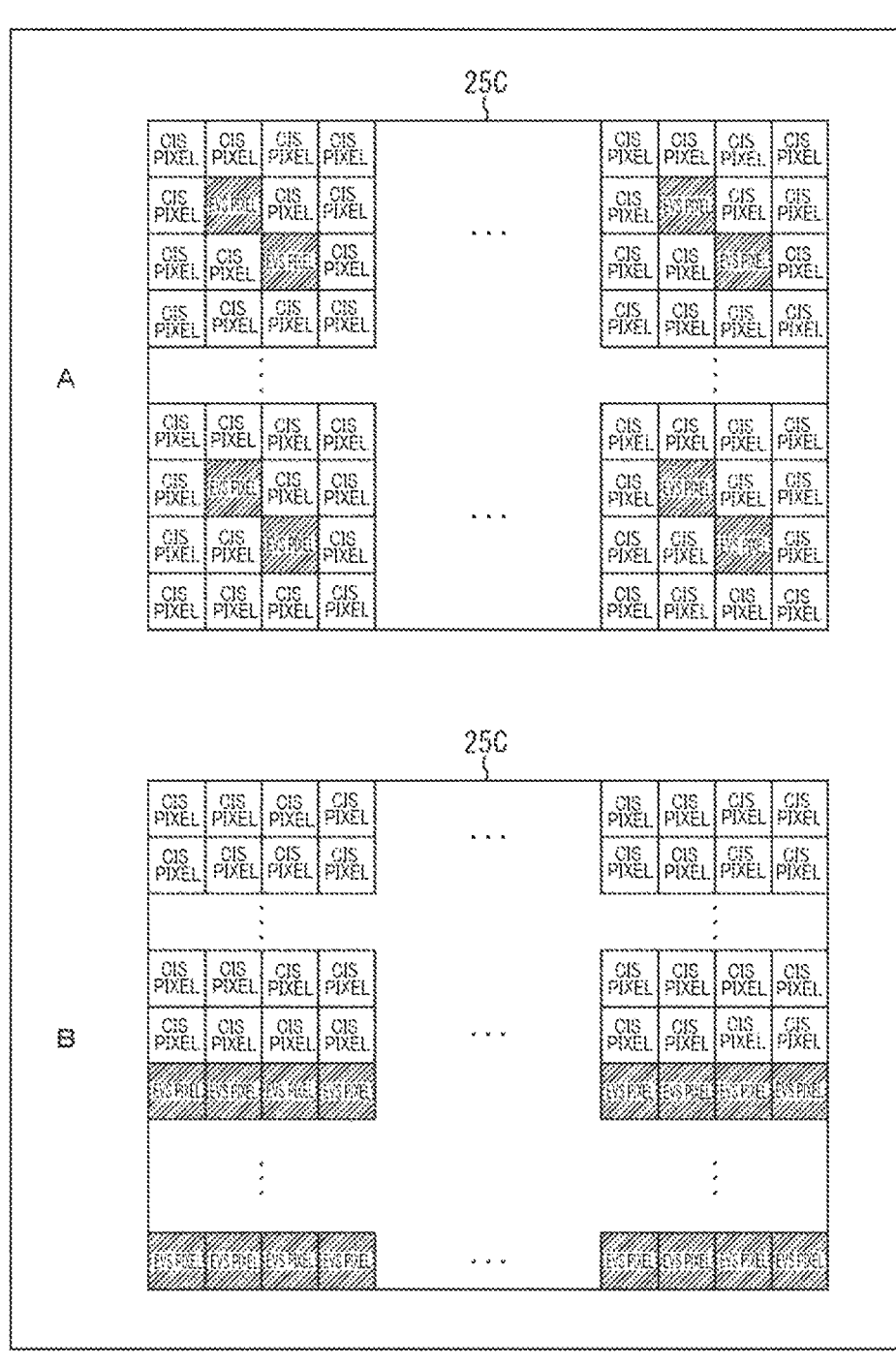
FIG. 41 is a diagram illustrating one example of a pixel arrangement.

Each rectangle illustrated in FIG. 41 represents a plurality of pixels disposed in a matrix shape on a sensor face of the pixel chip 25C. Hereinafter, among such pixels, a pixel in which the luminance detecting unit 21 is disposed will be referred to as an EVS pixel, and a pixel in which the luminance detecting unit 29 for images is disposed will be referred to as a CIS pixel.

For example, as illustrated in FIG. 41, EVS pixels and CIS pixels may be disposed with a uniform disposition density over the entire pixel chip 25C. In other words, in the disposition example illustrated in A of FIG. 41, among pixels of a 4×4 array a disposition pattern in which EVS pixels are disposed on the upper left side and the lower right side of a center 2×2 array, and CIS pixels are disposed at other places is formed, and the 4×4 array of such a disposition pattern is disposed over the entire pixel chip 25C.

As illustrated in B of FIG. 41, the disposition positions of EVS pixels and CIS pixels may be segmented, and the EVS pixel and the CIS pixel may be disposed in respective areas. In the disposition example illustrated in B of FIG. 41, CIS pixels are disposed in an area of the upper side of the pixel chip 25C, and EVS pixels are disposed in an area of the lower side of the pixel chip 25C.

In this way disposition densities, disposition positions, and the like of CIS pixels and EVS pixels disposed in the pixel chip 25C can be arbitrarily set.

<Modified Example of Fourth Configuration Example of Additional Information Generating Unit>

Figure 42:
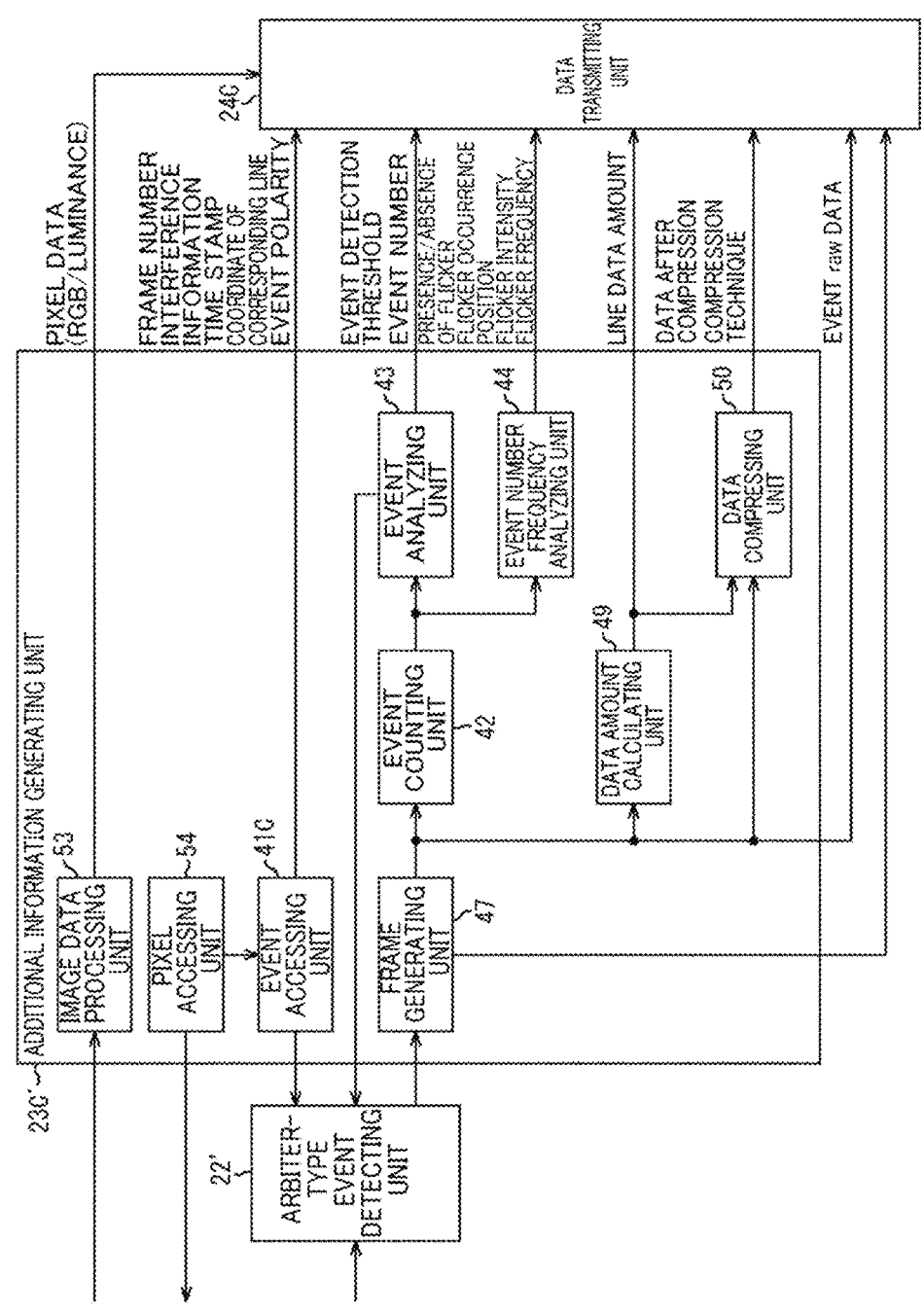
FIG. 42 is a block diagram representing a configuration example of an additional information generating unit corresponding to an arbiter type.

FIG. 42 is a block diagram illustrating a modified example of the fourth configuration example of the additional information generating unit 23. In addition, in an additional information generating unit 23C' illustrated in FIG. 42, the same reference signs will be assigned to components that are common to the additional information generating unit 23C illustrated in FIG. 36, and detailed description thereof will be omitted.

For example, the event detecting unit 22 and the additional information generating unit 23C illustrated in FIG. 36 described above are of a scan type, and by outputting event data regardless of presence/absence of an occurrence of an event, one frame is configured. In contrast to this, an additional information generating unit 23C' is configured to be in correspondence with an arbiter-type event detecting unit 22' that outputs event data only at a timing at which an event has occurred.

As illustrated in the drawing, the additional information generating unit 23C' is configured to include a frame generating unit 47, which is a configuration different from that of the additional information generating unit 23C illustrated in FIG. 36. As described above with reference to FIG. 13, the frame generating unit 47 can temporarily store event data that has occurred in a period corresponding to a certain one frame in the SRAM 48 and output the event data that has occurred in the period corresponding to the one frame in the format of the frame.

<Regarding SLVS-EC>

A Scalable Low Voltage Signaling with Embedded Clock (SLVS-EC) that is one high-speed communication IF will be described with reference to FIG. 43.

In the embodiment described above, as described with reference to FIG. 1, data is transmitted and received in compliance with the MIPI CSI-2 specification between the EVS 12 and the data processing device 13. The present technology can be applied to other specifications and, for example, can be applied to SLVS-EC that is one of high-speed communications IF.

For example, in the SLVS-EC, the data transmitting unit 24 of the EVS 12 assigns data of each pixel generated on the basis of the output of the event detecting unit 22 to a plurality of transmission lines and transmits the data to the data processing device 13 in parallel through the plurality of transmission lines (for example, eight transmission lines). A transmission line between the EVS 12 and the data processing device 13 may be either a wired transmission line or a wireless transmission line. Hereinafter, a transmission line between the EVS 12 and the data processing device 13 will be referred to as a lane as is appropriate.

The data receiving unit 31 of the data processing device 13 receives pixel data transmitted from the data transmitting unit 24 through a plurality of transmission lines (for example, eight transmission lines) and outputs the data of each pixel to the event-related data processing unit 32 in order. In this way between the data transmitting unit 24 and the data receiving unit 31, data is transmitted and received using a plurality of lanes.

In the SLVS-EC, in accordance with details of signal processing, an application layer (Application Layer), a link layer (Link Layer), and a physical layer (PHY Layer) are defined. The processing of the link layer and the processing of the physical layer are performed in each of the data transmitting unit 24 and the data transmitting unit 24.

As processing of the link layer, for example, processing for realizing the following functions is performed.

1. Pixel Data—Byte Data Conversion
2. Error Correction of Payload Data
3. Transmission of Packet Data and Auxiliary Data
4. Error Correction of Payload Data Using Packet Footer
5. Lane Management
6. Protocol Management for Packet Generation On the other hand, as the processing of the physical layer, for example, processing for realizing the following functions is performed.

1. Generation and Extraction of Control Code
2. Control of Bandwidth
3. Control of Skew Between Lanes
4. Disposition of Symbol 5. Symbol Coding for Bit Synchronization
6. SERDES (SERializer/DESerializer)
7. Generation and Reproduction of Clock
8. Transmission of Scalable Low Voltage Signaling (SLVS) Signal FIG. 43 is a diagram illustrating an example of a format used for data transmission of the SLVS-EC.

An effective pixel area is an area of effective pixels of an image of one frame imaged by the pixel chip 25. On the left side of the effective pixel area, a margin area is disposed.

On the upper side of the effective pixel area, a prior dummy area is disposed. In the example illustrated in FIG. 43, embedded data is disposed in the prior dummy area. In the embedded data, information of setting values relating to imaging using the pixel chip 25 and the like such as a shutter speed, diaphragm value, a gain, and the like are included. In addition to the information of setting values relating to imaging, various kinds of additional information such as contents, a format, a data size, and the like are disposed as the embedded data. The embedded data is additional information added to image data of each frame.

On the lower side of the effective pixel area, a post dummy area is disposed. The embedded data may be disposed in the post dummy area.

An image data area is configured from the effective pixel area, the margin area, the prior dummy area, and the post dummy area.

A header is added before each line configuring the image data area, and a start code is added before the header. In addition, a footer is added as an option after each line configuring the image data area, and control codes such as an end code and the like are added after the footer. In a case in which no footer is added, control codes such as an end code and the like are added after each line configuring the image data area.

Figure 43:
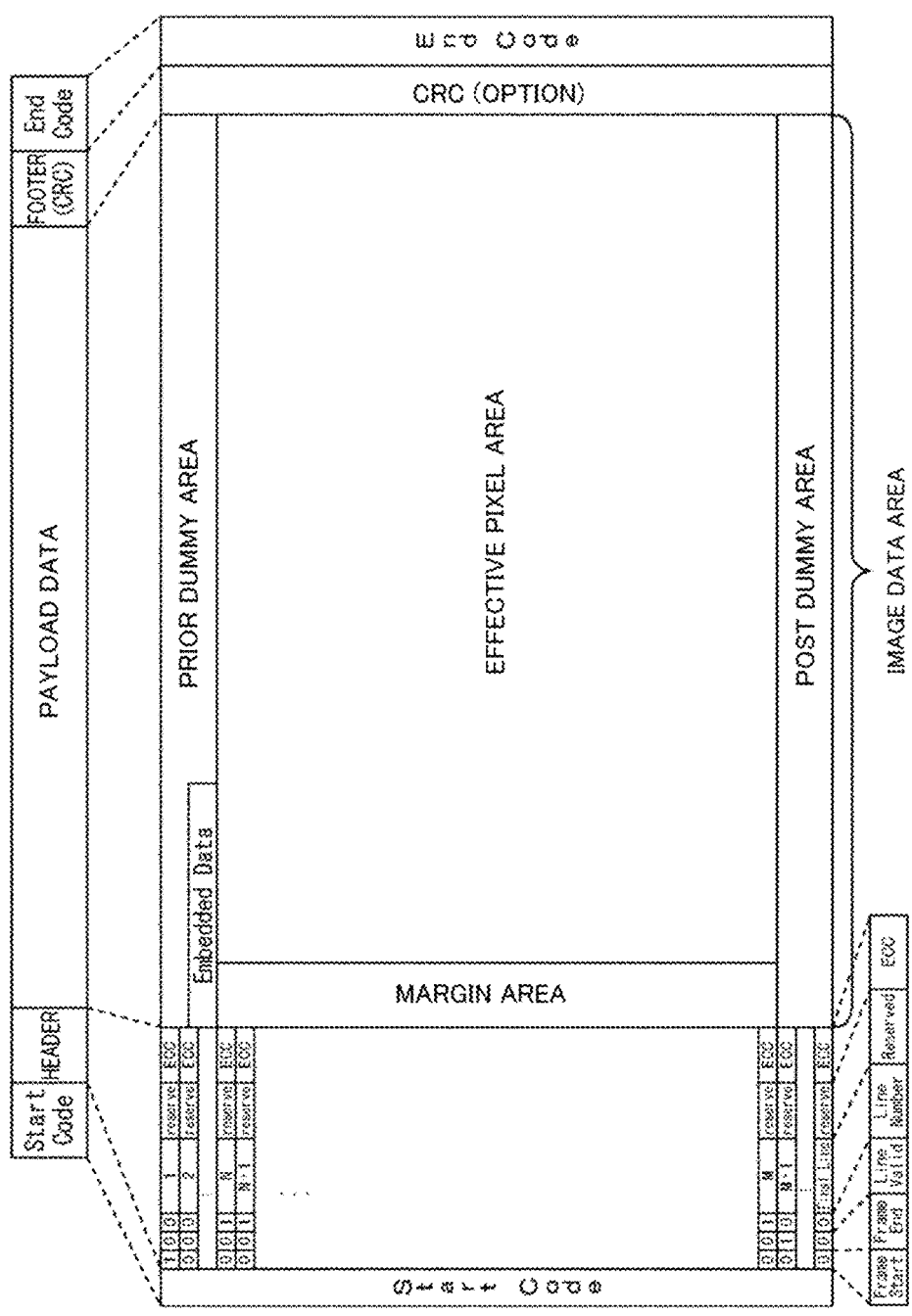
FIG. 43 is a diagram illustrating an example of a format used in data transmission of SLVS-EC.

For each image of one frame generated on the basis of the output of the event detecting unit 22, data transmission is performed using the frame data of the format illustrated in FIG. 43.

A band of the upper side of FIG. 43 illustrates a structure of a packet used for transmission of frame data illustrated on the lower side. When a row of data in a horizontal direction is set as a line, data configuring one line of the image data area is stored in the payload of the packet. Transmission of the entire frame data of one frame is performed using packets corresponding to a number equal to or larger than a pixel number of the vertical direction of the image data area. In addition, the transmission of the entire frame data of one frame is performed by transmitting packets in which data of a line unit is stored in order from data disposed in a top line.

By adding a header and a footer to a payload in which data corresponding to one line is stored, one packet is configured. A start code and an end code that are control codes are at least added to each packet.

As illustrated on the lower left side of FIG. 43, additional information of data stored in the payload such as a frame start, a frame end, a line valid, a line number, and the like is included in the header.

The frame start is information of one bit representing the beginning of the frame.

A value 1 is set in the frame start of the header of the packet used for transmission of data of a first line of the frame data, and a value 0 is set in the frame start of the header of the packet used for transmission of data of another line.

The frame end is information of one bit representing an end of the frame. A value 1 is set to the frame end of the header of the packet including data of the end line of the frame data, and a value 0 is set to the frame end of the header of the packet used for transmission of data of other lines.

The line valid is information of one bit representing whether or not the line of data stored in the packet is a line of an effective pixel area. A value 1 is set to the line valid of the header of the packet used for transmission of pixel data of a line disposed inside of the effective pixel area, and a value 0 is set to the line valid of the header of the packet used for transmission of data of other lines.

The line number is information of 13 bits representing a line number of a line in which data stored in the packet is disposed.

In addition, also in a case in which the data transmitting unit 24 of the EVS 12 and the data receiving unit 31 of the data processing device 13 are high-speed communications IF corresponding to specifications different from the SLVS-EC, frame data in which image data of each frame is disposed is generated, and data transmission is performed using a packet storing data of each line of the frame data.

Here, the method of outputting the EVS data (event data) in the MIPI CSI-2 specification and the SLVS-EC specification will be described.

For example, the EVS data is output for each frame, in the MIPI CSI-2, the EVS data is stored in the embedded data, and in the SLVS-EC, the EVS data is stored in the embedded data of the prior dummy area or the post dummy area. In addition, in the SLVS-EC, the embedded data illustrated in the format of FIG. 43 represents a data part inserted into the dummy area, and when the EVS data is stored in the dummy area, that place becomes the embedded data.

In addition, in a case in which EVS data is output for each line, in the MIPI CSI-2, the EVS data is stored inside of a packet header, and, in the SLVS-EC, the EVS data is stored in a reserve of the header. Alternatively in a case in which EVS data is output for each line, in the MIPI CSI-2, the EVS data is stored after a packet header, and, in the SLVS-EC, the EVS data is stored first in an effective pixel.

In addition, in a case in which EVS data is output for each pixel, in any one of the MIPI CSI-2 and the SLVS-EC, the EVS data is stored in the effective pixel area.

In addition, in the SLVS-EC, for information for each line relating to EVS data, an error correction codes (ECC) is generated and may be stored in a header part and transmitted, and, for pixel data relating to EVS data, a result of performing cyclic redundancy check (CRC) may be stored in the footer part and be transmitted. In addition, in the MIPI CSI-2, the payload is area information and area data (for example, a hatched area interposed between PH and PF illustrated in FIG. 3), and Info is also included therein. In the SLVS_EC, a payload is a margin area and an effective pixel area, a packet header corresponds to a start code and a header, and a packet footer corresponds to CRC and an end code. In addition, in the SLVS-EC, a margin area may not be provided.

<Usage Example of Image Sensor>

Figure 44:
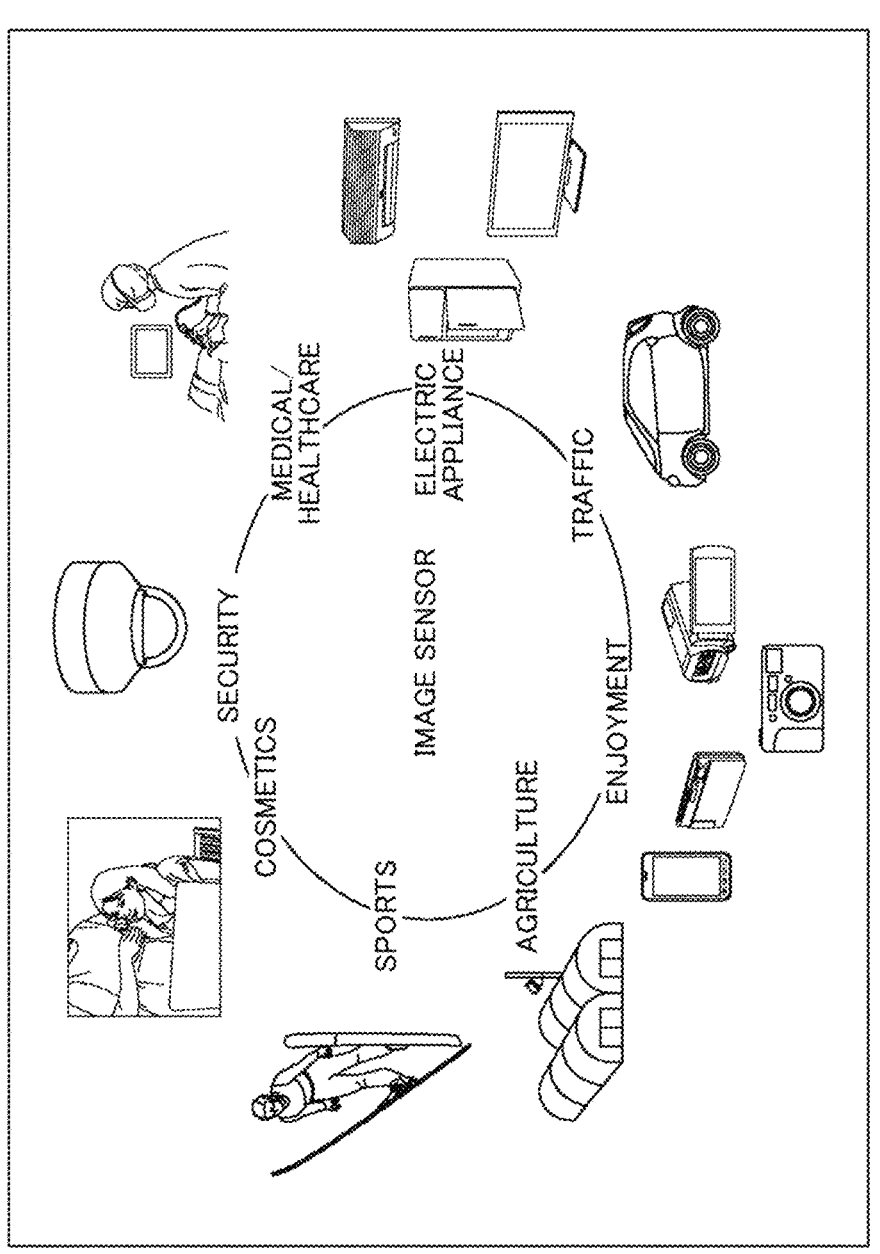
FIG. 44 is a diagram illustrating a use example in which an image sensor is used.

FIG. 44 is a diagram illustrating usage examples in which the image sensor (EVS 12) described above is used.

The above-described image sensor can be used in various cases for sensing light such as visible light, infrared light, ultraviolet light, and X-ray as will be described.

Devices that capture images used for viewing, such as digital cameras and mobile devices with camera functions Devices used for transportation, such as in-vehicle sensors that capture front, rear, surrounding, and interior view images of automobiles, monitoring cameras that monitor traveling vehicles and roads, ranging sensors that measure a distance between vehicles, and the like, for safe driving such as automatic stop, recognition of a driver's condition, and the like Devices used for home appliances such as TVs, refrigerators, and air conditioners in order to capture an image of a user's gesture and perform device operations in accordance with the gesture Devices used for medical treatment and healthcare, such as endoscopes and devices that perform angiography by receiving infrared light Devices used for security such as monitoring cameras for crime prevention and cameras for personal authentication Devices used for beauty such as a skin measuring device that captures images of the skin and a microscope that captures images of the scalp Devices used for sports, such as action cameras and wearable cameras for sports applications Devices used for agriculture, such as cameras for monitoring conditions of fields and crops <Combination Example of Configuration>

The present technology can also be configured as follows.

(1)

An image sensor including: an event detecting unit configured to detect an occurrence of an event that is a luminance change of light received by a photodiode; and a data transmitting unit configured to set event data representing details of the event as a part of payload data and transmit line information that is added to a line and relates to the event data in a frame structure in which the line information is stored in a beginning part of the payload data.

(2)

The image sensor described in (1) described above, in which the line information is stored in a packet header of a packet storing the event data specified in CSI-2 or SLVS-EC.

(3)

The image sensor described in (1) described above, in which a part of the line information is stored in embedded data specified in CSI-2 or SLVS-EC.

(4)

The image sensor described in any one of (1) to (3) described above, in which the line information includes at least one of a time stamp, coordinates of the line, and an event polarity of the line.

(5)

The image sensor described in any one of (1) to (4) described above, in which the line information includes at least one of an event detection threshold of the line and an event number of the line.

(6)

The image sensor described in any one of (1) to (5) described above, in which the line information includes flicker information of the line that is generated on the basis of the event data.

(7)

The image sensor described in any one of (1) to (6) described above, in which the line information includes a data amount of the line.

(8)

The image sensor described in any one of (1) to (7) described above, in which the line information includes at least one of a compression technique for compressing the event data and data after compression.

(9)

The image sensor described in any one of (1) to (8) described above, further including: a luminance detecting unit configured to detect luminance of light received by the photodiode and output a luminance signal representing a luminance value; and an additional information generating unit configured to generate the line information as additional information that is additionally disposed in the event data on the basis of the event data, in which the event detecting unit acquires a difference between the luminance value represented by the luminance signal and a predetermined reference value, and in a case in which the difference exceeds an event detection threshold of a positive side or an event detection threshold of a negative side, detects an occurrence of the event, and outputs the event data representing details of the event.

(10)

The image sensor described in (9) described above, in which, in a case in which the event detecting unit is an arbiter type, the additional information generating unit has a frame generating unit generating a frame from the event data that is output at a timing at which an event has occurred from the event detecting unit.

(11)

The image sensor described in (9) or (10) described above, in which the additional information generating unit sets area information corresponding to an area set in an image formed from the event data for each row of the image and transmits the set area information and the event data that is area data corresponding to the area for each row, and information representing a position of the row and information representing a position of a column of the area included in the row are included in the area information.

(12)

The image sensor described in any one of (9) to (11) described above, further including a pixel chip in which a first luminance detecting unit used for acquisition of the event data and a second luminance detecting unit used for acquisition of image data are disposed as the luminance detecting units.

(13)

The image sensor described in (12) described above, in which the additional information generating unit generates a frame number used for synchronizing the event data with the image data and interference information used for identifying the event data acquired at approximately the same timing as a timing at which the second luminance detecting unit operates as the additional information that is additionally disposed in the event data.

(14)

The image sensor described in (13) described above, in which an operation of the first luminance detecting unit at approximately the same timing as a timing at which the second luminance detecting unit operates is stopped only for a short period, and acquisition of the event data at the timing is skipped.

(15)

The image sensor described in (13) or (14) described above, in which the frame number and the interference information are generated in units of lines of the event data.

(16)

The image sensor described in (13) or (14) described above, in which, in a case in which the first luminance detecting unit and the second luminance detecting unit do not operate at approximately the same timing over one frame, the frame number is included in frame information in units of frames.

(17)

The image sensor described in any one of (13) to (16) described above, in which the additional information generating unit has: a pixel accessing unit configured to perform an access to the second luminance detecting unit and control a timing at which the second luminance detecting unit operates; and an event accessing unit configured to generate the frame number and the interference information on the basis of a timing at which the pixel accessing unit controls an operation of the second luminance detecting unit together with generating a time stamp, coordinates of the line, and an event polarity of the line used as the line information.

(18)

A data processing device including: a data receiving unit configured to set event data representing details of an event that is a luminance change of light received by a photodiode as a part of payload data and receive the event data and line information in a frame structure in which the line information that is added to a line and relates to the event data is stored in a beginning part of the payload data; and an event-related data processing unit configured to refer to the line information and perform data processing relating to the event detected by the event detecting unit for the event data.

(19)

The data processing device described in (18) described above, in which the data receiving unit receives: area information that is set in correspondence with an area set for an image formed from the event data and is set for each row of the image; and the event data that becomes area data corresponding to the area, and information representing a position of the row and information representing a position of a column of the area included in the row are included in the area information.

(20)

The data processing device described in (18) or (19) described above, further including a processing unit configured to perform control relating to an image formed from the event data output from each of a plurality of image sensors that are connected to a data bus and transmits the event data through the data bus, in which the processing unit performs output control of a start packet of a frame in each of the image sensors and output control of an end packet of a frame in each of the image sensors and performs control of connecting a plurality of images from an image including the start packet to an image including the end packet for a plurality of images output from each of the image sensors.

(21)

An image sensor system including: an image sensor including: an event detecting unit configured to detect an occurrence of an event that is a luminance change of light received by a photodiode; and a data transmitting unit configured to set event data representing details of the event as a part of payload data and transmit line information that is added to a line and relates to the event data in a frame structure in which the line information is stored in a beginning part of the payload data; and a data processing device including: a data receiving unit configured to receive the event data and the line information transmitted from the image sensor; and an event-related data processing unit configured to refer to the line information and perform data processing relating to the event detected by the event detecting unit for the event data.

(22)

The image sensor system described in (21) described above, in which data is serially converted and transmitted between the image sensor and the data processing device, and switching between serial conversion that is compliant with one specification and serial conversion that is compliant with another specification is configured to be able to be performed on the image sensor side and the data processing device side.

(23)

The image sensor system described in (21) or (22) described above, in which area information corresponding to an area set in an image formed from the event data is set for each row of the image, and the set area information and the event data that is area data corresponding to the area are transmitted for each row, the data receiving unit receives the area information and the event data that becomes the area data, and information representing a position of the row and information representing a position of a column of the area included in the row are included in the area information.

(24)

The image sensor system described in any one of (21) to (23) described above, in which the data processing device is connected to a data bus, the image sensor system further including a processing unit configured to perform control relating to an image formed from the event data output from each of a plurality of image sensors that are connected to the data bus through the data bus, and the processing unit performs: output control of a start packet of a frame in each of the image sensors and output control of an end packet of a frame in each of the image sensors; and control of connecting a plurality of images from an image including the start packet to an image including the end packet for a plurality of images output from each of the image sensors.

(25)

An image sensor including: an event detecting unit configured to detect an occurrence of an event that is a luminance change of light received by a photodiode; and a data transmitting unit configured to set event data representing details of the event as a part of payload data and transmit frame information that is added to a frame as additional information that is additionally disposed in the event data in a frame structure in which the frame information is a part of embedded data.

(26)

The image sensor described in (25) described above, in which disposition positions of the frame information are a beginning position of the event data configured by a plurality of lines, an end position of the event data, and an intermediate position of the event data or the beginning position and the end position of the event data.

(27)

The image sensor described in (25) or (26) described above, in which the data transmitting unit connects the event data corresponding to a plurality of frames as a subframe and transmit the connected event data as one frame.

(28)

The image sensor described in any one of (25) to (27) described above, in which the additional information includes a time stamp or a frame number relating to the event data.

(29)

The image sensor described in any one of (25) to (28) described above, in which the additional information includes an event detection threshold or region of interest (ROI) information generated on the basis of the event data.

(30)

The image sensor described in any one of (25) to (29) described above, in which the additional information includes flicker information generated on the basis of the event data.

(31)

The image sensor described in any one of (25) to (30) described above, in which the additional information includes an optical flow that is information representing presence/absence of movement or a movement direction of a subject generated on the basis of the event data.

(32)

The image sensor described in any one of (25) to (31) described above, in which the additional information includes a data amount of the frame.

(33)

The image sensor described in any one of (25) to (32) described above, in which in a case in which the event detecting unit is an arbiter type, a frame corresponding to one frame including the event data output at a timing at which an event has occurred from the event detecting unit is generated.

(34)

The image sensor described in any one of (25) to (33) described above, in which the data transmitting unit sets area information corresponding to an area set for an image formed from the event data for each row of the image and transmits the set area information and the event data that becomes area data corresponding to the area for each row, and information representing a position of a row and information representing a position of a column of the area included in the row are included in the area information.

(35)

The image sensor according to any one of (25) to (34) described above, further including: a luminance detecting unit configured to detect luminance of light received by the photodiode and output a luminance signal representing a luminance value; and an additional information generating unit configured to generate the frame information as additional information that is additionally disposed in the event data on the basis of the event data, in which the event detecting unit acquires a difference between the luminance value represented by the luminance signal and a predetermined reference value, and in a case in which the difference exceeds an event detection threshold of a positive side or an event detection threshold of a negative side, detects an occurrence of the event, and outputs the event data representing details of the event.

(36)

A data processing device including: a data receiving unit configured to set event data representing details of an event that is a luminance change of light received by a photodiode as a part of payload data and receive frame information added to a frame as additional information that is additionally disposed in the event data in a frame structure in which the frame information is a part of embedded data; and an event-related data processing unit configured to refer to the frame information and perform data processing relating to the event.

(37)

The data processing device described in (36) described above, in which the data receiving unit receives: area information that is set in correspondence with an area set for an image formed from the event data and is set for each row of the image; and the event data that becomes area data corresponding to the area, and information representing a position of the row and information representing a position of a column of the area included in the row are included in the area information.

(38)

The data processing device described in (36) or (37) described above, further including a processing unit configured to perform control relating to an image formed from the event data output from each of a plurality of image sensors that are connected to a data bus and output the event data through the data bus, in which the processing unit performs output control of a start packet of a frame in each of the image sensors and output control of an end packet of a frame in each of the image sensors and performs control of connecting a plurality of images from an image including the start packet to an image including the end packet for a plurality of images output from the image sensors.

(39)

An image sensor system including: an image sensor including an event detecting unit configured to detect an occurrence of an event that is a luminance change of light received by a photodiode and a data transmitting unit configured to set event data representing details of the event as a part of payload data and transmit frame information that is added to a frame as additional information that is additionally disposed in the event data in a frame structure in which the frame information is a part of embedded data; and a data processing device including a data receiving unit configured to receive the event data and the frame information and an event-related data processing unit configured to refer to the frame information and perform data processing relating to the event.

(40)

The image sensor system described in (39) described above, in which data is serially converted and transmitted between the image sensor and the data processing device, and switching between serial conversion that is compliant with one specification and serial conversion that is compliant with another specification is configured to be able to be performed on the image sensor side and the data processing device side.

(41)

The image sensor system described in (39) or (40) described above, in which the data transmitting unit sets area information corresponding to an area set in an image formed from the event data for each row of the image and transmits the set area information and the event data that is area data corresponding to the area for each row, the data receiving unit receives the area information and the event data that becomes the area data, and information representing a position of the row and information representing a position of a column of the area included in the row are included in the area information.

(42)

The image sensor system described in any one of (39) to (41) described above in which the data processing device includes a processing unit configured to perform control relating to an image formed from the event data output from each of a plurality of image sensors that are connected to a data bus and output the event data through the data bus, and the processing unit performs output control of a start packet of a frame in each of the image sensors and output control of an end packet of a frame in each of the image sensors and performs control of connecting a plurality of images from an image including the start packet to an image including the end packet for a plurality of images output from the image sensors.

(43)

An image sensor including: an event detecting unit configured to detect an occurrence of an event that is a luminance change of light received by a photodiode; and a data transmitting unit configured to set event data representing details of the event as a part of payload data and transmit pixel information that is added to data for each pixel including the photodiode in a frame structure in which the pixel information is embedded in the event data.

(44)

The image sensor described in (43) described above, in which the data transmitting unit inserts information representing a data amount used in data corresponding to one pixel into a data type in accordance with a data amount of the pixel information embedded in the event data.

(45)

The image sensor described in (43) or (44) described above, in which the pixel information includes a time stamp or a frame number relating to the event data.

(46)

The image sensor described in any one of (43) to (45) described above, in which the pixel information includes an event detection threshold or an event number.

(47)

The image sensor described in any one of (43) to (46) described above, in which the pixel information includes flicker information generated on the basis of the event data.

(48)

The image sensor described in any one of (43) to (47) described above, in which the pixel information includes an optical flow value of each pixel generated on the basis of the event data.

(49)

The image sensor described in any one of (43) to (48) described above, in which the pixel information includes an attention level of each pixel.

(50)

The image sensor described in any one of (43) to (49) described above, in which the pixel information includes a classification value or a luminance change amount of each pixel generated on the basis of the event data.

(51)

The image sensor described in any one of (43) to (50) described above, in which in a case in which the event detecting unit is an arbiter type, a frame corresponding to one frame including the event data output at a timing at which an event has occurred from the event detecting unit is generated.

(52)

The image sensor described in any one of (43) to (51) described above, in which the data transmitting unit sets area information corresponding to an area set for an image formed from the event data for each row of the image and transmits the set area information and the event data that becomes area data corresponding to the area for each row, and information representing a position of a row and information representing a position of a column of the area included in the row are included in the area information.

(53)

The image sensor according to any one of (43) to (52) described above, further including: a luminance detecting unit configured to detect luminance of light received by the photodiode and output a luminance signal representing a luminance value; and an additional information generating unit configured to generate the pixel information as additional information that is additionally disposed in the event data on the basis of the event data, in which the event detecting unit acquires a difference between the luminance value represented by the luminance signal and a predetermined reference value, and in a case in which the difference exceeds an event detection threshold of a positive side or an event detection threshold of a negative side, detects an occurrence of the event, and outputs the event data representing details of the event.

47

(54)

A data processing device including: a data receiving unit configured to set event data representing details of an event that is a luminance change of light received by a photodiode as a part of payload data and receive pixel information added to data for each pixel including the photodiode in a frame structure in which the pixel information is embedded in the event data; and an event-related data processing unit configured to refer to the pixel information and perform data processing relating to the event.

(55)

The data processing device described in (54) described above, in which the data receiving unit receives: area information that is set in correspondence with an area set for an image formed from the event data and is set for each row of the image; and the event data that becomes area data corresponding to the area, and information representing a position of the row and information representing a position of a column of the area included in the row are included in the area information.

(56)

The data processing device described in (54) or (55) described above, further including a processing unit configured to perform control relating to an image formed from the event data output from each of a plurality of image sensors that are connected to a data bus and output the event data through the data bus, in which the processing unit performs output control of a start packet of a frame in each of the image sensors and output control of an end packet of a frame in each of the image sensors and performs control of connecting a plurality of images from an image including the start packet to an image including the end packet for a plurality of images output from the image sensors.

(57)

An image sensor system including: image sensor including an event detecting unit configured to detect an occurrence of an event that is a luminance change of light received by a photodiode and a data transmitting unit configured to set event data representing details of the event as a part of payload data and transmit pixel information that is added to data for each pixel including the photodiode in a frame structure in which the pixel information is embedded in the event data; and a data processing device including a data receiving unit configured to receive the event data and the pixel information and an event-related data processing unit configured to refer to the pixel information and perform data processing relating to the event.

(58)

The image sensor system described in (57) described above, in which data is serially converted and transmitted between the image sensor and the data processing device, and switching between serial conversion that is compliant with one specification and serial conversion that is compliant with another specification is configured to be able to be performed on the image sensor side and the data processing device side.

(59)

The image sensor system described in (57) or (58) described above, in which the data transmitting unit sets area information corresponding to an area set for an image formed from the event data for each row of the image and transmits the set area information and the event data that becomes area data corresponding to the area for each row, the data receiving unit receives the area information and the event data that becomes the area data, and information representing a position of a row and information representing a position of a column of the area included in the row are included in the area information.

(60)

The image sensor system described in any one of (57) to (59) described above, in which the data processing device further includes a processing unit configured to perform control relating to an image formed from the event data output from each of a plurality of image sensors that are connected to a data bus and output the event data through the data bus, the processing unit performs output control of a start packet of a frame in each of the image sensors and output control of an end packet of a frame in each of the image sensors and performs control of connecting a plurality of images from an image including the start packet to an image including the end packet for a plurality of images output from the image sensors.

Note that embodiments of the present disclosure are not limited to the above-mentioned embodiments and can be modified in various manners without departing from the scope and spirit of the present disclosure. The advantageous effects described in the present specification are merely exemplary and are not limitative, and other advantageous effects may be achieved.

REFERENCE SIGNS LIST

11 Sensor system
12 EVS
13 Data processing device
14 Data bus
21 Luminance detecting unit
22 Event Detecting unit
23 Additional information generating unit
24 Data transmitting unit
25 Pixel chip
26 Signal processing chip
27 AFE chip
28 Logic chip
29 Luminance detecting unit
31 Data receiving unit
32 Event-related data processing unit
41 Event accessing unit
42 Event counting unit
43 Event number analyzing unit
44 Event number frequency analyzing unit
45 Optical flow analyzing unit
46 Data amount calculating unit
47 Frame generating unit
48 SRAM
49 Data amount calculating unit
50 Data compressing unit
51 Attention level calculating unit
52 Data processing unit
53 Image data processing unit
54 Pixel accessing unit

The invention claimed is:

1. An image processing device comprising:
an event detecting circuit configured to detect an occurrence of an event that is a luminance change of light received by a photodiode; and
a data transmitting circuit configured to set event data representing details of the event as a part of payload data and transmit a line information that is added to a line and relates to the event data in a frame structure in which the line information is stored in a beginning part of the payload data, wherein the line information includes a compression technique for compressing the event data.

2. The image processing device according to claim 1, wherein additional line information is stored as embedded data specified in CSI-2 or SLVS-EC.

3. The image processing device according to claim 1, wherein the line information includes at least one of a time stamp, coordinates of the line, or an event polarity of the line.

4. The image processing device according to claim 1, wherein the line information includes an event detection threshold of the line.

5. The image processing device according to claim 1, wherein the line information includes flicker information of the line that is generated on a basis of the event data.

6. An image processing device comprising:

an event detecting circuit configured to detect an occurrence of an event that is a luminance change of light received by a photodiode; and a data transmitting circuit configured to set event data representing details of the event as a part of payload data and transmit a line information that is added to a line and relates to the event data in a frame structure in which the line information is stored in a beginning part of the payload data, wherein the line information includes a data amount of the line.

7. The image processing device according to claim 1, further comprising:

a luminance detecting circuit configured to detect a luminance of light received by the photodiode and output a luminance signal representing a luminance value; and an additional information generating circuit configured to generate the line information as additional information that is additionally disposed in the event data on a basis of the event data, wherein the event detecting circuit acquires a difference between the luminance value represented by the luminance signal and a predetermined reference value, and in a case in which the difference exceeds an event detection threshold of a positive side or an event detection threshold of a negative side, detects an occurrence of the event, and outputs the event data representing details of the event.

8. The image processing device according to claim 7, wherein, in a case in which the event detecting circuit is an arbiter type, the additional information generating circuit has a frame generating circuit generating a frame from the event data that is output at a timing at which an event has occurred from the event detecting circuit.

9. The image processing device according to claim 7, wherein the additional information generating circuit sets area information corresponding to an area set in an image formed from the event data for each row of the image and transmits the set area information and the event data that is area data corresponding to the area for each row, and wherein information representing a position of a row and information representing a position of a column of the area included in the row are included in the area information.

10. The image processing device according to claim 7, wherein the luminance detecting circuit includes an event data acquisition circuit for acquiring event data and an image data acquisition circuit for acquiring image data, and the event data acquisition circuit and the image data acquisition circuit are arranged on a same pixel chip.

11. The image processing device according to claim 1, wherein the line information includes data after compression.

12. The image processing device according to claim 4, wherein the line information includes an event number of the line.

13. The image processing device according to claim 1, wherein the data transmitting circuit is configured to operate in a first mode and a second mode, the first mode implementing a data amount of a pixel of two bits, and the second mode implementing a data amount of a pixel of other than two bits.

14. The image processing device according to claim 1, wherein the data transmitting circuit is configured to implement a data amount of the event data of two bits or three bits.

15. The image processing device according to claim 1, wherein the frame structure for the image processing device is configured to store the line information of a frame according to a first virtual channel value, and another image processing device is configured to store the line information of a frame according to a second virtual channel value.

16. The image processing device according to claim 1, wherein the data transmitting circuit is configured to transmit frame information that is added to a frame as additional information that is disposed in the event data in the frame structure.

17. The image processing device according to claim 7, wherein the additional information includes a time stamp or a frame number relating to the event data.

18. The image processing device according to claim 1, wherein the data transmitting circuit is configured to embed pixel information in the event data.

19. The image processing device according to claim 1, wherein the event detecting circuit is configured to perform a region of interest (ROI) process that acquires coordinate information of an area desired to be obtained, and to output the coordinate information of the area.

20. The image processing device according to claim 1, wherein the event detecting circuit is configured to perform a target object recognition process for a target object that has generated the event.

21. The image processing device according to claim 1, wherein the event detecting circuit is configured to output outputs distance information representing a distance to a target that is acquired in an exposure/auto focus (AE/AF) process.

22. The image processing device according to claim 1, wherein the event detecting circuit is configured to perform a gesture detecting process.

23. The image processing device according to claim 1, wherein the event detecting circuit is configured to output movement amount information representing a movement amount of a subject per unit time, the movement amount information being acquired in a deblur process corresponding to the subject.

24. An image processing device comprising:

an event detecting circuit configured to detect an occurrence of an event that is a luminance change of light received by a photodiode; and a data transmitting circuit configured to set event data representing details of the event as a part of payload data and transmit a line information that relates to the event data in a frame structure in which the line information is stored in a beginning part of the payload data, wherein the line information includes a compression technique for compressing the event data, and the line information is stored in a packet header of a packet storing the event data specified in CSI-2 or SLVS-EC.

25. An image processing device comprising:

an event detecting circuit configured to detect an occurrence of an event that is a luminance change of light received by a photodiode;

a data transmitting circuit configured to set event data representing details of the event as a part of payload data and transmit a line information that is added to a line and relates to the event data in a frame structure in which the line information is stored in a beginning part of the payload data;

a luminance detecting circuit configured to detect a luminance of light received by the photodiode and output a luminance signal representing a luminance value;

an additional information generating circuit configured to generate the line information as additional information that is additionally disposed in the event data on a basis of the event data, wherein the event detecting circuit acquires a difference between the luminance value represented by the luminance signal and a predetermined reference value, and in a case in which the difference exceeds an event detection threshold of a positive side or an event detection threshold of a negative side, detects an occurrence of the event, and outputs the event data representing details of the event; and a pixel chip in which a first luminance detecting circuit used for acquisition of the event data and a second luminance detecting circuit used for acquisition of image data are disposed as the luminance detecting circuit, wherein the additional information generating circuit generates a frame number used for synchronizing the event data with the image data and interference information used for identifying the event data acquired at approximately a same timing as a timing at which the second luminance detecting circuit operates as the additional information that is additionally disposed in the event data.

26. The image processing device according to claim 25, wherein an operation of the first luminance detecting circuit for event data acquisition is stopped at an interval between a first operation of the second luminance detecting circuit for image data acquisition for a first frame and a second operation of the second luminance detecting circuit for image data acquisition of a next frame that follows the first frame.

27. The image processing device according to claim 25, wherein the frame number and the interference information are generated in units of lines of the event data.

28. The image processing device according to claim 25, wherein, in a case in which the first luminance detecting circuit and the second luminance detecting circuit do not operate at approximately the same timing over one frame, the frame number is included in frame information in units of frames.

29. The image processing device according to claim 25, wherein the additional information generating circuit has:

a pixel accessing circuit configured to perform an access to the second luminance detecting circuit and control a timing at which the second luminance detecting circuit operates; and an event accessing circuit configured to generate the frame number and the interference information on the basis of a timing at which the pixel accessing circuit controls an operation of the second luminance detecting circuit together with generating a time stamp, coordinates of the line, and an event polarity of the line used as the line information.

\*  \*  \*  \*  \*